(12) United States Patent
Zhu et al.

(10) Patent No.: US 10,298,439 B2
(45) Date of Patent: May 21, 2019

(54) NETWORK FUNCTIONS VIRTUALIZATION NETWORK SYSTEM AND DATA PROCESSING METHOD, AND APPARATUS

(71) Applicant: Huawei Technologies Co., Ltd., Shenzhen (CN)

(72) Inventors: Lei Zhu, Beijing (CN); Anni Wei, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 141 days.

(21) Appl. No.: 15/350,598

(22) Filed: Nov. 14, 2016

(65) Prior Publication Data

US 2017/0063598 A1 Mar. 2, 2017

Related U.S. Application Data

(63) Continuation of application No. PCT/CN2014/077581, filed on May 15, 2014.

(51) Int. Cl.
*H04L 12/24* (2006.01)
*H04L 29/08* (2006.01)

(52) U.S. Cl.
CPC ............ *H04L 41/06* (2013.01); *H04L 41/20* (2013.01); *H04L 41/24* (2013.01);
(Continued)

(58) Field of Classification Search
CPC ..... H04L 41/06; H04L 41/0893; H04L 41/20; H04L 41/24; H04L 41/5041; H04L 67/20; H04L 67/34
See application file for complete search history.

(56) References Cited

U.S. PATENT DOCUMENTS

| | | | |
|---|---|---|---|
| 8,429,630 B2* | 4/2013 | Nickolov | G06F 9/4856 717/110 |
| 9,276,816 B1* | 3/2016 | Conte | H04L 41/12 |
| 9,384,028 B1* | 7/2016 | Felstaine | H04L 67/02 |
| 9,430,262 B1* | 8/2016 | Felstaine | G06F 9/45558 |

(Continued)

FOREIGN PATENT DOCUMENTS

| | | |
|---|---|---|
| CN | 1791117 A | 6/2006 |
| CN | 102546735 A | 7/2012 |

OTHER PUBLICATIONS

European supplementary search report filed on Feb. 24, 2017 retrieved from the internet on May 22, 2018). https://register.epo.org/application?documentId=EZ3U0SLF1586DSU&number=EP14891882&Ing=en&npl=false.*

(Continued)

*Primary Examiner* — Ahmed Elallam

(57) ABSTRACT

Embodiments of the present invention provide a network functions virtualization network system, method, and an apparatus. An NSO node is connected to a first network node by using an operation support-network service orchestration interface, the NSO node is connected to an RO node by using a network service orchestration-resource management orchestration interface, and the NSO node is connected to a catalog; the RO node is connected to a first network node by using an operation support-resource management orchestration interface, the RO node is connected to a VNFM node, the RO node is connected to a VIM node, and the RO node is separately connected to the catalog, a network functions virtualization instance, and a network functions virtualization infrastructure resource. The system, method, and the apparatus are used to deploy the network service orchestration function and the resource management orchestration function.

20 Claims, 42 Drawing Sheets

(52) U.S. Cl.
CPC .......... *H04L 41/5041* (2013.01); *H04L 67/20* (2013.01); *H04L 67/34* (2013.01); *H04L 41/0893* (2013.01)

(56) References Cited

U.S. PATENT DOCUMENTS

| | | | | |
|---|---|---|---|---|
| 9,948,493 | B2* | 4/2018 | Fargano | H04L 43/08 |
| 9,973,375 | B2* | 5/2018 | Shatzkamer | G06F 9/455 |
| 10,057,127 | B2* | 8/2018 | Zhu | H04W 28/08 |
| 10,177,982 | B2* | 1/2019 | Yu | H04L 12/6418 |
| 2011/0239216 | A1 | 9/2011 | Miyajima | |
| 2014/0317261 | A1* | 10/2014 | Shatzkamer | G06F 9/455 709/223 |
| 2015/0180730 | A1* | 6/2015 | Felstaine | H04L 41/022 709/225 |
| 2015/0288767 | A1* | 10/2015 | Fargano | H04L 43/08 709/227 |
| 2016/0337172 | A1* | 11/2016 | Yu | H04L 12/6418 |
| 2017/0012898 | A1* | 1/2017 | Zhu | H04L 12/6418 |

OTHER PUBLICATIONS

Hp et al: "Architecture changes in section 5;NFVMAN(14)000157_NFV_MANO_Section_5_changes", ETSI Draft; NFV MAN(14)000157_NFV_MANO_Section_5_Changes, European Telecommunications Standards Institute (ETSI), 650, Route Des Lucioles; F-06921 Sophia-Antipolis ; France, vol. ISG, Mar. 18, 2014 (Mar. 18, 2014), 6 pages.

Ericsson: "Appendix: Addressing implications of separating network service orchestration and resource orchestration;NFV-MAN(14)000224_Appendix_Addressing_Implications_of_separating_network_serv", ETSI Draft; NFVMAN(14)000224_Appendix_Addressing_Implications_of_Separating_Network_Serv, European Telecommunications Standards Institute (ETSI), 650,— Route Des Lucioles ; F-06921 Sophia-Antipolis ; France, vol. ISG-NFV, Apr. 9, 2014 (Apr. 9, 2014), 2 pages.

"Network Function Virtualization (NFV) Management and Orchestration;NFV-MAN001v044-clean", ETSI Draft; NFV-MAN001V044-Clean, European Telecommunications Standards Institute (ETSI), 650, Route Des Lucioles ; F-06921 Sophia-Antipolis ; France, vol. ISG, No. V0.4.4, May 9, 2014 (May 9, 2014), 178 pages.

Chen et al, "NFV in Mobile Core Network: Problems and Practice", ZTE Technology Journal, vol. 20 No. 3, Jun. 2014, 4 pages.

Bhumip et al., "Virtualizing Network Service Functions: Impact on ICT Transformation and Standardization", ZTE Communications, vol. 11 No. 4, Dec. 2013, 7 pages.

* cited by examiner

NETWORK FUNCTIONS VIRTUALIZATION NETWORK SYSTEM AND DATA PROCESSING METHOD, AND APPARATUS

CROSS-REFERENCE TO RELATED APPLICATIONS

This application is a continuation of International Application No. PCT/CN2014/077581, filed on May 15, 2014, the disclosure of which is hereby incorporated by reference in its entirety.

TECHNICAL FIELD

The present invention relates to the communications field, and in particular, to a network functions virtualization network system, a network functions virtualization network data processing method, and an apparatus.

BACKGROUND

A network functions virtualization network is a communications network that virtualizes a function of a physical entity device in a communications network, that is, the function of the physical entity device in the communications network is implemented on at least one physical server by using only software or by using a combination of software and hardware. The physical entity device may be a radio access network device, a core network device, or the like. A functional unit configured to implement the physical entity device in the communications network on the at least one physical server may be referred to as a virtualized network node. A physical server may include at least one virtualized network node, and a virtualized network node may be a server group including multiple physical servers.

In the prior art, the network functions virtualization network includes an operation support system (OSS) node, an element management system (EMS) node, a virtualized network function (VNF) node, a network functions virtualization orchestrator (NFVO) node, a virtualized network function manager (VNFM) node, a virtualized infrastructure manager (VIM) node, a network functions virtualization infrastructure (NFVI) node, and the like. The OSS node is an integrated operator system that supports information resource sharing. The EMS node is a system that manages one or more virtualized network nodes, and is configured to implement a fault management, configuration management, accounting management, performance management, security management (FCAPS) function for a VNF. The VNF node is configured to implement a physical network function (PNF), and may be a mobility management entity, a base station, or the like. The NFVI node is configured to provide a virtual resource for the VNF node. The NFVO node is configured to implement a network service orchestration function and a resource management orchestration function. The VNFM node is configured to manage a life cycle of a VNF instance. The VIM node is configured to control and manage a computing resource, a storage resource, a network resource, and virtualized entities of the computing resource, the storage resource, and the network resource.

However, an NFVO includes some functions of defining a network service and abstracting a resource requirement of a VNF. The network service belongs to the scope of network operation maintenance and management, and resource management of an abstracted network functions virtualization platform layer (an NFVI) not only includes centralized global resource management, but also includes a function of allocating a local virtualized resource function in a coordinated manner. The two main function requirements, a network service orchestration function and a resource management orchestration function, are coupled and completed in the same function entity NFVO, which causes a difficulty in deployment. For example, it cannot be ensured that a hierarchical resource management model of the NFVI and a planning function of a network service instance are always deployed in a same logic entity. For example, in a large-scale network architecture, a granularity for deploying a resource management orchestration function entity is much finer than a granularity for deploying a network service orchestration function entity. In addition, different from the resource management orchestration function entity, the network service orchestration function entity may be tightly coupled to an OSS for deployment.

SUMMARY

Embodiments of the present invention provide a network functions virtualization network system, a network functions virtualization network data processing method, and an apparatus, which can make deployment of a network service orchestration function and a resource management orchestration function of a network functions virtualization network more flexible.

To achieve the foregoing objective, the following technical solutions are used in the embodiments of the present invention.

According to a first aspect, a network functions virtualization (NFV) network system is provided, including: a network service orchestration (NSO) node, a resource management orchestration (RO) node, a first network node, a virtualized network function manager (VNFM) node, a virtualized infrastructure manager (VIM) node, a catalog, a network functions virtualization (NFV) instance, and a network functions virtualization infrastructure (NFVI) resource, where the catalog includes a network service (NS) catalog and a virtualized network function (VNF) catalog, and the first network node is an operation support system (OSS) or a third-party software system;

the NSO node is connected to the first network node by using an operation support-network service orchestration interface, the NSO node is connected to the RO node by using a network service orchestration-resource management orchestration interface, and the NSO node is connected to the catalog; and the RO node is connected to the first network node by using an operation support-resource management orchestration interface, the RO node is connected to the VNFM node, the RO node is connected to the VIM node, and the RO node is separately connected to the catalog, the network functions virtualization instance, and the network functions virtualization infrastructure resource.

With reference to the first aspect, in a first implementable manner, the NFV network system further includes:

N RO nodes and M VIM nodes, where N is an integer greater than or equal to 1, and M is an integer greater than or equal to 1;

when N is equal to 1, and M is equal to 1, the NSO node is connected to the RO node, and the RO node is connected to the VIM node;

when N is equal to 1, and M is greater than or equal to 2, the NSO node is connected to the RO node, and the RO node is connected to each of the VIM nodes; and when N is greater than or equal to 2, and M is greater than or equal to 1, the NSO node is connected to one of the RO nodes, the RO node is separately connected to N-1 RO nodes, and each one of the N-1 RO nodes is connected to at least one of the VIM nodes.

With reference to the first aspect, in a second implementable manner, the NFV network system further includes:

N RO nodes and M VIM nodes, where N is an integer greater than or equal to 1, and M is an integer greater than or equal to 1;

when N is equal to 1, and M is equal to 1, the NSO node is connected to the RO node, and the RO node is connected to the VIM node;

when N is equal to 1, and M is greater than or equal to 2, the NSO node is connected to the RO node, and the RO node is connected to each of the VIM nodes; and when N is greater than or equal to 2, and M is greater than or equal to 1, the NSO node is connected to each of the RO nodes, and each of the RO nodes is connected to at least one of the VIM nodes.

With reference to the first implementable manner or the second implementable manner, in a third implementable manner, the NSO node is connected to the VNFM node.

With reference to any one of the first aspect or the first implementable manner to the third implementable manner, in a fourth implementable manner, the NSO node is separately connected to the network functions virtualization instance and the network functions virtualization infrastructure resource.

With reference to any one of the first aspect or the first implementable manner to the fourth implementable manner, in a fifth implementable manner, the NFV network system further includes:

a network service logic (NSL) catalog, where the NSL catalog stores network service policy information, and the network service policy information includes logical data about network service deployment, user-related data, and policy information, where the NSO node is connected to the NSL catalog.

With reference to any one of the first aspect or the first implementable manner to the fifth implementable manner, in a sixth implementable manner, the NSO node has at least one of network service functions, and the network service functions include:

automatically configuring a network service requirement;

managing uploading of a network service and a virtualized network function (VNF) node;

starting a network service and managing a life cycle of a network service;

managing VNF instantiation in cooperation with the VNFM node;

obtaining information about an NFVI related to a network service and a VNF node resource by performing a query by using the RO node or the VNFM node;

managing integrity and validity of a network service instance during an execution cycle;

managing a relationship between a network service instance and a VNF instance;

managing a topology of a network service instance;

managing automatic configuration of a network service instance;

managing policy information related to a network service; and managing a fault of a network service.

With reference to any one of the first aspect or the first implementable manner to the sixth implementable manner, in a seventh implementable manner, the RO node has at least one of a global resource management function or a coordinated virtualized resource management allocation function, and the global resource management function and the coordinated virtualized resource management allocation function include:

maintaining and managing a resource network topological view;

authenticating and authorizing an NFVI resource request, where NFVI resource are distributed in multiple VIM nodes;

managing a network service instance and distribution, reservation, and configuration of an NFVI resource corresponding to a VNF instance;

managing a VNF instance, and managing a relationship between a VNF instance and an NFVI resource allocated to the VNF instance;

managing a policy and managing execution of a network service instance and a VNF instance;

recording a view related to an NFVI resource used by a VNF instance or a VNF instance group; and managing a fault of an NFVI resource.

According to a second aspect, a network functions virtualization network data processing method is provided, where the network functions virtualization network data processing method is applied to a network service orchestration (NSO) node, and the method includes:

receiving a network service requirement message sent by a first network node, where the network service requirement message includes a network service requirement, the network service requirement is a parameter value required for deploying a virtualized network function (VNF) node, and the first network node is an operation support system (OSS) or a third-party software system;

generating a second configuration file according to the network service requirement and a first configuration file, where the first configuration file is a configuration file that describes the VNF node, and the second configuration file is a configuration file that describes a network service;

sending a second configuration file message to a resource management orchestration (RO) node, where the second configuration file message includes the second configuration file; and receiving a second configuration file configuration response message sent by the RO node.

With reference to the second aspect, in a first implementable manner, before the generating a second configuration file according to the network service requirement and a first configuration file, the method further includes:

querying a catalog, to obtain the first configuration file from the catalog, where the NSO node is connected to the catalog, and the catalog includes a network service (NS) catalog and a virtualized network function (VNF) catalog.

With reference to the second aspect, in a second implementable manner, before the generating a second configuration file according to the network service requirement and a first configuration file, the method further includes:

sending a catalog query request message to the RO node; and receiving a catalog query request response message sent by the RO node, where the catalog query request response message includes the first configuration file.

With reference to the first implementable manner or the second implementable manner, in a third implementable manner, the NSO node is connected to two or more RO nodes, and the sending a second configuration file message to a resource management orchestration (RO) node includes:

sending the second configuration file message to at least one of the RO nodes according to a locally stored network functions virtualization network resource global view, where the second configuration file includes network service-related information, virtualized network node-related information, virtualized network node feature-related information, and user subscription-related information, where the network service-related information includes a network service type, a network service capacity requirement, and a network scale policy; the virtualized network node-related information includes a virtualized network node type, a virtualized network node capacity requirement, a virtualized network node deployment location, and a virtualized network node interconnection link requirement; the virtualized network node feature-related information includes a virtualized network node channel quantity and a virtualized network node service area setting; and the user subscription-related information includes a user quantity, a network selection policy, and quality of service.

With reference to the first implementable manner or the second implementable manner, in a fourth implementable manner, the NSO node is connected to one RO node, the RO node is connected to at least one RO node, and the sending a second configuration file message to a resource management orchestration (RO) node includes:

sending the second configuration file message to the RO node, where the second configuration file includes network service-related information, virtualized network node-related information, virtualized network node feature-related information, and user subscription-related information, where the network service-related information includes a network service type, a network service capacity requirement, and a network scale policy; the virtualized network node-related information includes a virtualized network node type, a virtualized network node capacity requirement, a virtualized network node deployment location, and a virtualized network node interconnection link requirement; the virtualized network node feature-related information includes a virtualized network node channel quantity and a virtualized network node service area setting; and the user subscription-related information includes a user quantity, a network selection policy, and quality of service.

With reference to the third implementable manner or the fourth implementable manner, in a fifth implementable manner, after the receiving a second configuration file configuration response message sent by the RO node, the method further includes:

sending a network service instantiation request message to the RO node.

With reference to the fifth implementable manner, in a sixth implementable manner, after the sending a network service instantiation request message to the RO node, the method further includes:

receiving a network service modification requirement message sent by the first network node, where the network service modification requirement message includes a network service modification requirement, and the network service modification requirement is configuring the network service, updating the network service, or terminating the network service.

With reference to the sixth implementable manner, in a seventh implementable manner, after the receiving a network service modification requirement message sent by the first network node, the method further includes:

obtaining network service information from the catalog and a network functions virtualization infrastructure (NFVI) resource, where the network service information includes a state and load of the network service, and the NSO node is separately connected to the catalog and the network functions virtualization infrastructure resource; or obtaining network service information from the catalog and a network functions virtualization infrastructure (NFVI) resource by using the RO node, where the network service information includes a state and load of the network service.

With reference to the seventh implementable manner, in an eighth implementable manner, after the querying for network service information, the method further includes:

sending a network service information query response message to the first network node.

With reference to any one of the second aspect or the first implementable manner to the eighth implementable manner, in a ninth implementable manner, after the receiving a second configuration file configuration response message sent by the RO node, the method further includes:

managing a topology of a network service instance;

managing automatic configuration of the network service instance;

managing network service policy information; and managing a fault of the network service.

According to a third aspect, a network functions virtualization network data processing method is provided, where the network functions virtualization network data processing method is applied to a resource management orchestration (RO) node, and the method includes:

receiving a catalog query request message sent by a network service orchestration (NSO) node;

querying a catalog, to obtain a first configuration file;

sending a catalog query request response message to the NSO node, where the catalog query request response message includes the first configuration file;

receiving a second configuration file message sent by the NSO node, where the second configuration file message includes a second configuration file, and the second configuration file is a configuration file that describes a network service; and sending a second configuration file response message to the NSO node.

With reference to the third aspect, in a first implementable manner, after the receiving a second configuration file message sent by the NSO node, the method further includes:

receiving a network service instantiation request message sent by the NSO node.

With reference to the third aspect or the first implementable manner, in a second implementable manner, the method further includes:

managing a fault of an NFVI resource.

With reference to any one of the third aspect or the first implementable manner to the second implementable manner, in a third implementable manner, the method further includes:

sending NFVI resource fault info/Elation or NFVI resource global view information to a first network node, where the first network node is an operation support system (OSS) or a third-party software system.

According to a fourth aspect, a network service orchestration (NSO) node is provided, including:

a first receiving unit, configured to receive a network service requirement message sent by a first network node, where the network service requirement message includes a network service requirement, the network service requirement is a parameter value required for deploying a virtualized network function (VNF) node, and the first network node is an operation support system (OSS) or a third-party software system;

a generation unit, configured to generate a second configuration file according to the network service requirement and a first configuration file, where the first configuration file is a configuration file that describes the VNF node, and the second configuration file is a configuration file that describes a network service;

a first sending unit, configured to send a second configuration file message to a resource management orchestration (RO) node, where the second configuration file message includes the second configuration file; and a second receiving unit, configured to receive a second configuration file configuration response message sent by the RO node.

With reference to the fourth aspect, in a first implementable manner, the NSO node further includes:

a query unit, configured to query a catalog, to obtain the first configuration file from the catalog, where the NSO node is connected to the catalog, and the catalog includes a network service (NS) catalog and a virtualized network function (VNF) catalog.

With reference to the fourth aspect, in a second implementable manner, the NSO node further includes:

a second sending unit, configured to send a catalog query request message to the RO node; and a third receiving unit, configured to receive a catalog query request response message sent by the RO node, where the catalog query request response message includes the first configuration file.

With reference to the first implementable manner or the second implementable manner, in a third implementable manner, the NSO node is connected to two or more RO nodes, and the first sending unit is further configured to:

send the second configuration file message to at least one of the RO nodes according to a locally stored network functions virtualization network resource global view, where the second configuration file includes network service-related information, virtualized network node-related information, virtualized network node feature-related information, and user subscription-related information, where the network service-related information includes a network service type, a network service capacity requirement, and a network scale policy; the virtualized network node-related information includes a virtualized network node type, a virtualized network node capacity requirement, a virtualized network node deployment location, and a virtualized network node interconnection link requirement; the virtualized network node feature-related information includes a virtualized network node channel quantity and a virtualized network node service area setting; and the user subscription-related information includes a user quantity, a network selection policy, and quality of service.

With reference to the first implementable manner or the second implementable manner, in a fourth implementable manner, the NSO node is connected to one RO node, the RO node is connected to at least one RO node, and the first sending unit is further configured to:

send the second configuration file message to the RO node, where the second configuration file includes network service-related information, virtualized network node-related information, virtualized network node feature-related information, and user subscription-related information, where the network service-related information includes a network service type, a network service capacity requirement, and a network scale policy; the virtualized network node-related information includes a virtualized network node type, a virtualized network node capacity requirement, a virtualized network node deployment location, and a virtualized network node interconnection link requirement; the virtualized network node feature-related information includes a virtualized network node channel quantity and a virtualized network node service area setting; and the user subscription-related information includes a user quantity, a network selection policy, and quality of service.

With reference to the third implementable manner or the fourth implementable manner, in a fifth implementable manner, the NSO node further includes:

a third sending unit, configured to send a network service instantiation request message to the RO node.

With reference to the fifth implementable manner, in a sixth implementable manner, the NSO node further includes:

a fourth receiving unit, configured to receive a network service modification requirement message sent by the first network node, where the network service modification requirement message includes a network service modification requirement, and the network service modification requirement is configuring the network service, updating the network service, or terminating the network service.

With reference to the sixth implementable manner, in a seventh implementable manner, the NSO node further includes:

an obtaining unit, configured to obtain network service information from the catalog and a network functions virtualization infrastructure (NFVI) resource, where the network service information includes a state and load of the network service, and the NSO node is separately connected to the catalog and the network functions virtualization infrastructure resource; or obtain network service information from the catalog and a network functions virtualization infrastructure (NFVI) resource by using the RO node, where the network service information includes a state and load of the network service.

With reference to the seventh implementable manner, in an eighth implementable manner, the NSO node further includes:

a fourth sending unit, configured to send a network service information query response message to the first network node.

With reference to any one of the fourth aspect or the first implementable manner to the eighth implementable manner, in a ninth implementable manner, the NSO node further includes:

a management unit, configured to manage a topology of a network service instance, where the management unit is further configured to manage automatic configuration of the network service instance;

the management unit is further configured to manage network service policy information; and the management unit is further configured to manage a fault of the network service.

According to a fifth aspect, a resource management orchestration (RO) node is provided, including:

a first receiving unit, configured to receive a catalog query request message sent by a network service orchestration (NSO) node;

a query unit, configured to query a catalog, to obtain a first configuration file;

a first sending unit, configured to send a catalog query request response message to the NSO node, where the catalog query request response message includes the first configuration file;

a second receiving unit, configured to receive a second configuration file message sent by the NSO node, where the second configuration file message includes a second configuration file, and the second configuration file is a configuration file that describes a network service; and a second sending unit, configured to send a second configuration file response message to the NSO node.

With reference to the fifth aspect, in a first implementable manner, the RO node further includes:

a third receiving unit, configured to receive a network service instantiation request message sent by the NSO node.

With reference to the fifth aspect or the first implementable manner, in a second implementable manner, the RO node further includes:

a management unit, configured to manage a fault of an NFVI resource.

With reference to any one of the fifth aspect or the first implementable manner to the second implementable manner, in a third implementable manner, the RO node further includes:

a third sending unit, configured to send NFVI resource fault information or NFVI resource global view information to a first network node, where the first network node is an operation support system (OSS) or a third-party software system.

The embodiments of the present invention provide a network functions virtualization network system, a network functions virtualization network data processing method, and an apparatus. The network functions virtualization network system includes: a network service orchestration (NSO) node, a resource management orchestration (RO) node, a first network node, a virtualized network function manager (VNFM) node, a virtualized infrastructure manager (VIM) node, a catalog, a network functions virtualization (NFV) instance, and a network functions virtualization infrastructure (NFVI) resource, where the catalog includes a network service (NS) catalog and a virtualized network function (VNF) catalog, and the first network node is an operation support system (OSS) or a third-party software system; the NSO node is connected to the first network node by using an operation support-network service orchestration interface, the NSO node is connected to the RO node by using a network service orchestration-resource management orchestration interface, and the NSO node is connected to the catalog; and the RO node is connected to the first network node by using an operation support-resource management orchestration interface, the RO node is connected to the VNFM node, the RO node is connected to the VIM node, and the RO node is separately connected to the catalog, the network functions virtualization instance, and the network functions virtualization infrastructure resource. In this way, a network service orchestration function in the prior art is implemented by using the NSO node, and a resource management orchestration function in the prior art is implemented by using the RO node, which can make deployment of the network service orchestration function and the resource management orchestration function of a network functions virtualization network more flexible compared with the prior art.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
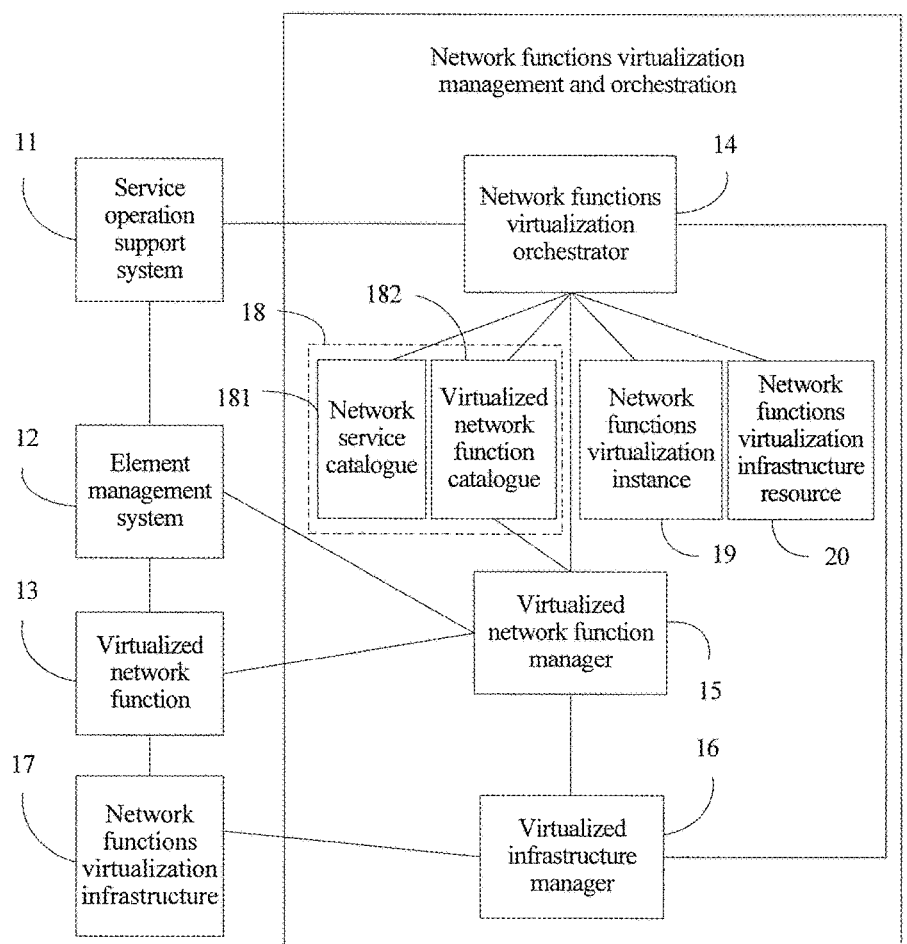
FIG. 1 is a schematic architectural diagram of a logical function of a network functions virtualization network in the prior art according to an embodiment of the present invention.

As shown in FIG. 1, a schematic architectural diagram of a logical function of a network functions virtualization network based on a cloud system is provided in the prior art. The network functions virtualization network includes an operation support system (OSS) node 11, an element management system (EMS) node 12, a virtualized network function (VNF) node 13, a network functions virtualization orchestrator (NFVO) node 14, a virtualized network function manager (VNFM) node 15, a virtualized infrastructure manager (VIM) node 16, a network functions virtualization infrastructure (NFVI) node 17, a catalog 18, a network functions virtualization (NFV) instance 19, and a network functions virtualization infrastructure (NFVI) resource 20. The catalog includes a network service (NS) catalog 181 and a virtualized network function (VNF) catalog 182. The operation support system 11 is separately connected to the element management system 12 and the network functions virtualization orchestrator 14. The element management system 12 is separately connected to the virtualized network function 13 and the virtualized network function manager 15. The virtualized network function 13 is separately connected to the network functions virtualization infrastructure 17 and the virtualized network function manager 15. The network functions virtualization orchestrator 14 is separately connected to the virtualized network function manager 15, the virtualized infrastructure manager 16, the catalog 18, the network functions virtualization instance 19, and the network functions virtualization infrastructure resource 20. The virtualized network function manager 15 is separately connected to the virtualized infrastructure manager 16 and the virtualized network function catalog 182. The virtualized infrastructure manager 16 is connected to the network functions virtualization infrastructure 17.

It should be noted that, the NFVO node, the VNFM node, and the VIM node are included in a network functions virtualization management and orchestration (NFV-MANO). The network functions virtualization network may include at least one EMS node and at least one VNF node. Each VNF node may have a different function. A function of the EMS node and a function of the VNF node may be integrated into a physical device for implementation. The NFVI node of a bottom-layer support architecture includes a computing resource, a storage resource, and a transmission resource.

The cloud system mainly includes cloud computing and cloud storage. The cloud computing refers to distributed computing that sets server clusters in data centers in different places to provide different applications for users by using a network. The cloud storage refers to storing user data in the cloud instead of using a local resource, so as to achieve an objective of remote use and remote storage.

Particularly, the NFVO node is configured to implement a network service orchestration function and a resource management orchestration function. For example, it is assumed that a network service function needs to be implemented by using the network functions virtualization network. First, an operator may use the OSS node to manually configure a function of the VNF node according to a parameter value required by the VNF node and a configuration file such as a virtualized network function description (VNFD), to generate a network service description (NSD) configuration file. Then the OSS node may transmit the NSD configuration file to the NFVO node by using an OSS-NFVO interface. The NFVO node checks whether information such as a virtualized network function (VNF) package or a hosting element of a VNF exists in the NSD configuration file, and if information such as the virtualized network function (VNF) package or the hosting element of the VNF exists in the NSD configuration file, the NFVO node sends a network service authentication description message to the catalog, so that the catalog stores the NSD configuration file, and the NFVO node sends a network service description loading success response message to the OSS node. After the NFVO node successfully loads the NSD configuration file, the NFVO node allocates a resource to the VNF node by interacting with the VNFM node, the VIM node, the catalog 18, the NFV instance 19, and the NFVI resource 20, to implement network service instantiation.

Figure 2:
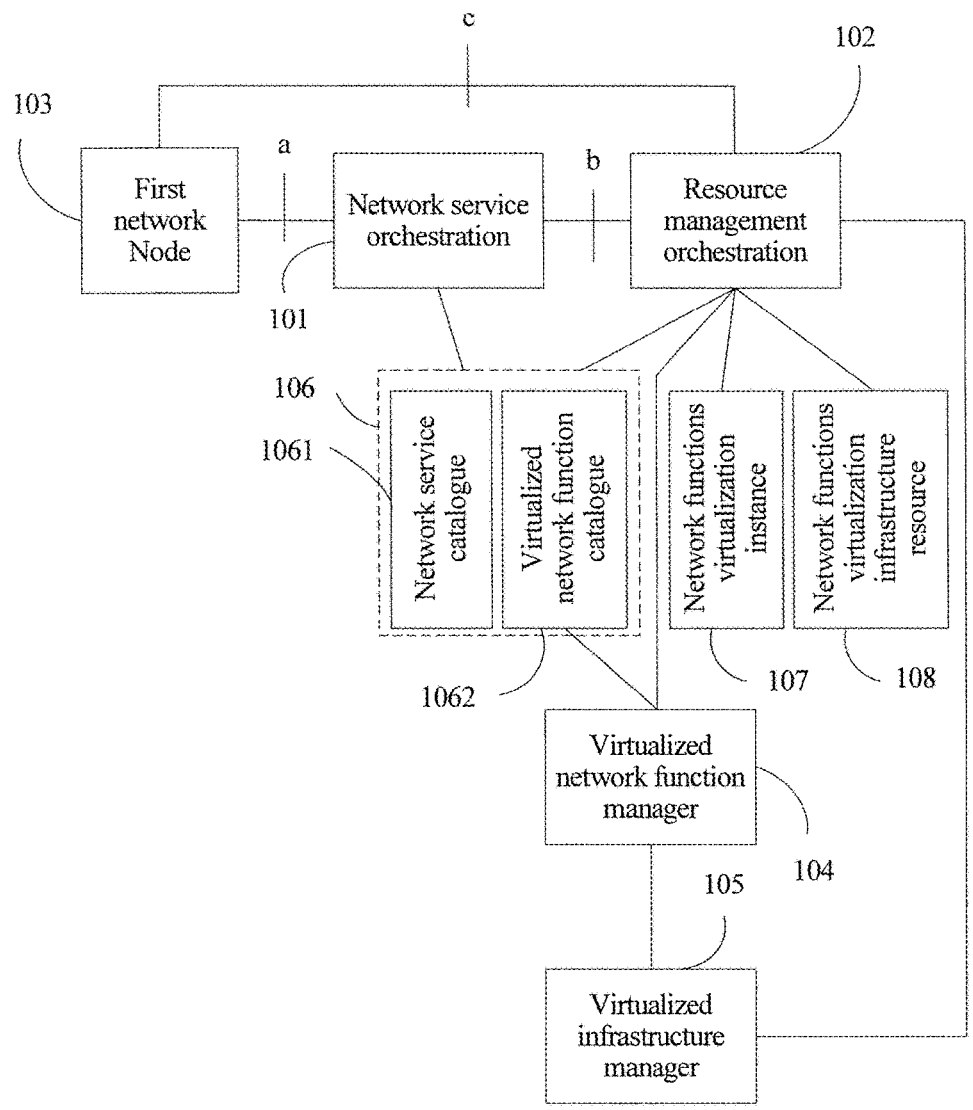
FIG. 2 is a schematic diagram 1 of a network functions virtualization network system according to an embodiment of the present invention.

An embodiment of the present invention provides a network functions virtualization (NFV) network system 10, as shown in FIG. 2, including:

a network service orchestration (NSO) node 101, a resource management orchestration (RO) node 102, a first network node 103, a virtualized network function manager (VNFM) node 104, a virtualized infrastructure manager (VIM) node 105, a catalog 106, a network functions virtualization (NFV) instance 107, and a network functions virtualization infrastructure (NFVI) resource 108, where the catalog includes a network service (NS) catalog 1061 and a virtualized network function (VNF) catalog 1062, and the first network node is an operation support system (OSS) or a third-party software system;

the NSO node 101 is connected to the first network node 103 by using an operation support-network service orchestration interface (OS-NSO) a, the NSO node 101 is connected to the RO node 102 by using a network service orchestration-resource management orchestration interface (NSO-RO) b, and the NSO node 101 is connected to the catalog 106; and the RO node 102 is connected to the first network node 103 by using an operation support-resource management orchestration interface (OS-RO) c, the RO node 102 is connected to the VNFM node 104, the RO node 102 is connected to the VIM node 105, and the RO node 102 is separately connected to the catalog 106, the network functions virtualization instance 107, and the network functions virtualization infrastructure resource 108.

It should be noted that, the NSO node 101 may be connected to the network service catalog 1061 included in the catalog, and the virtualized network function catalog 1062 may be connected to the VNFM node 104.

In this way, a network service orchestration function of an NFVO node in the prior art is implemented by using the NSO node, and a resource management orchestration function of the NFVO node in the prior art is implemented by using the RO node, which can make deployment of the network service orchestration function and the resource management orchestration function of a network functions virtualization network more flexible compared with the prior art.

It should be noted that, the network service catalog 1061 includes all network services that have been loaded; the virtualized network function catalog 1062 includes all virtualized network function packages (VNF Packages) that have been loaded; the network functions virtualization instance 107 includes all network service Instance and VNF Instance; and the network functions virtualization infrastructure resource 108 includes all available NFVI resource.

Figure 3:
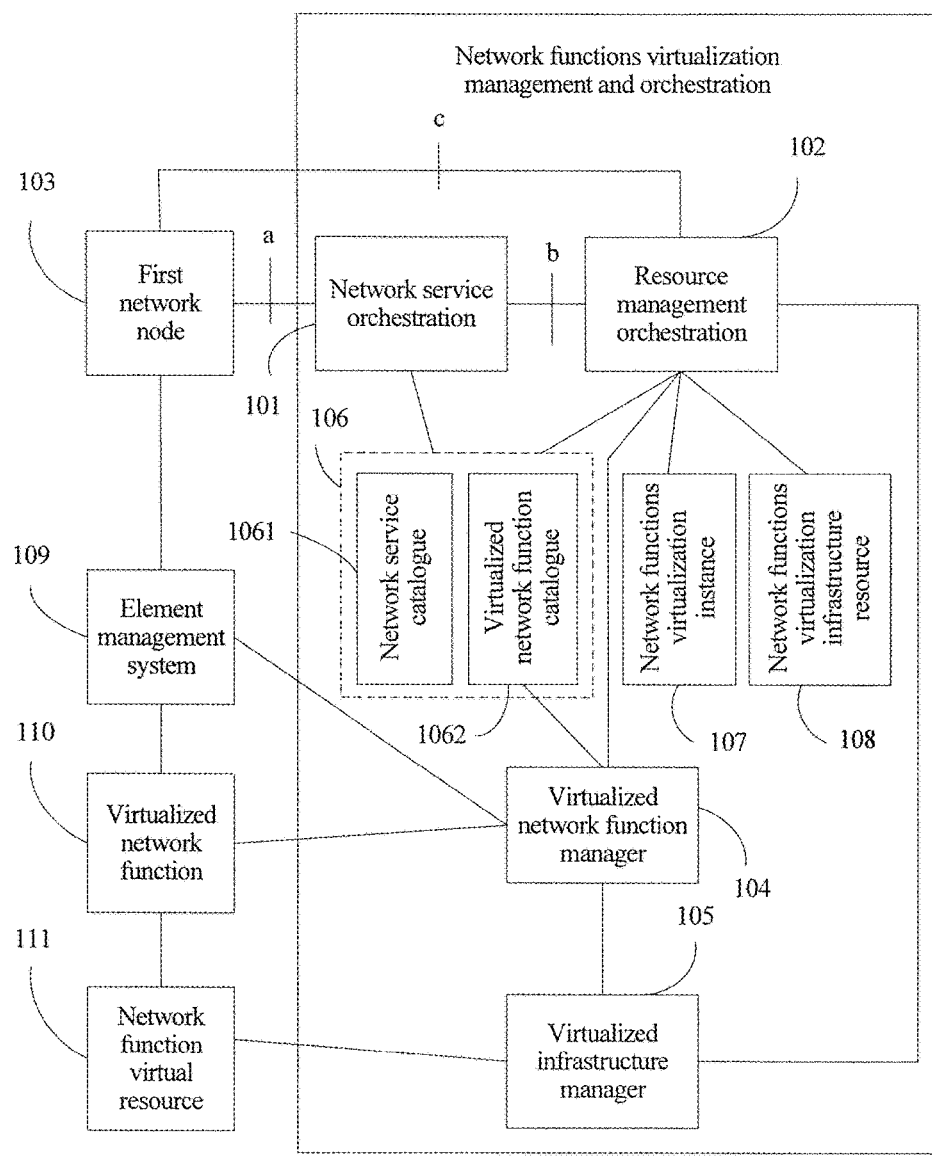
FIG. 3 is a schematic diagram 2 of a network functions virtualization network system according to an embodiment of the present invention.

As shown in FIG. 3, the NFV network system 10 further includes:

an element management system EMS node 109, a virtualized network function (VNF) node 110, and a network functions virtualization infrastructure NFVI node 111, where the EMS node 109 is separately connected to the first network node 103, the virtualized network function (VNF) node 110, and the VNFM node 104;

the VNF node 110 is separately connected to the VNFM node 104 and the network functions virtualization infrastructure NFVI node 111; and the NFVI node 111 is connected to the VIM node 105.

The NFVO node, the VNFM node, and the VIM node are included in a network functions virtualization management and orchestration (NFV-MANO). A function of the EMS node and a function of the VNF node may be integrated into a physical device for implementation. The NFVI node of a bottom-layer support architecture includes a computing resource, a storage resource, and a transmission resource. It should be noted that, the NSO node has at least one of network service functions, and the network service functions include:

automatically configuring a network service requirement;

managing uploading of a network service and a virtualized network function (VNF) node;

starting a network service and managing a life cycle of a network service;

managing VNF instantiation in cooperation with the VNFM node;

obtaining information about an NFVI related to a network service and a VNF node resource by performing a query by using the RO node or the VNFM node;

managing integrity and validity of a network service instance during an execution cycle;

managing a relationship between a network service instance and a VNF instance;

managing a topology of a network service instance;

managing automatic configuration of a network service instance;

managing policy information related to a network service; and managing a fault of a network service.

The RO node has at least one of a global resource management function or a coordinated virtualized resource management allocation function, and the global resource management function and the coordinated virtualized resource management allocation function include:

maintaining and managing a resource network topological view;

authenticating and authorizing an NFVI resource request, where NFVI resource are distributed in multiple VIM nodes;

managing a network service instance and distribution, reservation, and configuration of an NFVI resource corresponding to a VNF instance;

managing a VNF instance, and managing a relationship between a VNF instance and an NFVI resource allocated to the VNF instance;

managing a policy and managing execution of a network service instance and a VNF instance;

recording a view related to an NFVI resource used by a VNF instance or a VNF instance group; and managing a fault of an NFVI resource.

Figure 4:
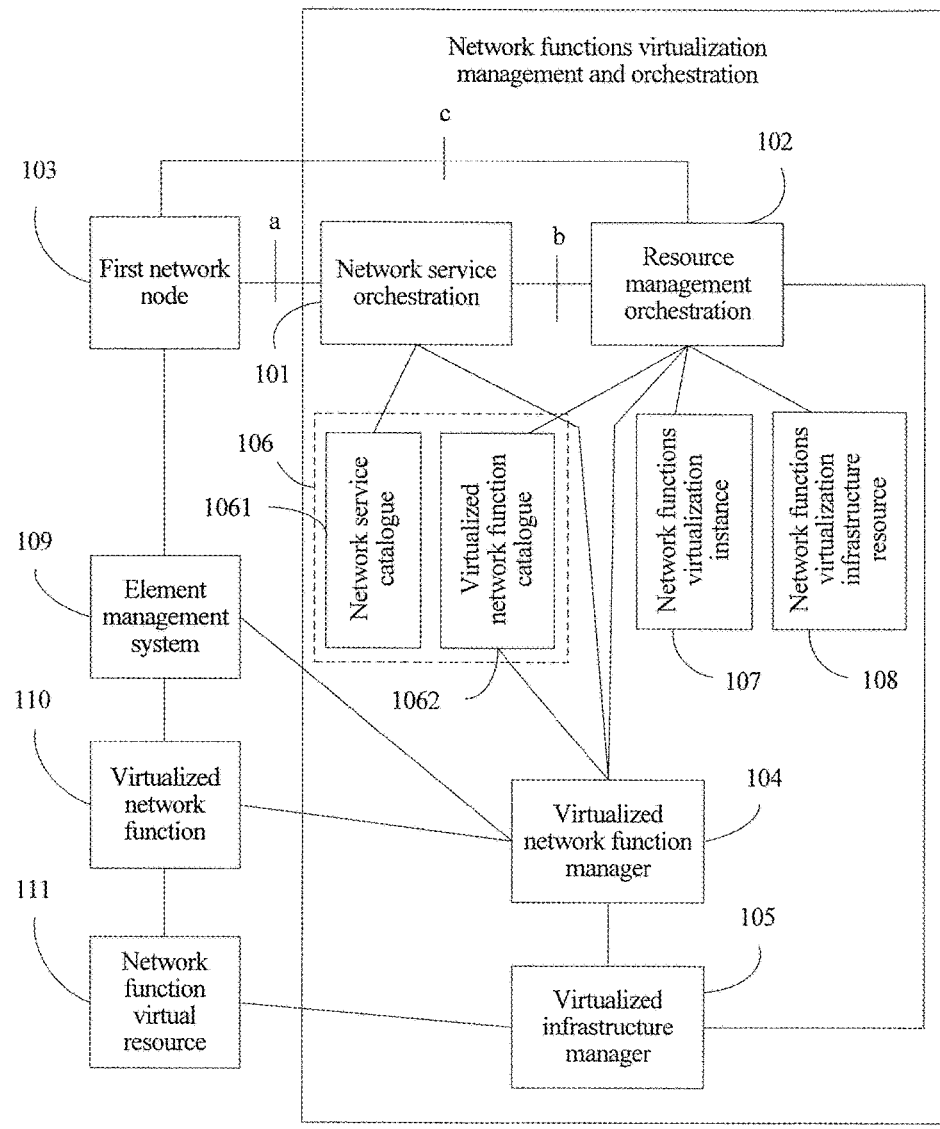
FIG. 4 is a schematic diagram 3 of a network functions virtualization network system according to an embodiment of the present invention.

Based on FIG. 3, as shown in FIG. 4, a difference from FIG. 3 lies in that the NSO node 101 in the NFV network system 10 may be connected to the VNFM node 104 according to an actual situation. In this way, the NSO node 101 can directly query for VNF instance information and the like from the VNFM node 104, or send a VNF instance management instruction, for example, establishing, expanding, updating, or terminating a VNF instance, to the VNFM node 104. If the NSO node 101 is not connected to the VNFM node 104, VNF instance management may be implemented by the RO node 102 by using the VNFM node 104.

Figure 5:
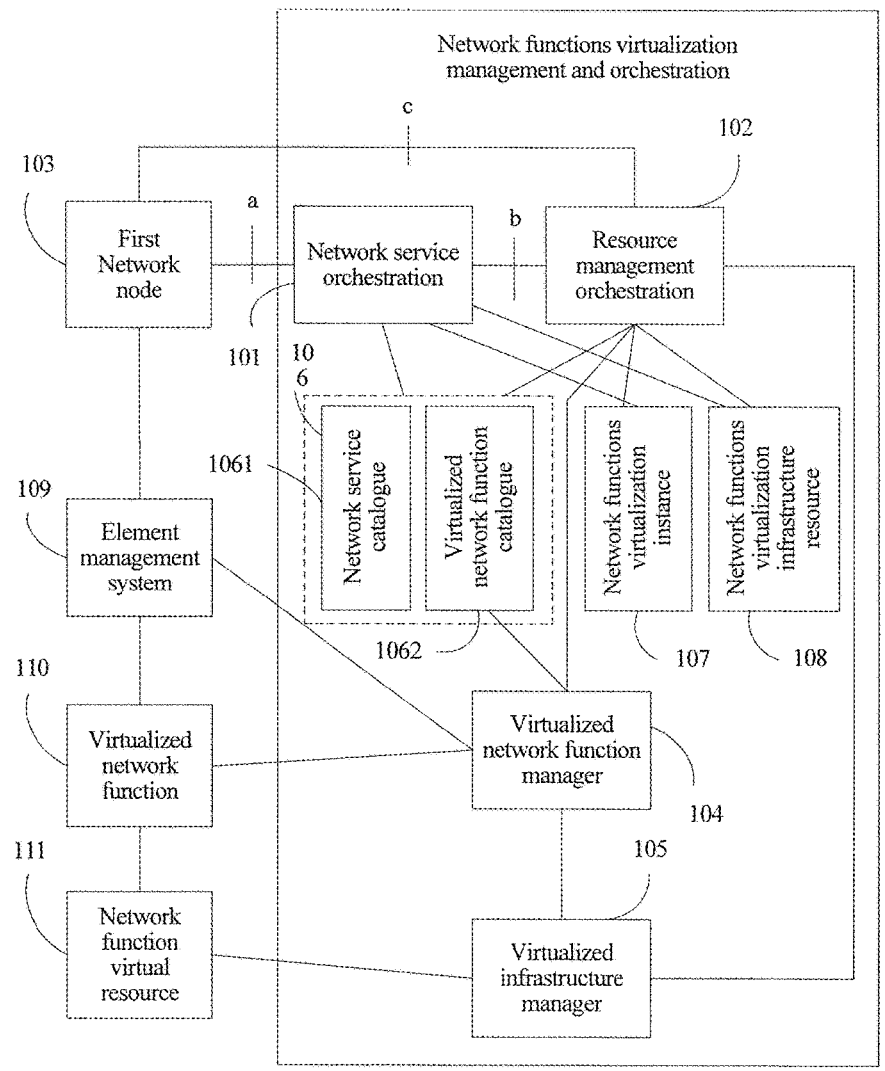
FIG. 5 is a schematic diagram 4 of a network functions virtualization network system according to an embodiment of the present invention.

Based on FIG. 3, as shown in FIG. 5, a difference from FIG. 3 lies in that the NSO node 101 may be connected to the catalog 106, the NFV instance 107, and the NFVI resource 108, and the RO node 102 may be connected to the catalog 106, the NFV instance 107, and the NFVI resource 108. That is, the NSO node 101 and the RO node 102 share the catalog 106, the NFV instance 107, and NFVI resource 108. The catalog includes the NS catalog 1061 and the VNF catalog 1062. In this way, deployment of the network service orchestration function and the resource management orchestration function of the network functions virtualization network can be more flexible.

Figure 6:
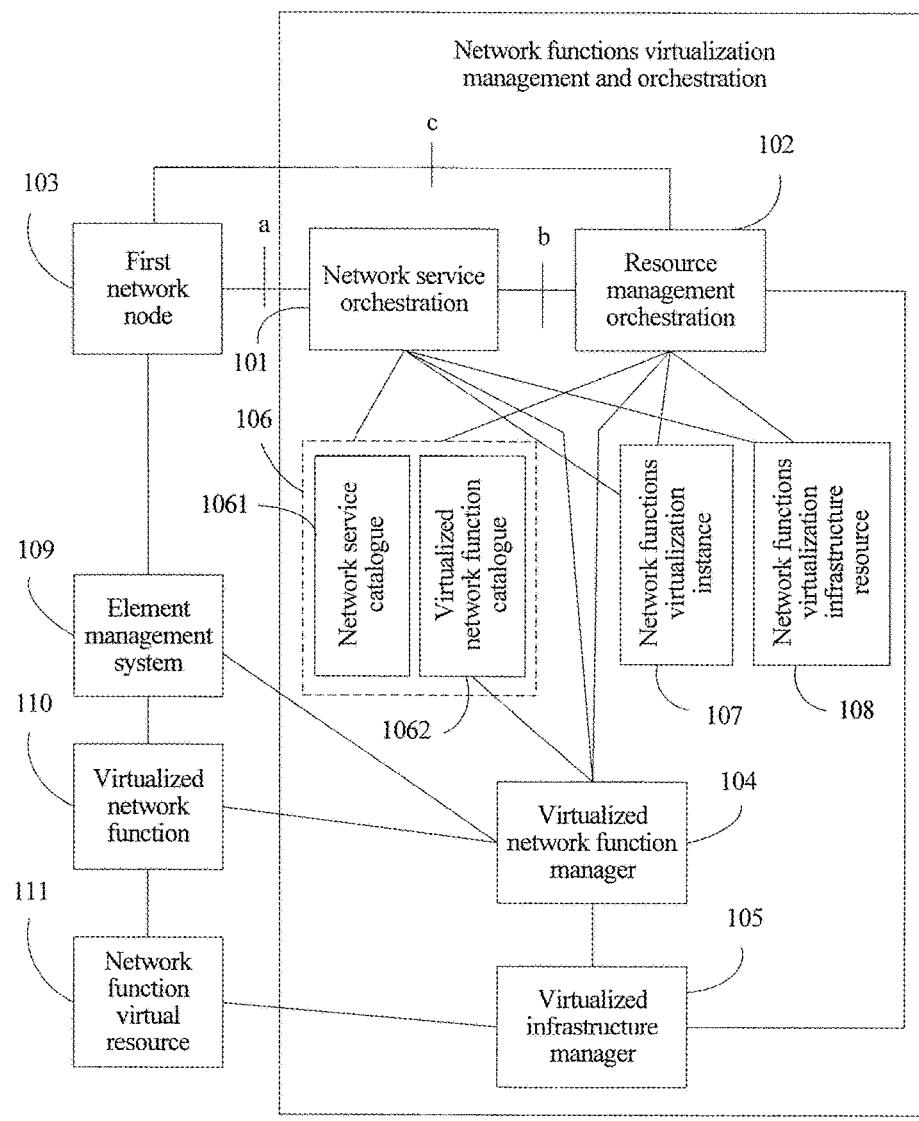
FIG. 6 is a schematic diagram 5 of a network functions virtualization network system according to an embodiment of the present invention.

Based on FIG. 3, as shown in FIG. 6, a difference from FIG. 3 lies in that the NSO node 101 in the NFV network system 10 may be connected to the VNFM node 104 according to an actual situation, the NSO node 101 may be connected to the catalog 106, the NFV instance 107, and the NFVI resource 108, and the RO node 102 may be connected to the catalog 106, the NFV instance 107, and the NFVI resource 108. That is, the NSO node 101 and the RO node 102 share the catalog 106, the NFV instance 107, and the NFVI resource 108. The catalog includes the NS catalog 1061 and the VNF catalog 1062.

Figure 7:
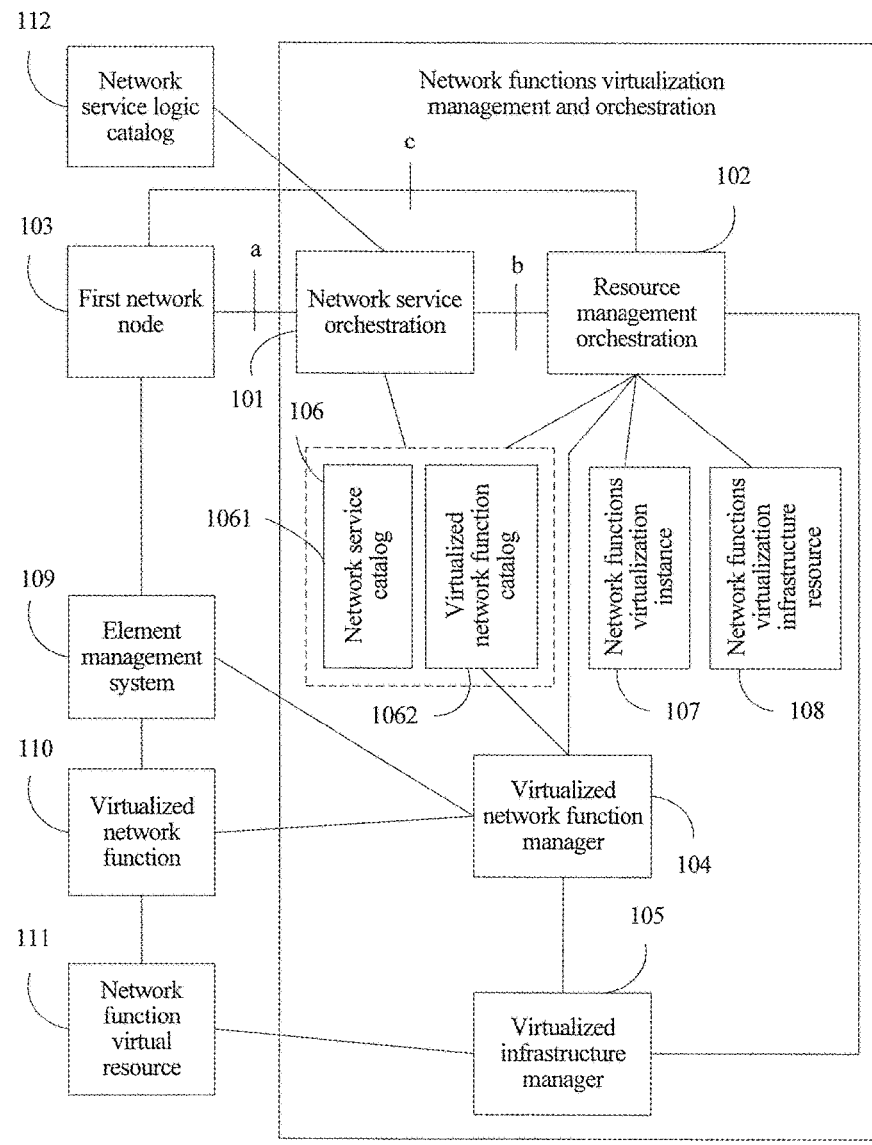
FIG. 7 is a schematic diagram 6 of a network functions virtualization network system according to an embodiment of the present invention.

Based on FIG. 3, as shown in FIG. 7, a difference from FIG. 3 lies in that the NFV network system 10 may further include a network service logic catalog (NSL) catalog 112. The NSL is used to store service logical data related to deployment, user-related data, and policy information, such as a network functions virtualization (NFV) network address, an IP address, a user network selection policy, quality of service (QoS) policy information, and mobility management entity (MME) selection policy information in a load balancing scenario. The NSO node 101 may be connected to the NSL catalog 112.

Figure 8:
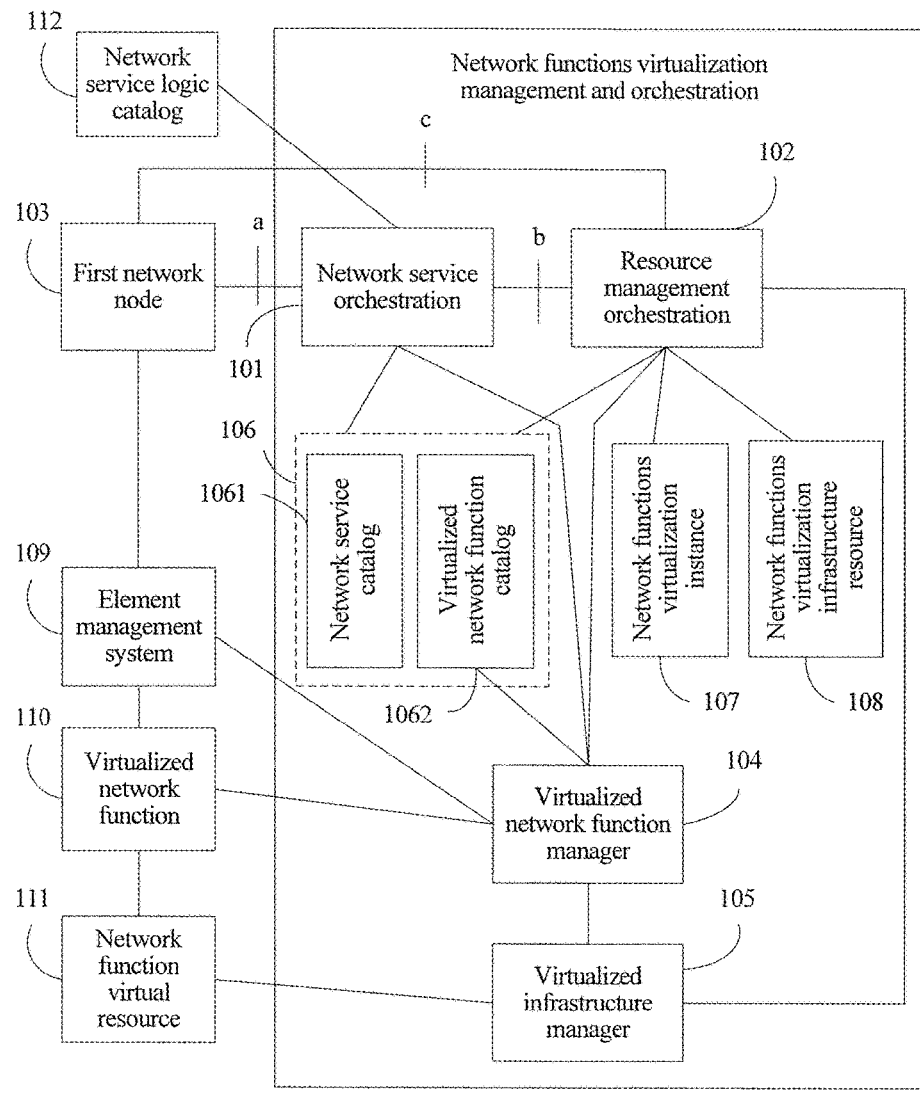
FIG. 8 is a schematic diagram 7 of a network functions virtualization network system according to an embodiment of the present invention.

Based on FIG. 4, as shown in FIG. 8, a difference from FIG. 4 lies in that the NFV network system 10 may further include a network service logic (NSL) catalog 112, and the NSO node 101 may be connected to the NSL catalog 112.

Figure 9:
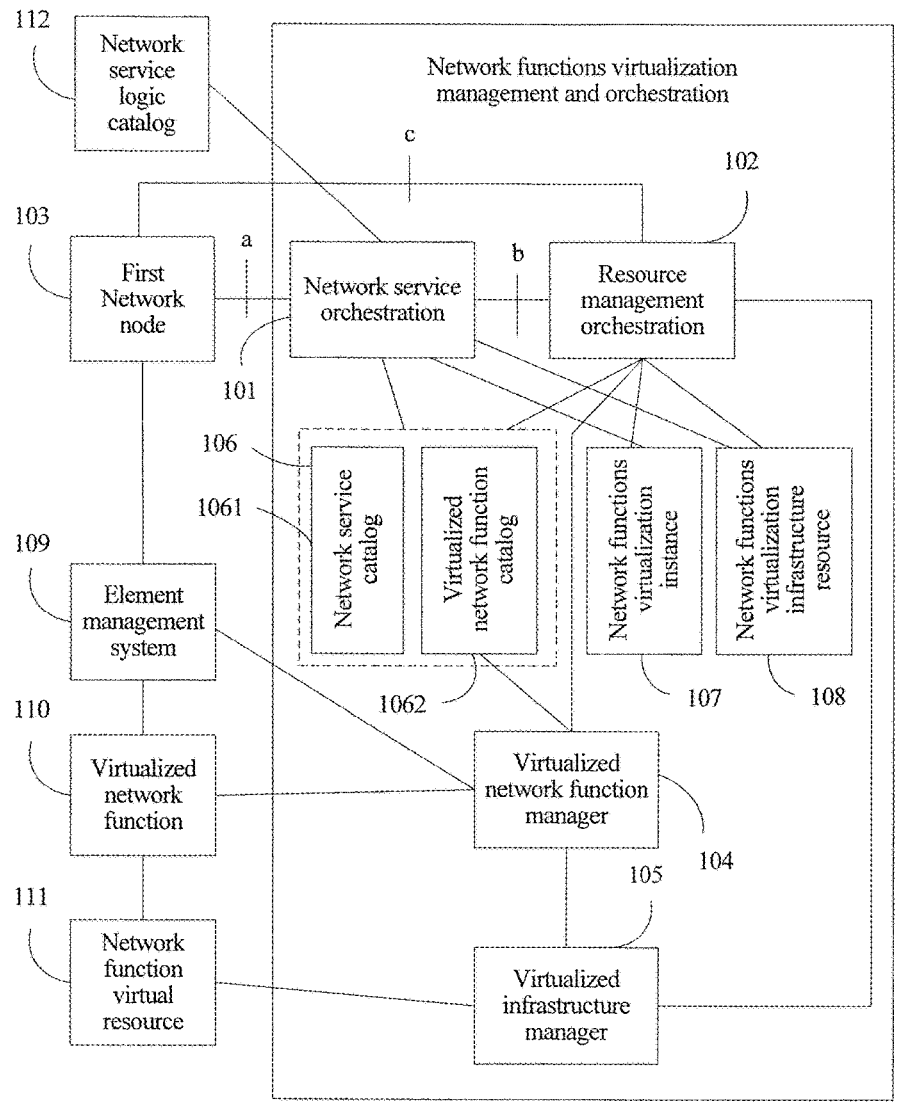
FIG. 9 is a schematic diagram 8 of a network functions virtualization network system according to an embodiment of the present invention.

Based on FIG. 5, as shown in FIG. 9, a difference from FIG. 5 lies in that the NFV network system 10 may further include a network service logic (NSL) catalog 112, and the NSO node 101 may be connected to the NSL catalog 112.

Figure 10:
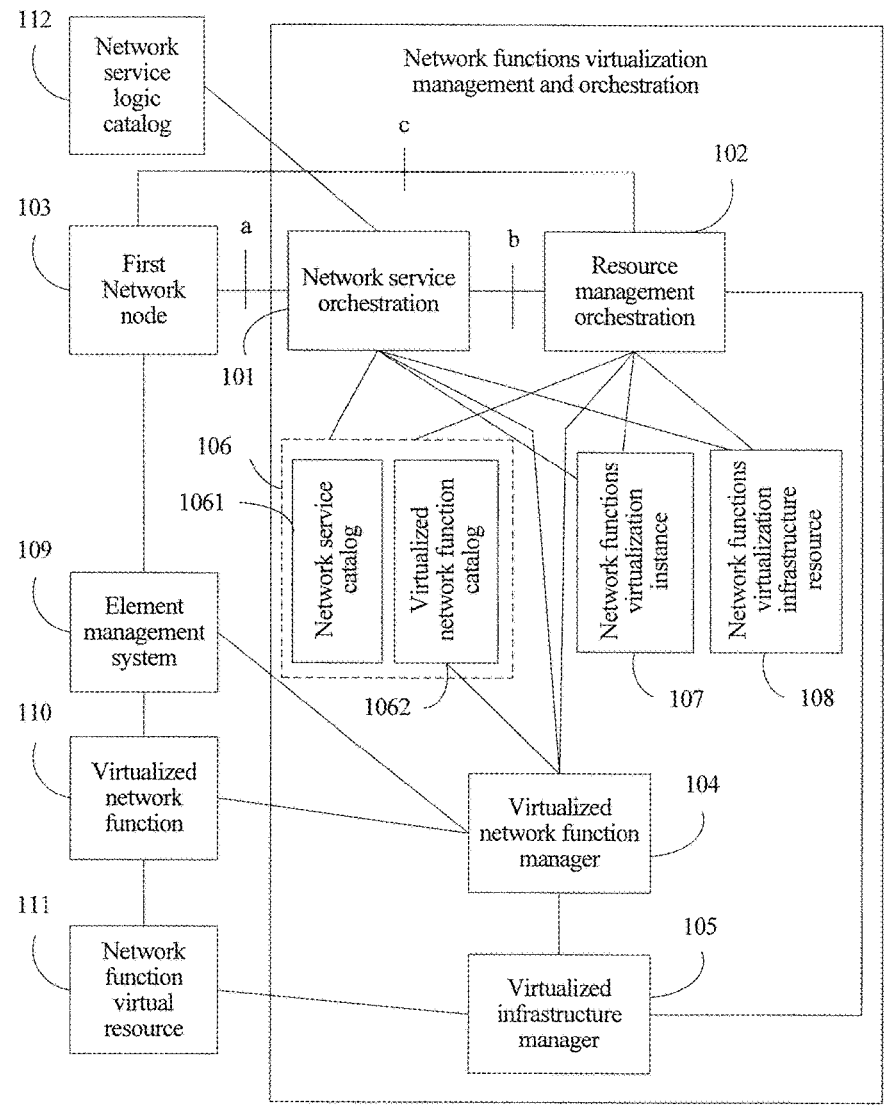
FIG. 10 is a schematic diagram 9 of a network functions virtualization network system according to an embodiment of the present invention.

Based on FIG. 6, as shown in FIG. 10, a difference from FIG. 6 lies in that the NFV network system 10 may further include a network service logic (NSL) catalog 112, and the NSO node 101 may be connected to the NSL catalog 112.

Further, the NFV network system may further include N RO nodes and M VIM nodes, where N is an integer greater than or equal to 1, and M is an integer greater than or equal to 1. The VIM nodes may be deployed in a cascading manner, and the RO nodes may be deployed in a cascading manner.

It is assumed that N is equal to 1 and M is equal to 2, that is, it is assumed that the NFV network system 10 includes two VIM nodes. The two VIM nodes are a first VIM node 1051 and a second VIM node 1052. The following connection manners may be used.

Figure 11:
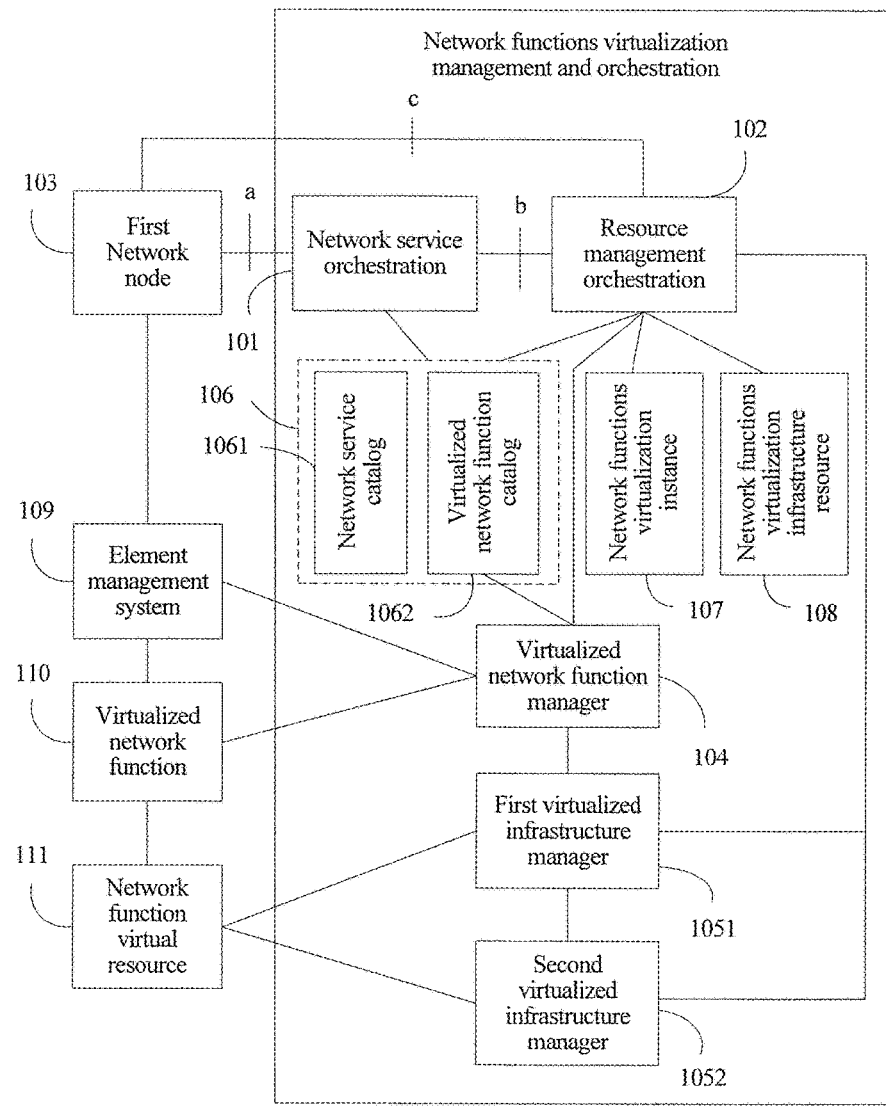
FIG. 11 is a schematic diagram 10 of a network functions virtualization network system according to an embodiment of the present invention.

Based on FIG. 3, as shown in FIG. 11, a difference from FIG. 3 lies in that the first VIM node 1051 is separately connected to the VNFM node 104, the NFVI node 111, and the RO node 102;

the second VIM node 1052 is separately connected to the NFVI node 111 and the RO node 102; and the first VIM node 1051 is connected to the second VIM node 1052.

Figure 12:
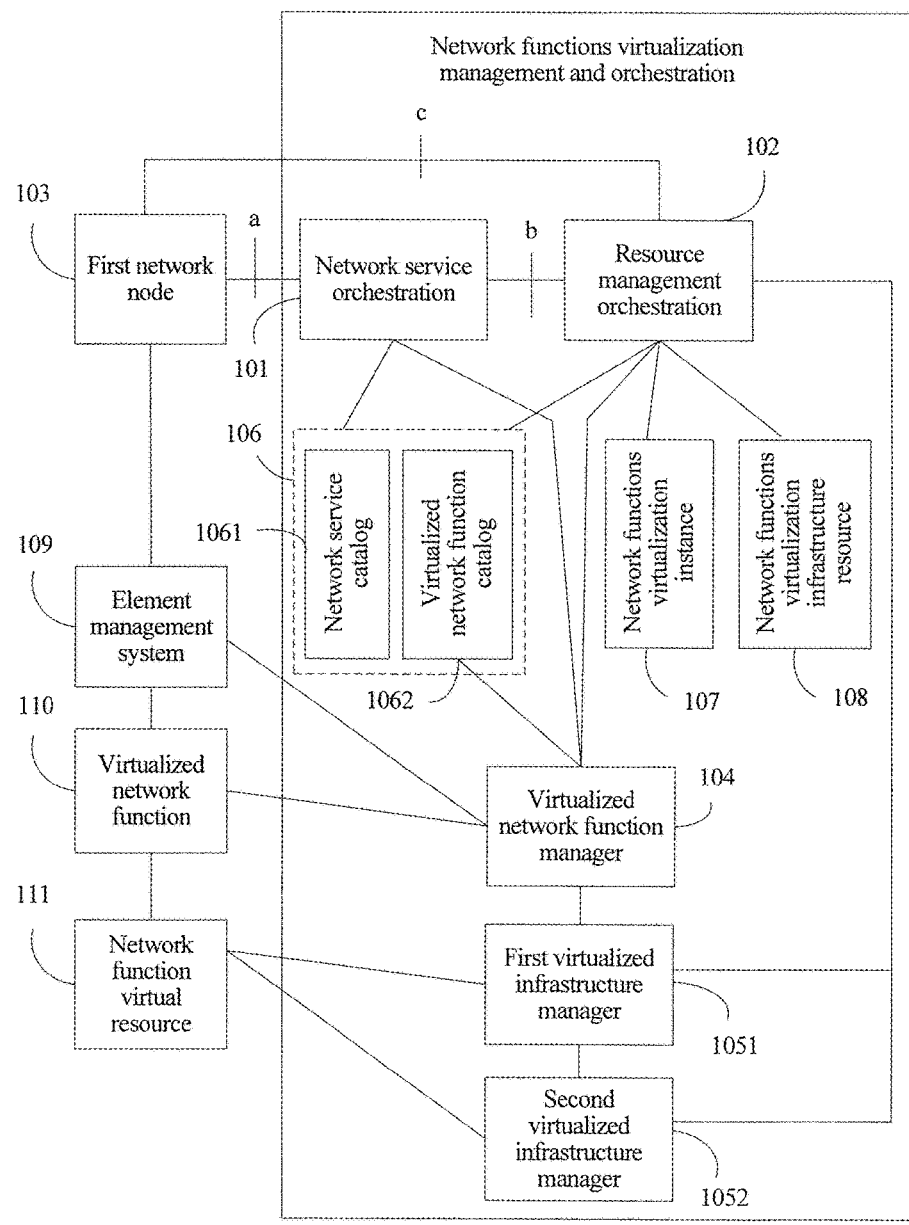
FIG. 12 is a schematic diagram 11 of a network functions virtualization network system according to an embodiment of the present invention.

Based on FIG. 11, as shown in FIG. 12, a difference from FIG. 11 lies in that the NSO node 101 in the NFV network system 10 may be connected to the VNFM node 104 according to an actual situation. In this way, the NSO node 101 can directly query for VNF instance information and the like from the VNFM node 104, or send a VNF instance management instruction, for example, establishing, expanding, updating, or terminating a VNF instance, to the VNFM node 104. If the NSO node 101 is not connected to the VNFM node 104, VNF instance management may be implemented by the RO node 102 by using the VNFM node 104.

Figure 13:
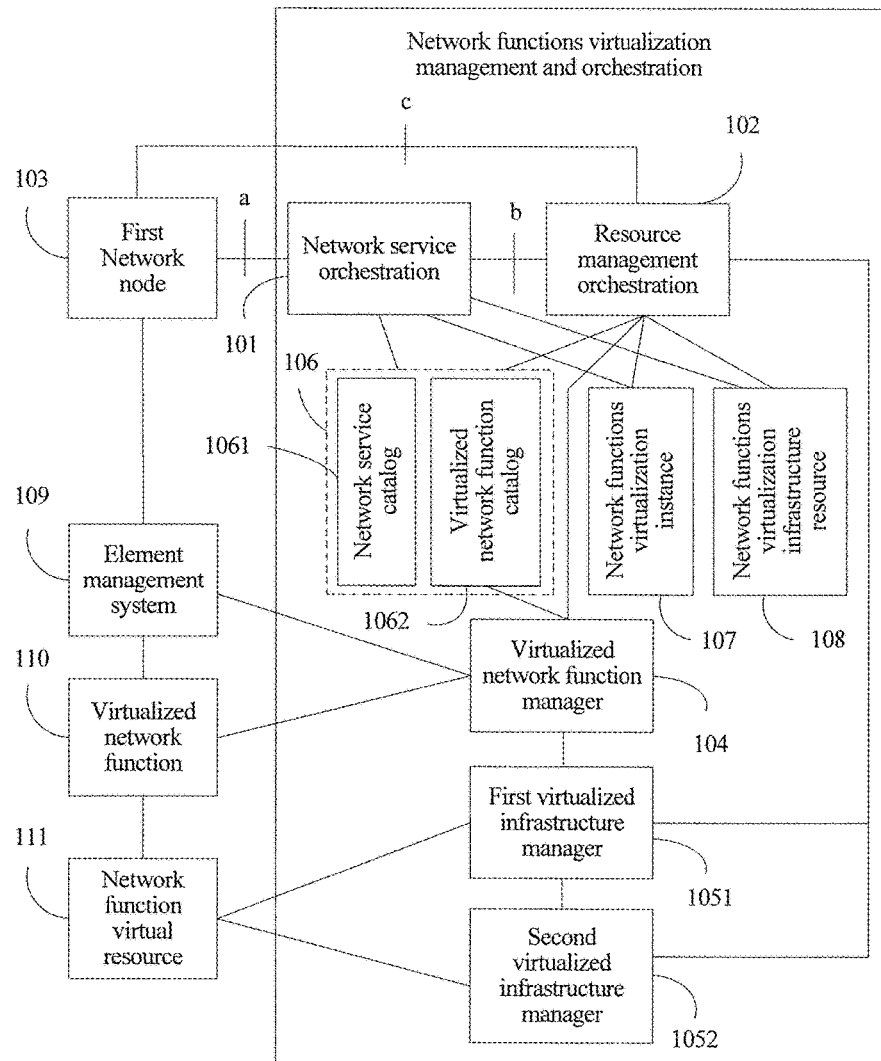
FIG. 13 is a schematic diagram 12 of a network functions virtualization network system according to an embodiment of the present invention.

Based on FIG. 11, as shown in FIG. 13, a difference from FIG. 11 lies in that the NSO node 101 may be connected to the catalog 106, the NFV instance 107, and the NFVI resource 108, and the RO node 102 may be connected to the catalog 106, the NFV instance 107, and the NFVI resource 108. That is, the NSO node 101 and the RO node 102 share the catalog 106, the NFV instance 107, and the NFVI resource 108. The catalog includes the NS catalog 1061 and the VNF catalog 1062. In this way, deployment of the network service orchestration function and the resource management orchestration function of the network functions virtualization network can be more flexible.

Figure 14:
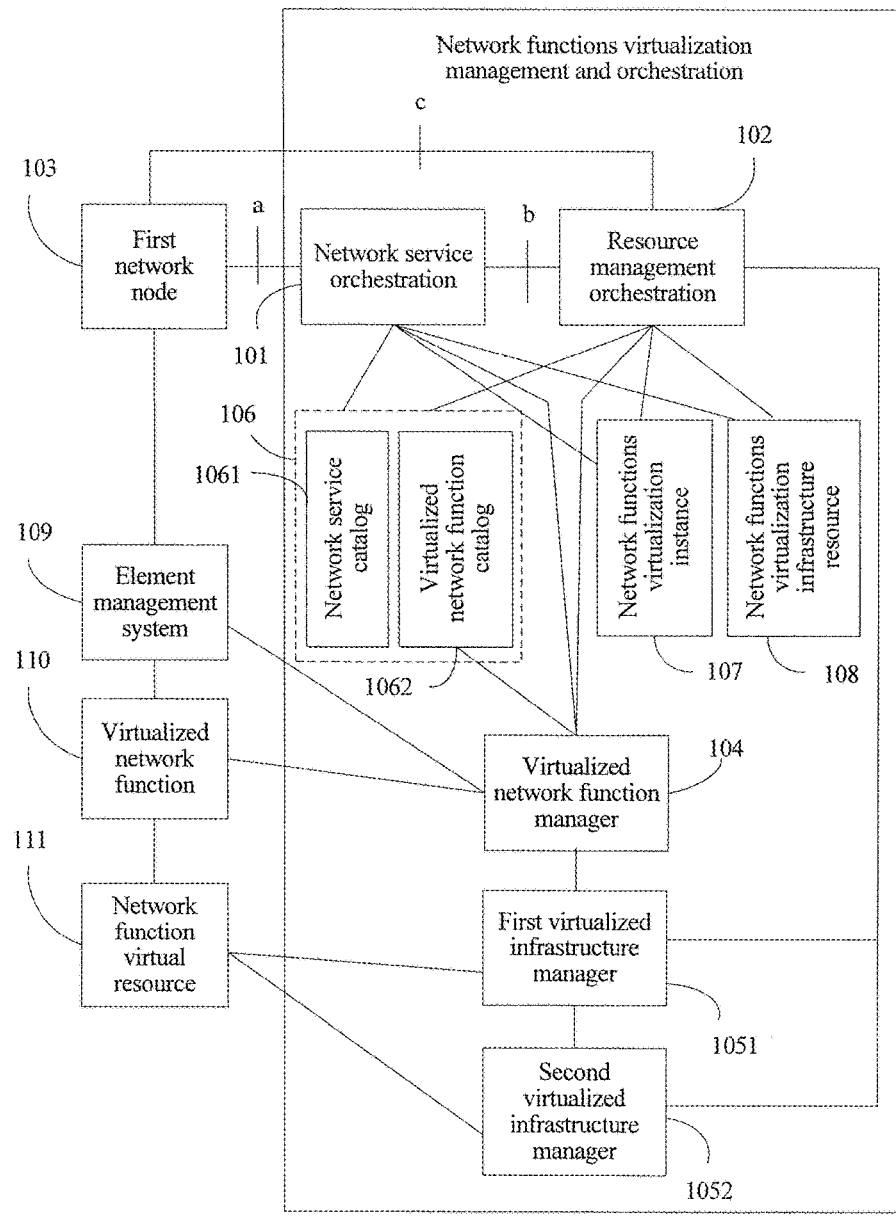
FIG. 14 is a schematic diagram 13 of a network functions virtualization network system according to an embodiment of the present invention.

Based on FIG. 11, as shown in FIG. 14, a difference from FIG. 11 lies in that the NSO node 101 in the NFV network system 10 may be connected to the VNFM node 104 according to an actual situation, the NSO node 101 may be connected to the catalog 106, the NFV instance 107, and the NFVI resource 108, and the RO node 102 may be connected to the catalog 106, the NFV instance 107, and the NFVI resource 108. That is, the NSO node 101 and the RO node 102 share the catalog 106, the NFV instance 107, and the NFVI resource 108. The catalog includes the NS catalog 1061 and the VNF catalog 1062.

Figure 15:
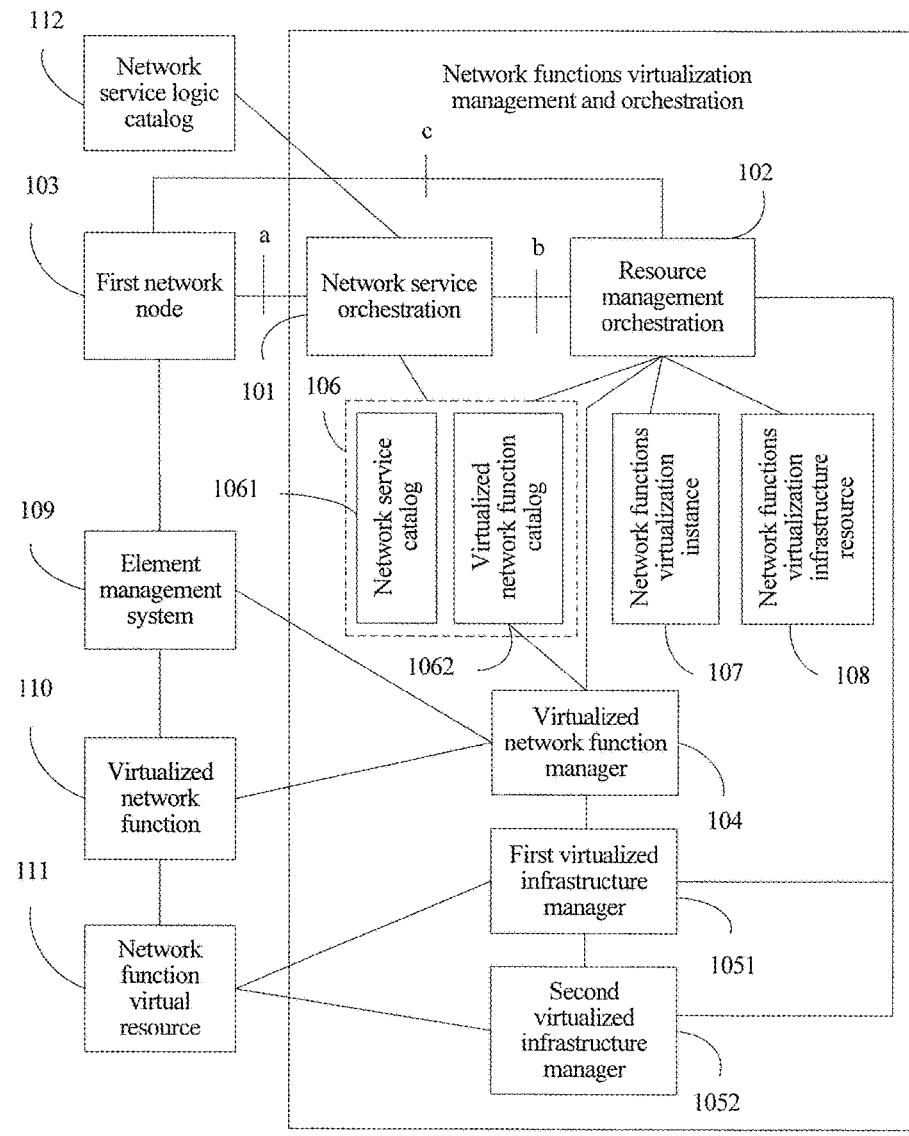
FIG. 15 is a schematic diagram 14 of a network functions virtualization network system according to an embodiment of the present invention.

Based on FIG. 11, as shown in FIG. 15, a difference from FIG. 11 lies in that the NFV network system 10 may further include a network service logic catalog (NSL) 112. The NSL is used to store service logical data related to deployment, user-related data, and policy information, such as a network functions virtualization (NFV) network address, an IP address, a user network selection policy, quality of service (QoS) policy information, and mobility management entity (NNE) selection policy information in a load balancing scenario. The NSO node 101 may be connected to the NSL catalog 112.

Figure 16:
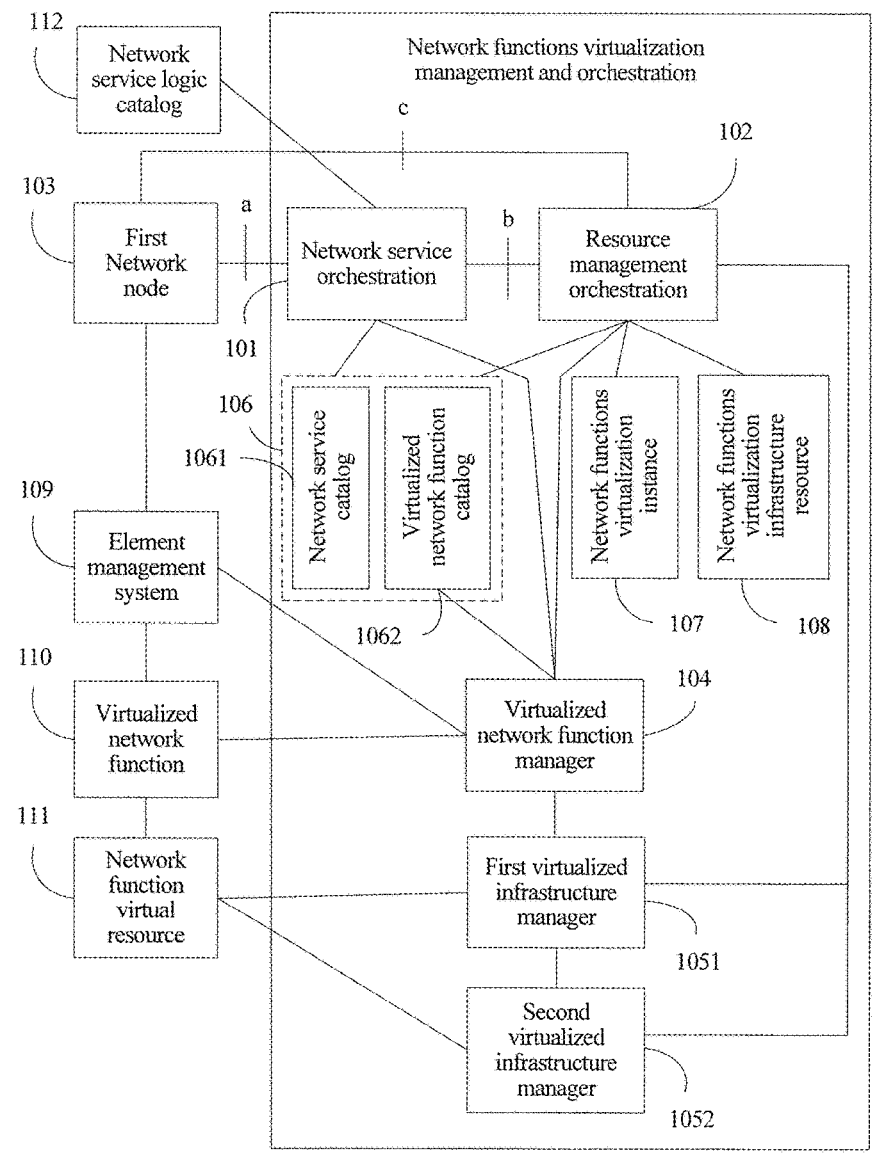
FIG. 16 is a schematic diagram 15 of a network functions virtualization network system according to an embodiment of the present invention.

Based on FIG. 12, as shown in FIG. 16, a difference from FIG. 12 lies in that the NFV network system 10 may further include a network service logic catalog (NSL Catalog) 112, and the NSO node 101 may be connected to the NSL catalog 112.

Figure 17:
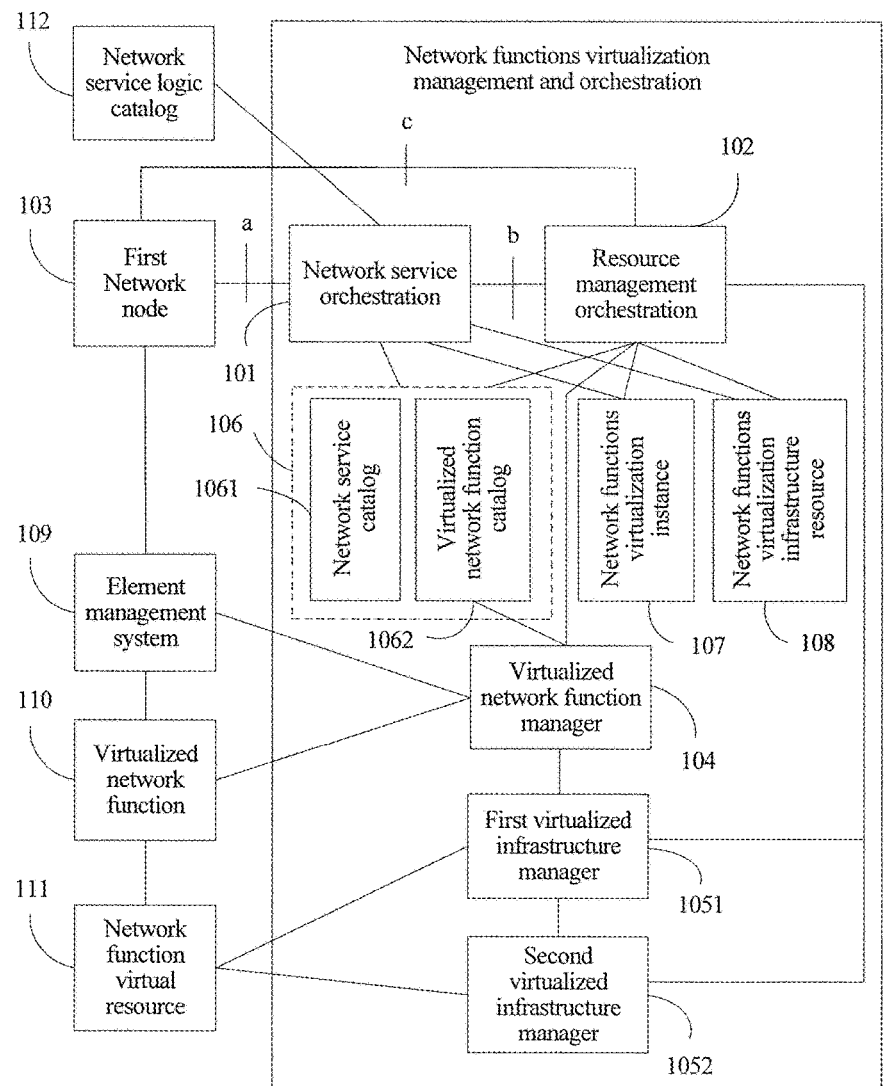
FIG. 17 is a schematic diagram 16 of a network functions virtualization network system according to an embodiment of the present invention.

Based on FIG. 13, as shown in FIG. 17, a difference from FIG. 13 lies in that the NFV network system 10 may further include a network service logic (NSL) catalog 112, and the NSO node 101 may be connected to the NSL catalog 112.

Figure 18:
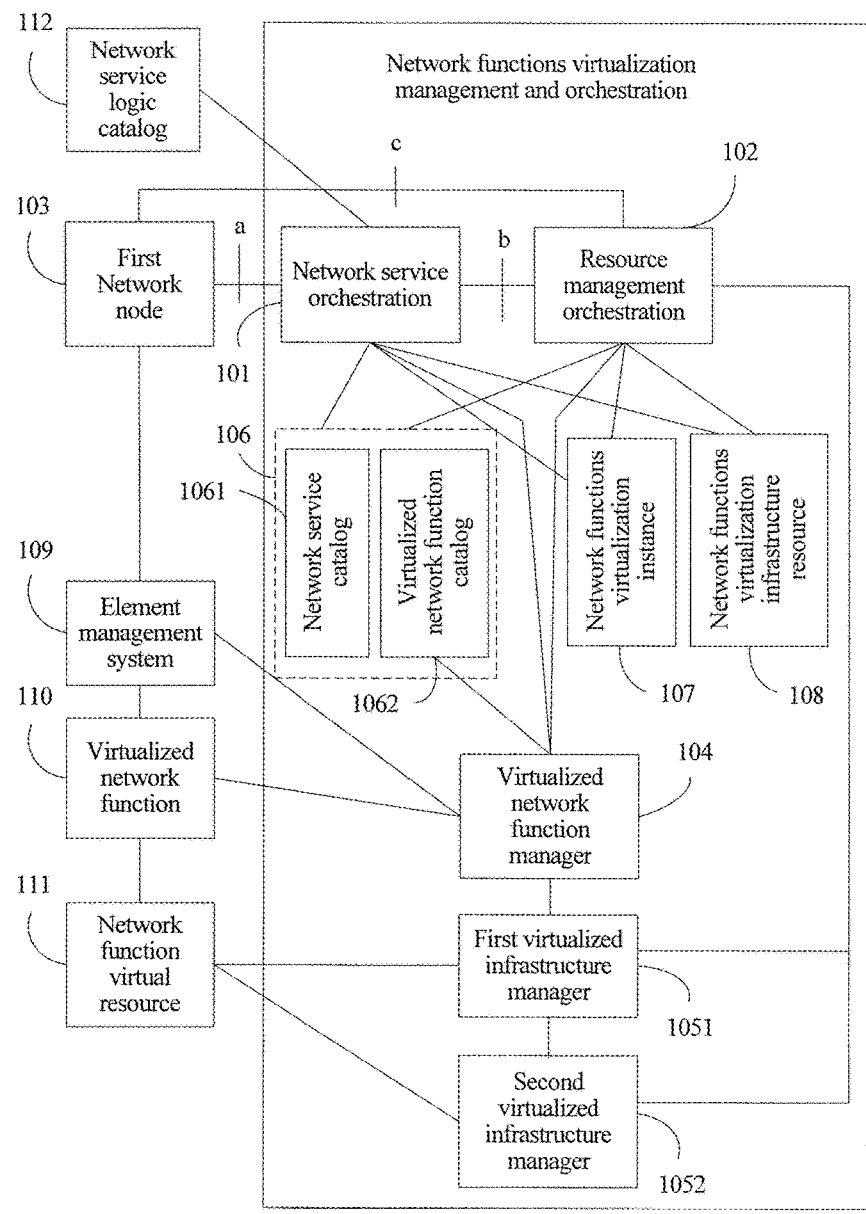
FIG. 18 is a schematic diagram 17 of a network functions virtualization network system according to an embodiment of the present invention.

Based on FIG. 14, as shown in FIG. 18, a difference from FIG. 14 lies in that the NFV network system 10 may further include a network service logic (NSL) catalog 112, and the NSO node 101 may be connected to the NSL catalog 112.

When N is greater than or equal to 2, and M is greater than or equal to 1, the NSO node is connected to one of the RO nodes, the RO node is separately connected to N-1 RO nodes, and each one of the N-1 RO nodes is connected to at least one of the VIM nodes.

In an implementation manner, it is assumed that N is equal to 3 and M is equal to 3, that is, it is assumed that the NFV network system 10 includes three VIM nodes and three resource management orchestration (RO) nodes. The three VIM nodes are a first VIM node 1051, a second VIM node 1052, and a third VIM node 1053, respectively. The three RO nodes are a first RO node 1021, a second RO node 1022, and a third RO node 1023, respectively. The following connection manners may be used.

Figure 19:
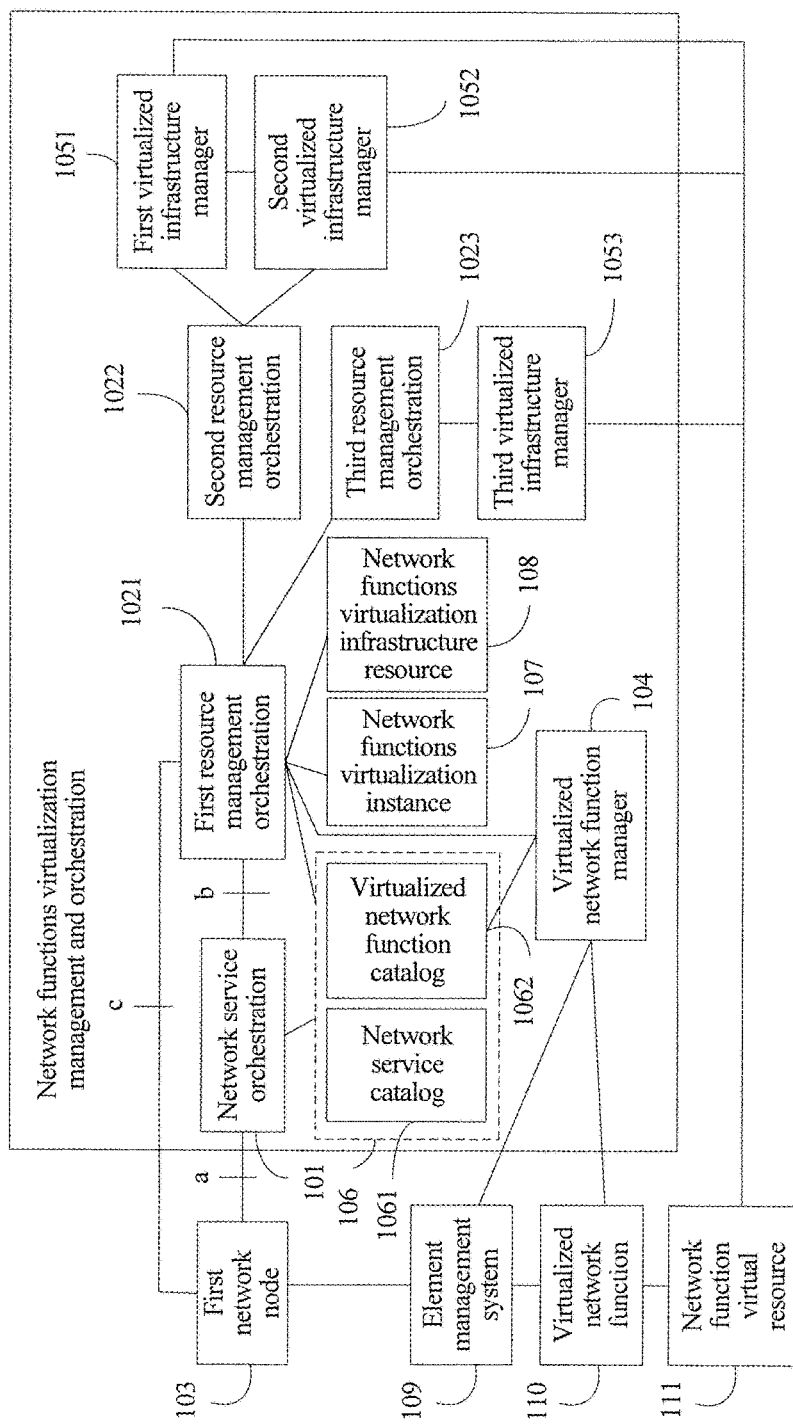
FIG. 19 is a schematic diagram 18 of a network functions virtualization network system according to an embodiment of the present invention.

Based on FIG. 3, as shown in FIG. 19, a difference from FIG. 3 lies in that the first RO node 1021 is separately connected to the RO node 1022 and the RO node 1023, and the first RO node 1021 is further separately connected to the VNFM node 104, the catalog 106, the NFV instance 107, and the NFVI resource 108, and is connected to the first network node 103 by using the interface c, and is connected to the NSO node 101 by using the interface b;

the RO node 1022 is separately connected to the first VIM node 1051 and the second VIM node 1052;

the third RO node 1023 is connected to the third VIM node 1053;

the first VIM node 1051 is separately connected to the second VIM node 1052 and the NFVI node 111;

the second VIM node 1052 is connected to the NFVI node 111; and the third VIM node 1053 is connected to the NFVI node 111.

Figure 20:
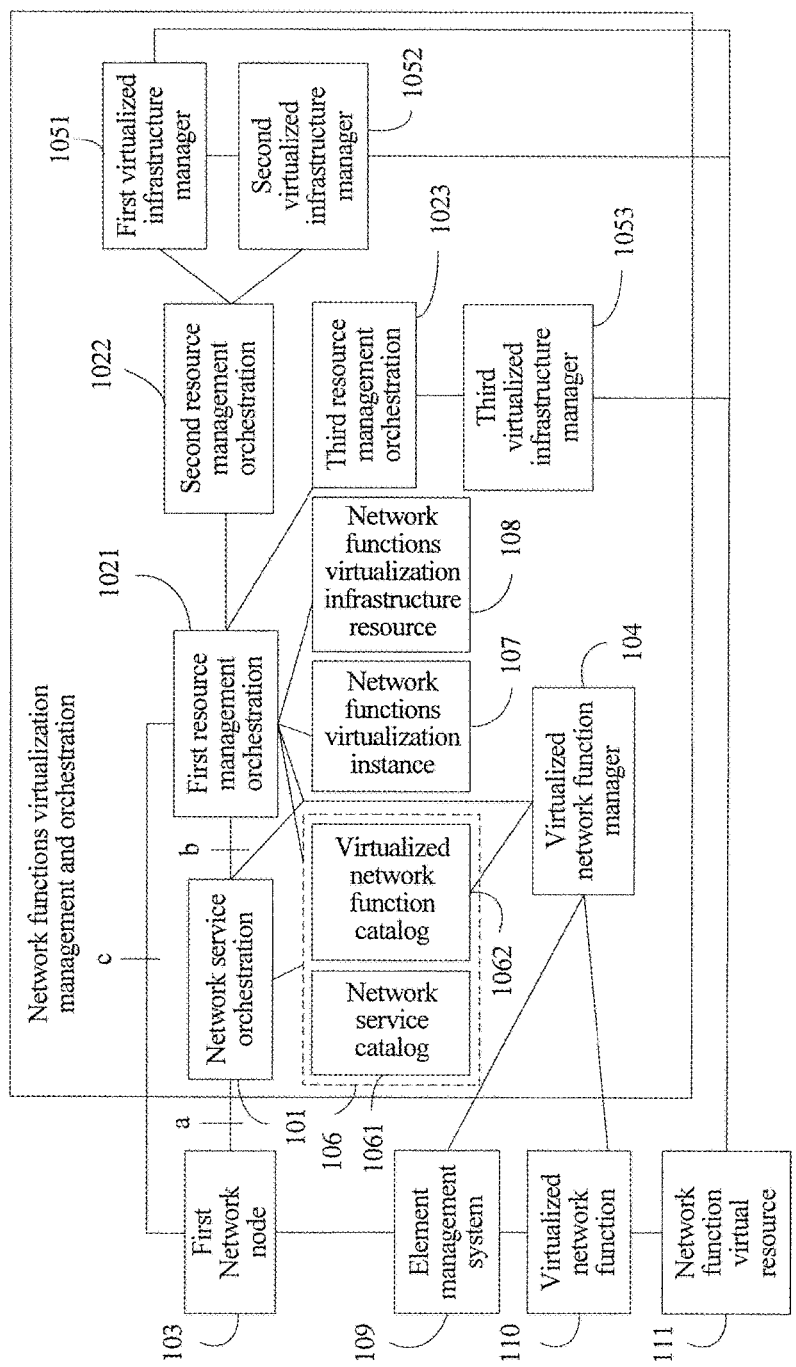
FIG. 20 is a schematic diagram 19 of a network functions virtualization network system according to an embodiment of the present invention.

Based on FIG. 19, as shown in FIG. 20, a difference from FIG. 19 lies in that the NSO node 101 in the NFV network system 10 may be connected to the VNFM node 104 according to an actual situation. In this way, the NSO node 101 can directly query for VNF instance information and the like from the VNFM node 104, or send a VNF instance management instruction, for example, establishing, expanding, updating, or terminating a VNF instance, to the VNFM node 104. If the NSO node 101 is not connected to the VNFM node 104, VNF instance management may be implemented by the RO node 102 by using the VNFM node 104.

Figure 21:
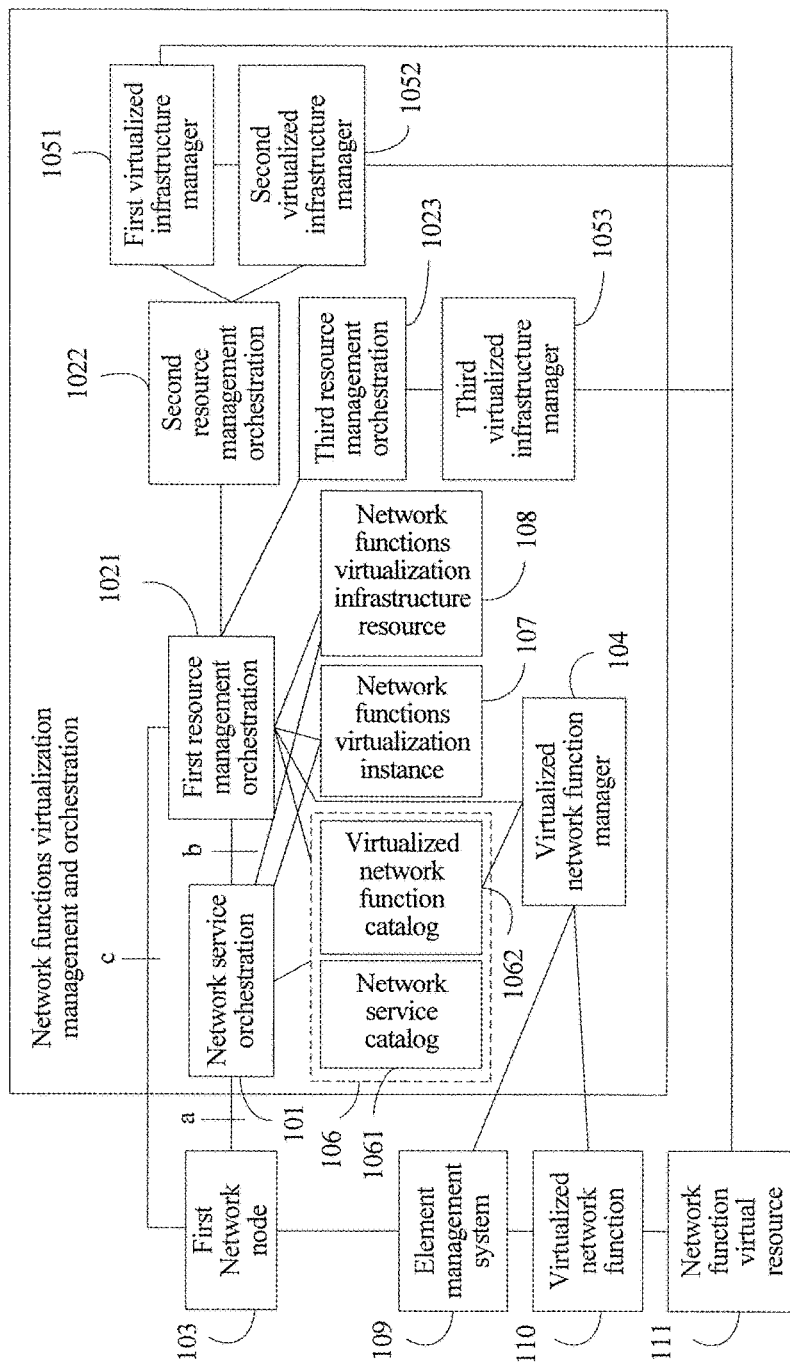
FIG. 21 is a schematic diagram 20 of a network functions virtualization network system according to an embodiment of the present invention.

Based on FIG. 19, as shown in FIG. 21, a difference from FIG. 19 lies in that the NSO node 101 may be connected to the catalog 106, the NFV instance 107, and the NFVI resource 108, and the RO node 102 may be connected to the catalog 106, the NFV instance 107, and the NFVI resource 108. That is, the NSO node 101 and the RO node 102 share the catalog 106, the NFV instance 107, and the NFVI resource 108. The catalog includes the NS catalog 1061 and the VNF catalog 1062. In this way, deployment of the network service orchestration function and the resource management orchestration function of the network functions virtualization network can be more flexible.

Figure 22:
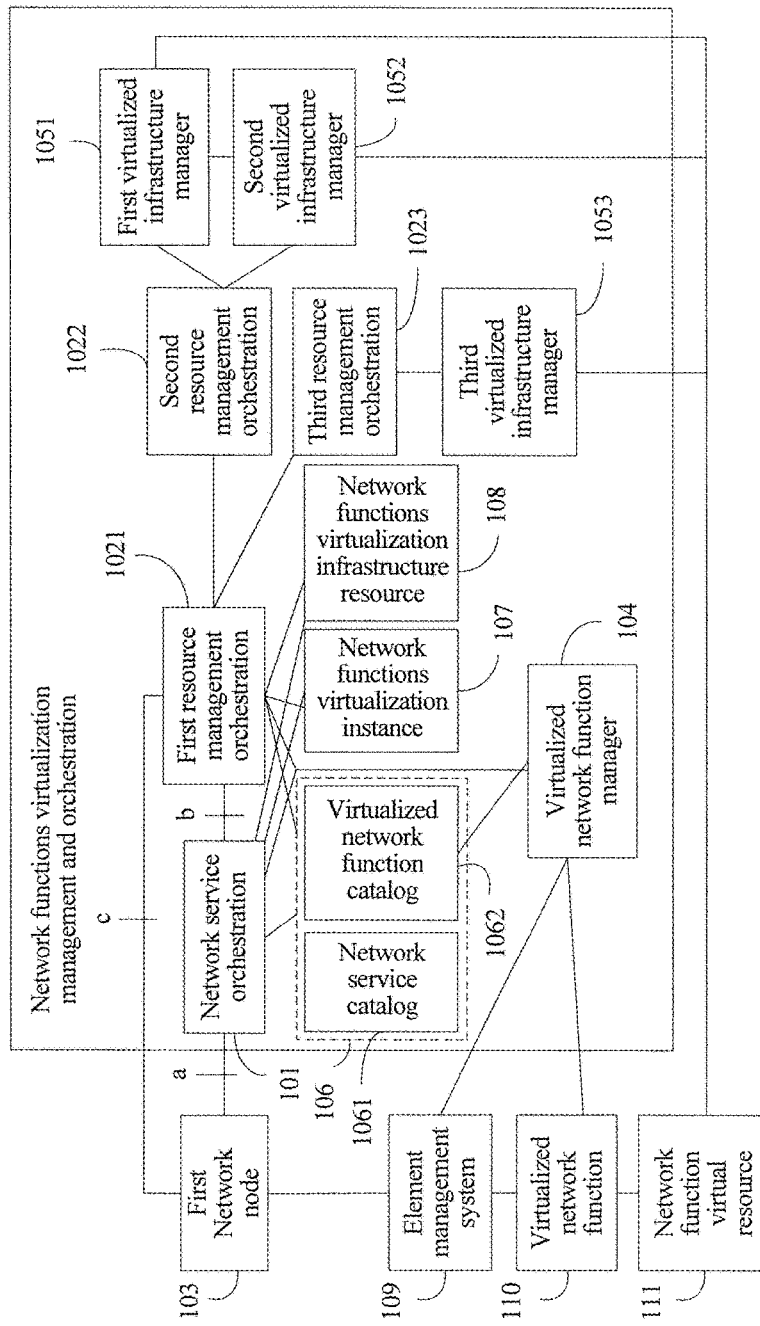
FIG. 22 is a schematic diagram 21 of a network functions virtualization network system according to an embodiment of the present invention.

Based on FIG. 19, as shown in FIG. 22, a difference from FIG. 19 lies in that the NSO node 101 in the NFV network system 10 may be connected to the VNFM node 104 according to an actual situation, the NSO node 101 may be connected to the catalog 106, the NFV instance 107, and the NFVI resource 108, and the RO node 102 may be connected to the catalog 106, the NFV instance 107, and the NFVI resource 108. That is, the NSO node 101 and the RO node 102 share the catalog 106, the NFV instance 107, and the NFVI resource 108. The catalog includes the NS catalog 1061 and the VNF catalog 1062.

Figure 23:
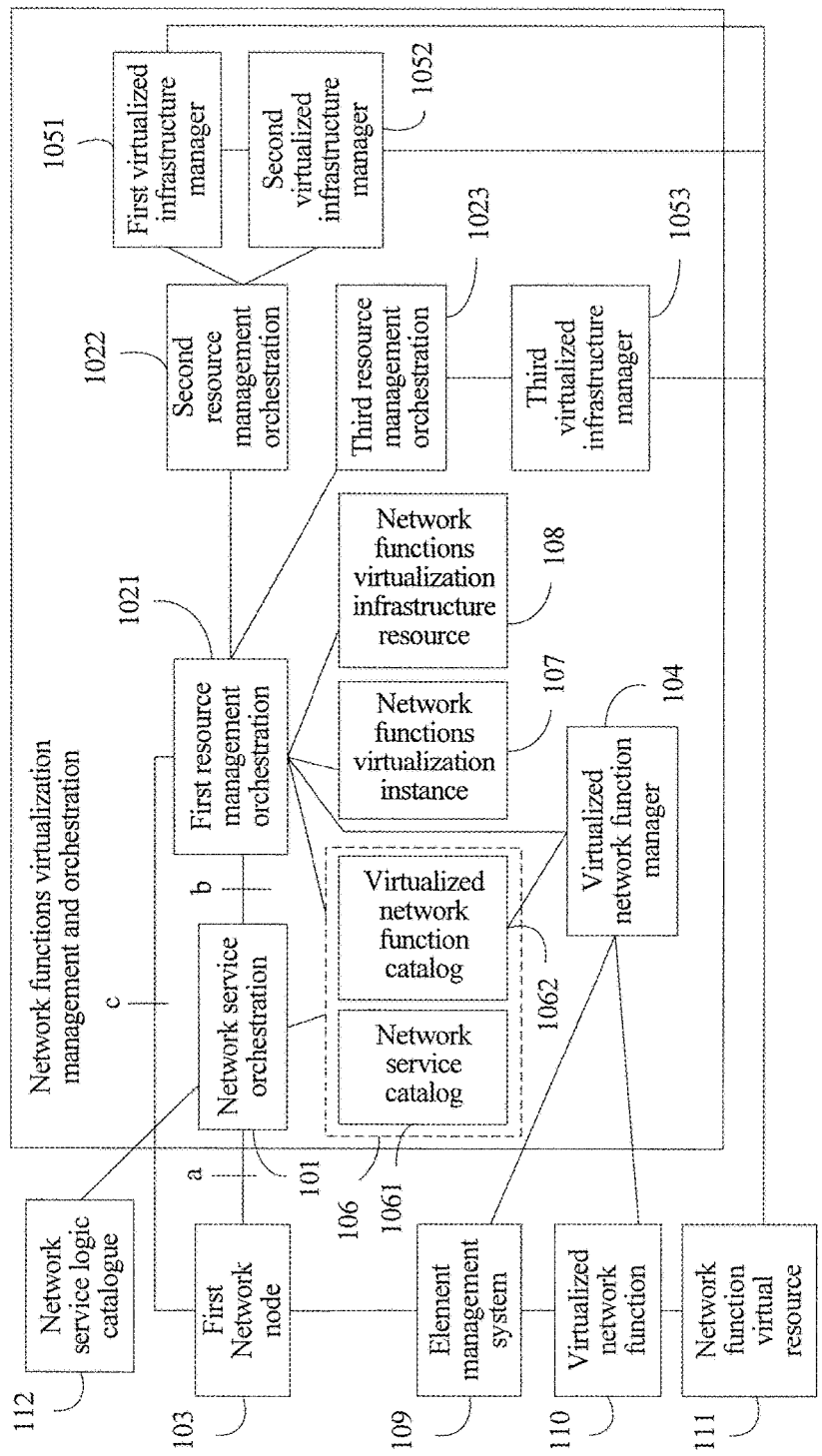
FIG. 23 is a schematic diagram 22 of a network functions virtualization network system according to an embodiment of the present invention.

Based on FIG. 19, as shown in FIG. 23, a difference from FIG. 19 lies in that the NFV network system 10 may further include network service logic (NSL) catalog 112. The NSL is used to store service logical data related to deployment, user-related data, and policy information, such as a network functions virtualization (NFV) network address, an IP address, a user network selection policy, quality of service (QoS) policy information, and mobility management entity (MME) selection policy information in a load balancing scenario. The NSO node 101 may be connected to the NSL catalog 112.

Figure 24:
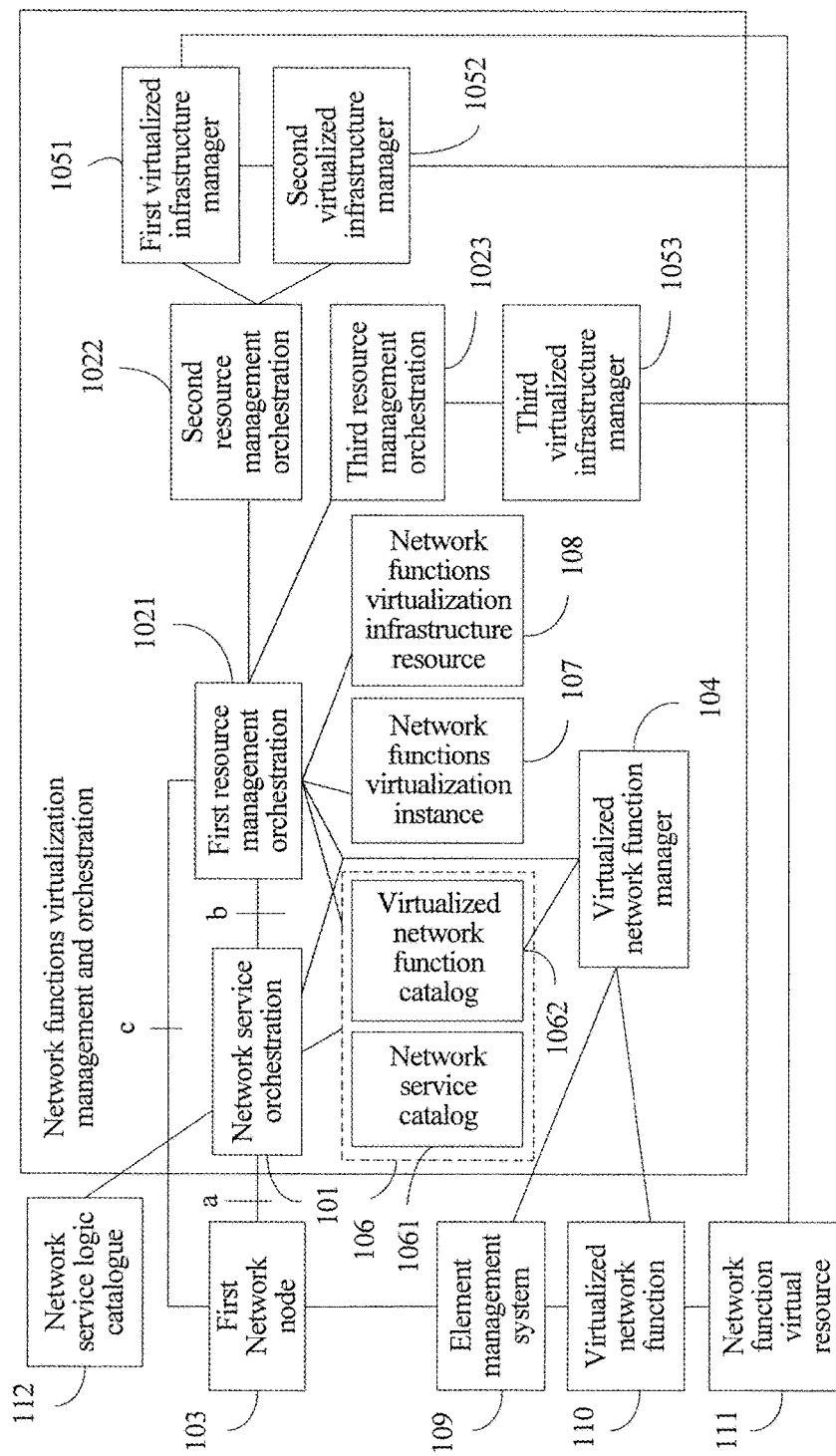
FIG. 24 is a schematic diagram 23 of a network functions virtualization network system according to an embodiment of the present invention.

Based on FIG. 20, as shown in FIG. 24, a difference from FIG. 20 lies in that the NFV network system 10 may further include an NSL catalog 112, and the NSO node 101 may be connected to the NSL catalog 112.

Figure 25:
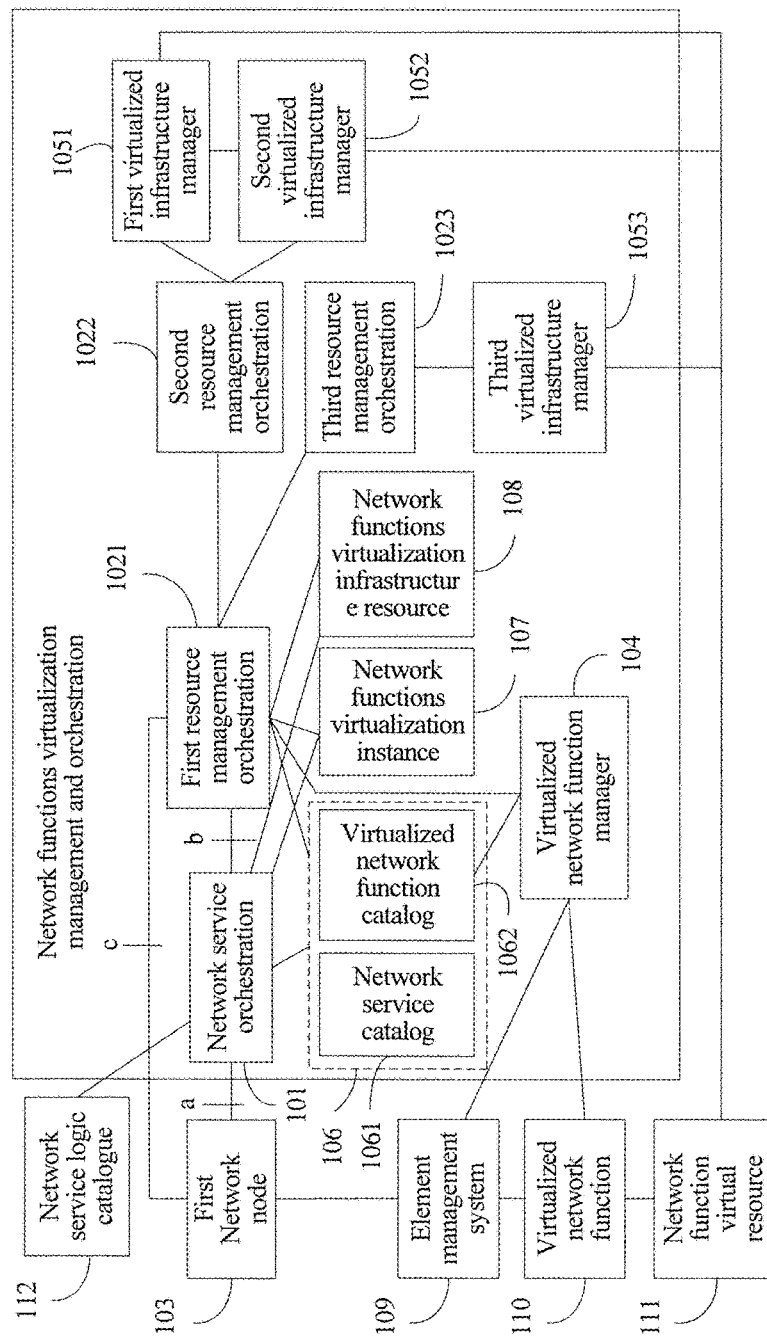
FIG. 25 is a schematic diagram 24 of a network functions virtualization network system according to an embodiment of the present invention.

Based on FIG. 21, as shown in FIG. 25, a difference from FIG. 21 lies in that the NFV network system 10 may further include an NSL catalog 112, and the NSO node 101 may be connected to the NSL catalog 112.

Figure 26:
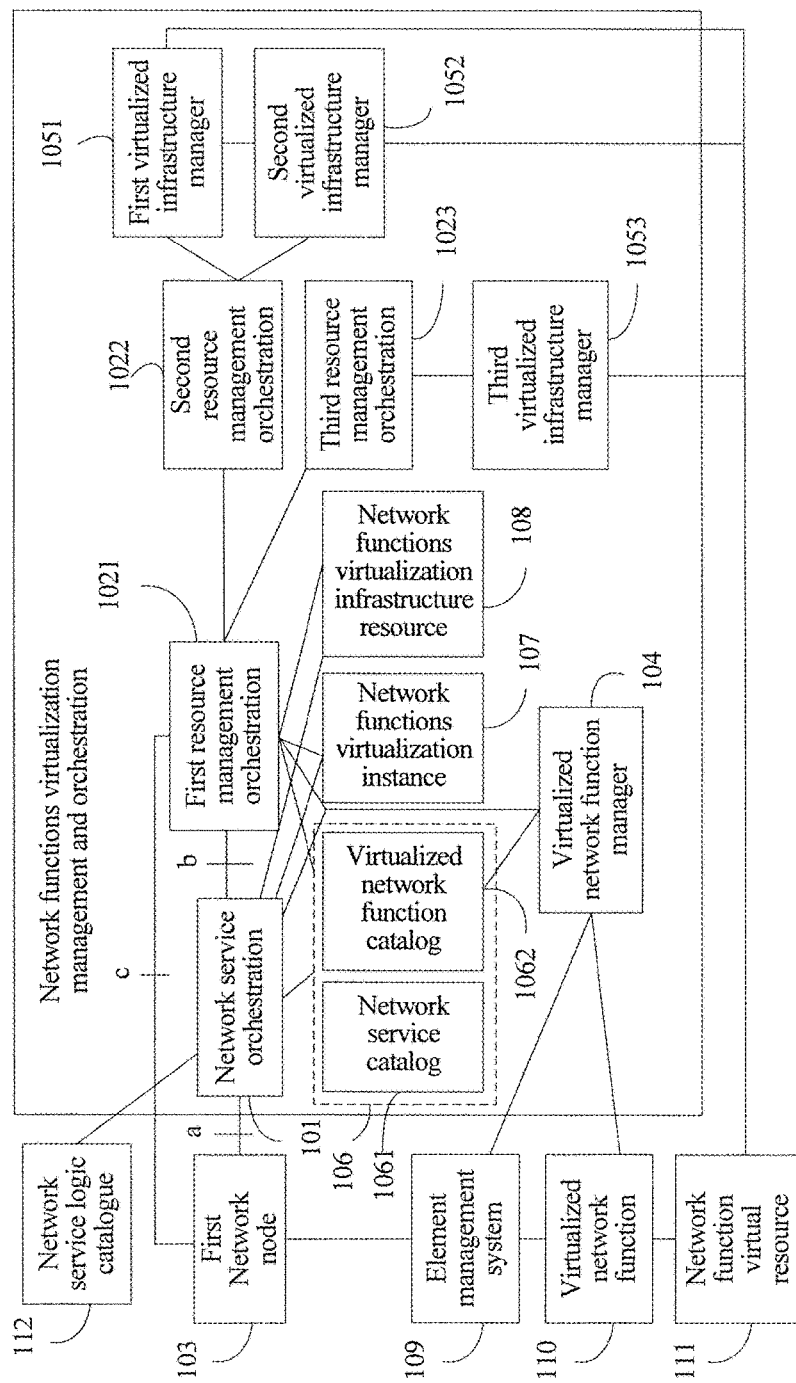
FIG. 26 is a schematic diagram 25 of a network functions virtualization network system according to an embodiment of the present invention.

Based on FIG. 22, as shown in FIG. 26, a difference from FIG. 22 lies in that the NFV network system 10 may further include an NSL catalog 112, and the NSO node 101 may be connected to the NSL catalog 112.

In another implementation manner, it is assumed that N is equal to 2 and M is equal to 3, that is, it is assumed that the NFV network system 10 includes three VIM nodes and two RO nodes. The three VIM nodes are a first VIM node 1051, a second VIM node 1052, and a third VIM node 1053, respectively. The two RO nodes are a first RO node 1021 and a second RO node 1022, respectively. The following connection manners may be used.

Figure 27:
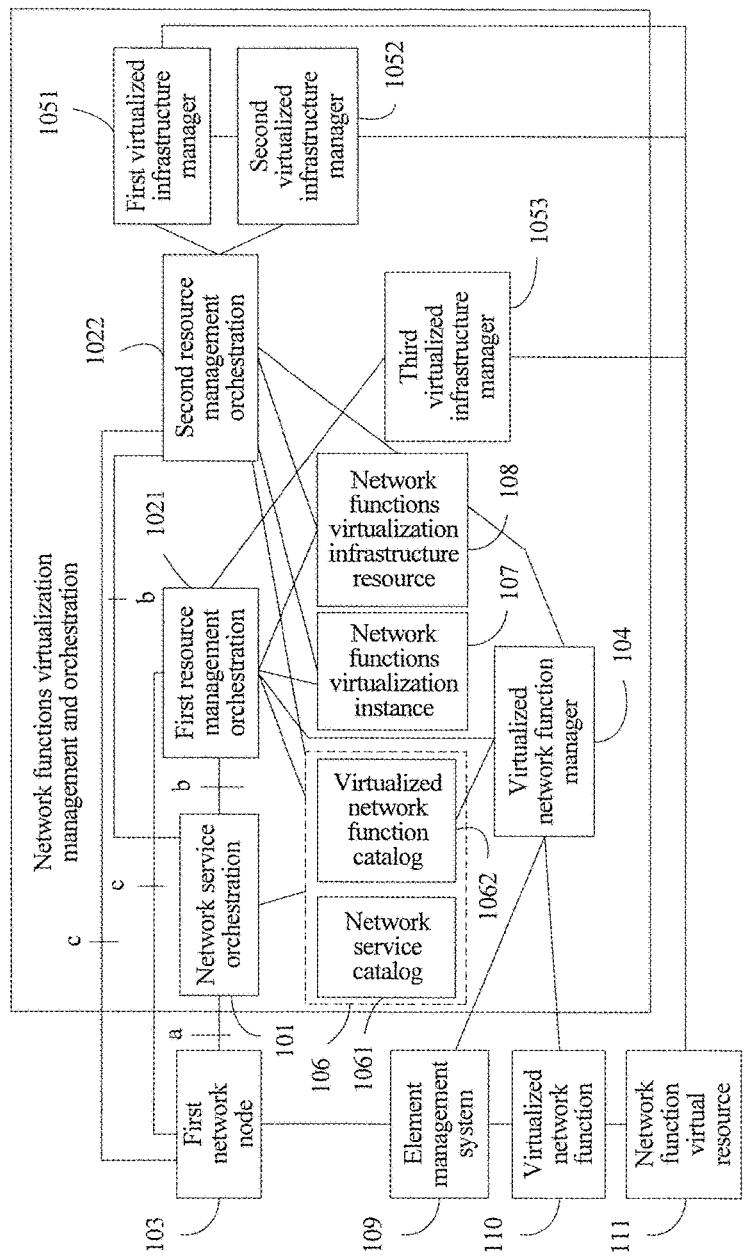
FIG. 27 is a schematic diagram 26 of a network functions virtualization network system according to an embodiment of the present invention.

Based on FIG. 3, as shown in FIG. 27, a difference from FIG. 3 lies in that the first RO node 1021 is connected to the third VIM node 1053, and the first RO node 1021 is further separately connected to the VNFM node 104, the catalog 106, the NFV instance 107, and the NFVI resource 108, and is connected to the first network node 103 by using the interface c, and is connected to the NSO node 101 by using the interface b;

the RO node 1022 is separately connected to the first VIM node 1051 and the second VIM node 1052, and the RO node 1021 is further separately connected to the VNFM node 104, the catalog 106, the NFV instance 107, and the NFVI resource 108, and is connected to the first network node 103 by using the interface c, and is connected to the NSO node 101 by using the interface b;

the first VIM node 1051 is separately connected to the second VIM node 1052 and the NFVI node 111;

the second VIM node 1052 is connected to the NFVI node 111; and the third VIM node 1053 is connected to the NFVI node 111.

Figure 28:
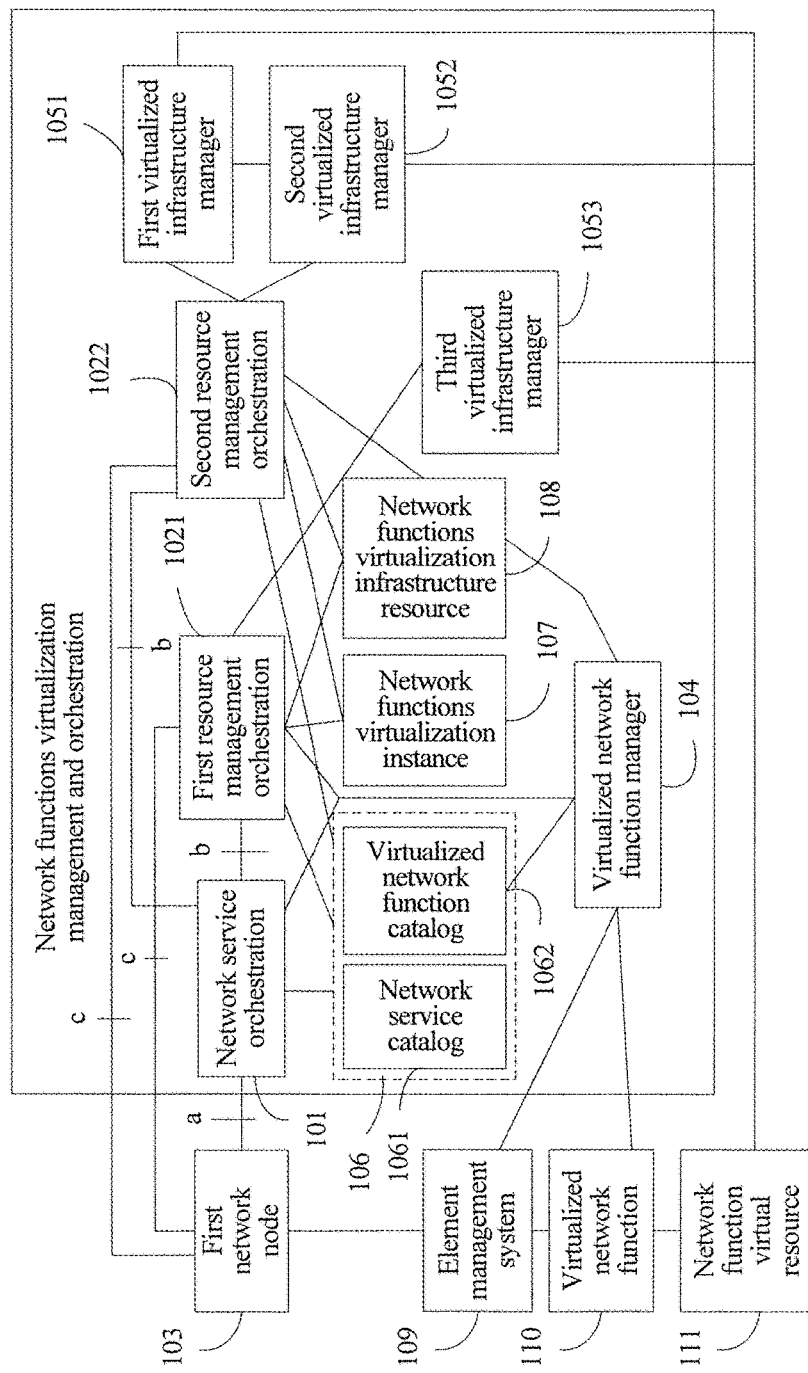
FIG. 28 is a schematic diagram 27 of a network functions virtualization network system according to an embodiment of the present invention.

Based on FIG. 27, as shown in FIG. 28, a difference from FIG. 27 lies in that the NSO node 101 in the NFV network system 10 may be connected to the VNFM node 104 according to an actual situation. In this way, the NSO node 101 can directly query for VNF instance information and the like from the VNFM node 104, or send a VNF instance management instruction, for example, establishing, expanding, updating, or terminating a VNF instance, to the VNFM node 104. If the NSO node 101 is not connected to the VNFM node 104, VNF instance management may be implemented by the RO node 102 by using the VNFM node 104.

Figure 29:
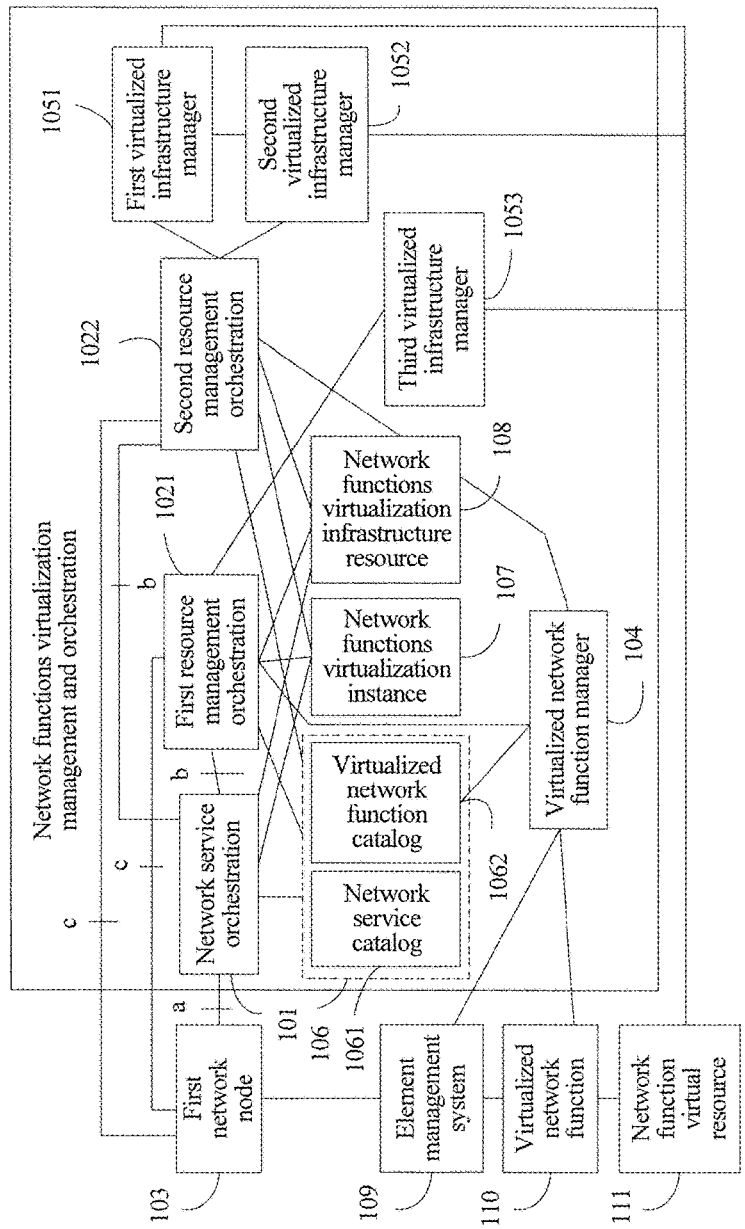
FIG. 29 is a schematic diagram 28 of a network functions virtualization network system according to an embodiment of the present invention.

Based on FIG. 27, as shown in FIG. 29, a difference from FIG. 27 lies in that the NSO node 101 may be connected to the catalog 106, the NFV instance 107, and the NFVI resource 108, and the RO node 102 may be connected to the catalog 106, the NFV instance 107, and the NFVI resource 108. That is, the NSO node 101 and the RO node 102 share the catalog 106, the NFV instance 107, and the NFVI resource 108. The catalog includes the NS catalog 1061 and the VNF catalog 1062. In this way, deployment of the network service orchestration function and the resource management orchestration function of the network functions virtualization network can be more flexible.

Figure 30:
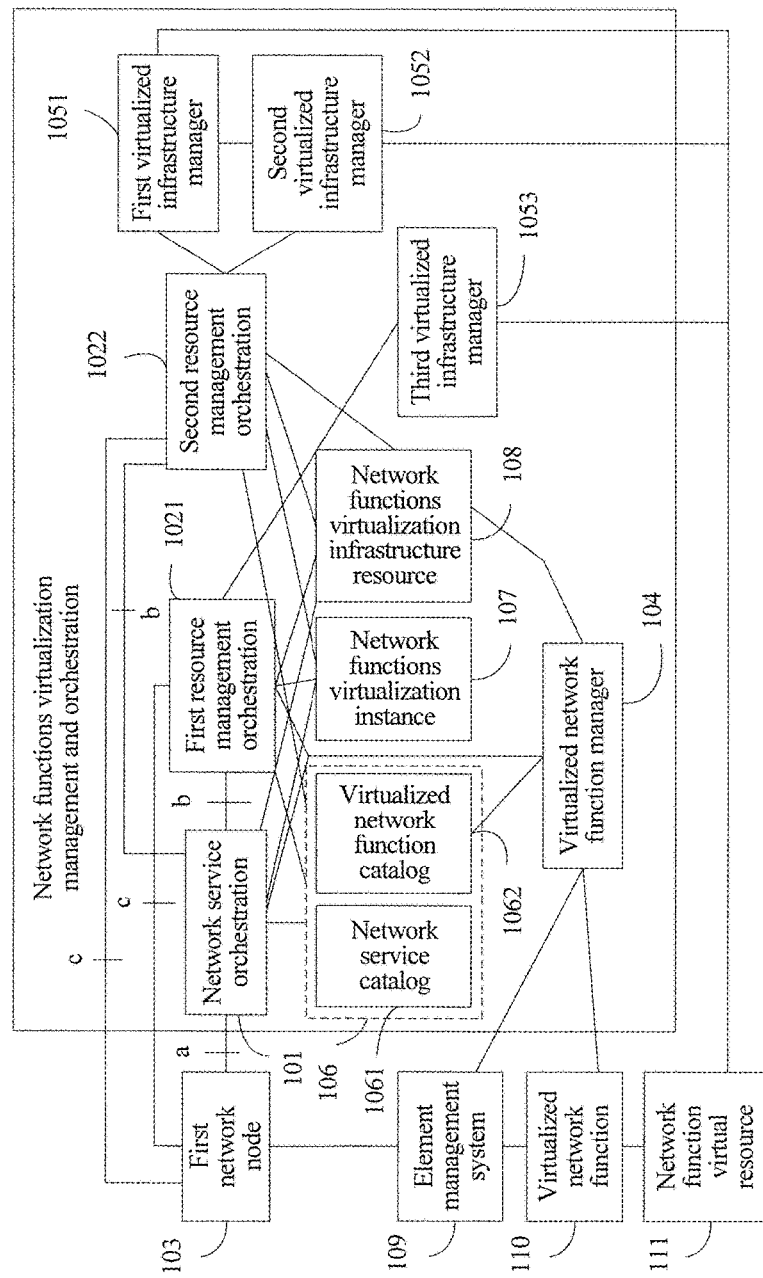
FIG. 30 is a schematic diagram 29 of a network functions virtualization network system according to an embodiment of the present invention.

Based on FIG. 27, as shown in FIG. 30, a difference from FIG. 27 lies in that the NSO node 101 in the NFV network system 10 may be connected to the VNFM node 104 according to an actual situation, the NSO node 101 may be connected to the catalog 106, the NFV instance 107, and the NFVI resource 108, and the RO node 102 may be connected to the catalog 106, the NFV instance 107, and the NFVI resource 108. That is, the NSO node 101 and the RO node 102 share the catalog 106, the NFV instance 107, and the NFVI resource 108. The catalog includes the NS catalog 1061 and the VNF catalog 1062.

Figure 31:
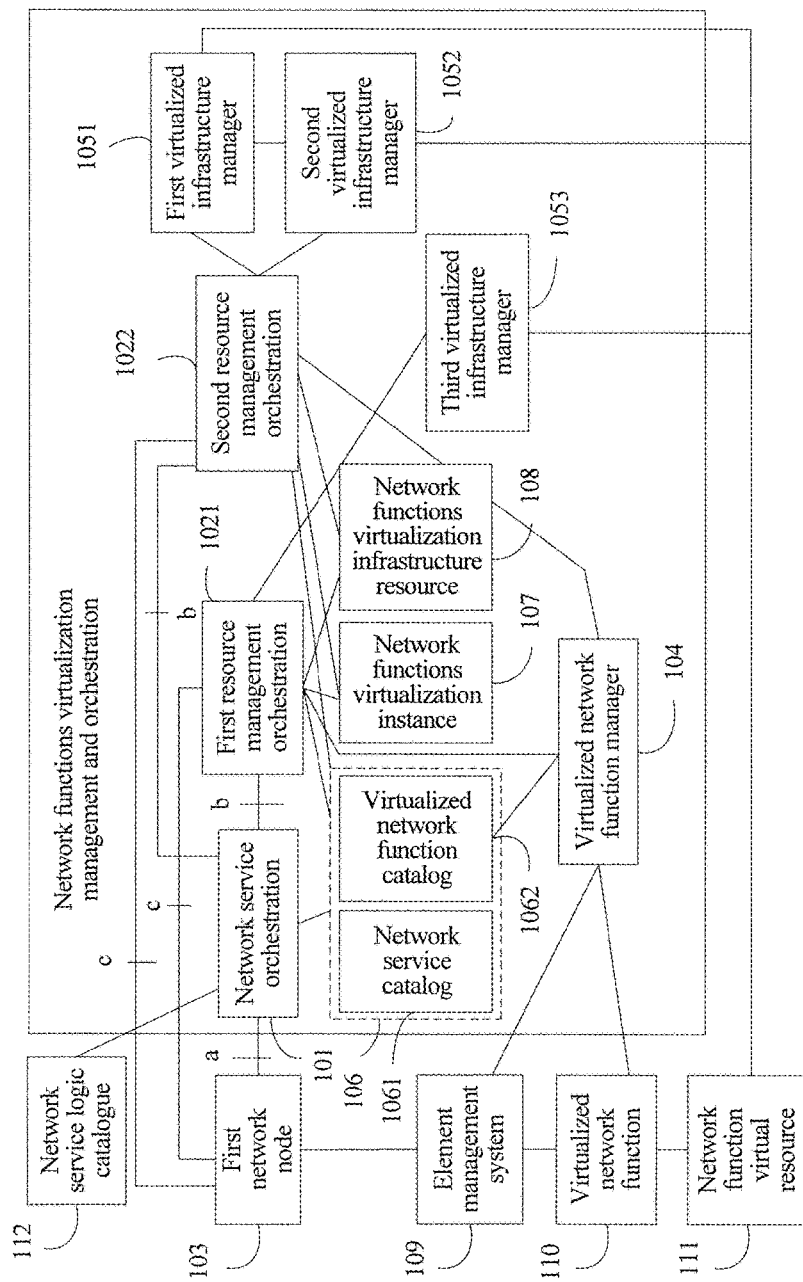
FIG. 31 is a schematic diagram 30 of a network functions virtualization network system according to an embodiment of the present invention.

Based on FIG. 27, as shown in FIG. 31, a difference from FIG. 27 lies in that the NFV network system 10 may further include an NSL catalog 112. The NSL is used to store service logical data related to deployment, user-related data, and policy information, such as a network functions virtualization (NFV) network address, an IP address, a user network selection policy, quality of service (QoS) policy information, and mobility management entity (MME) selection policy information in a load balancing scenario. The NSO node 101 may be connected to the NSL catalog 112.

Figure 32:
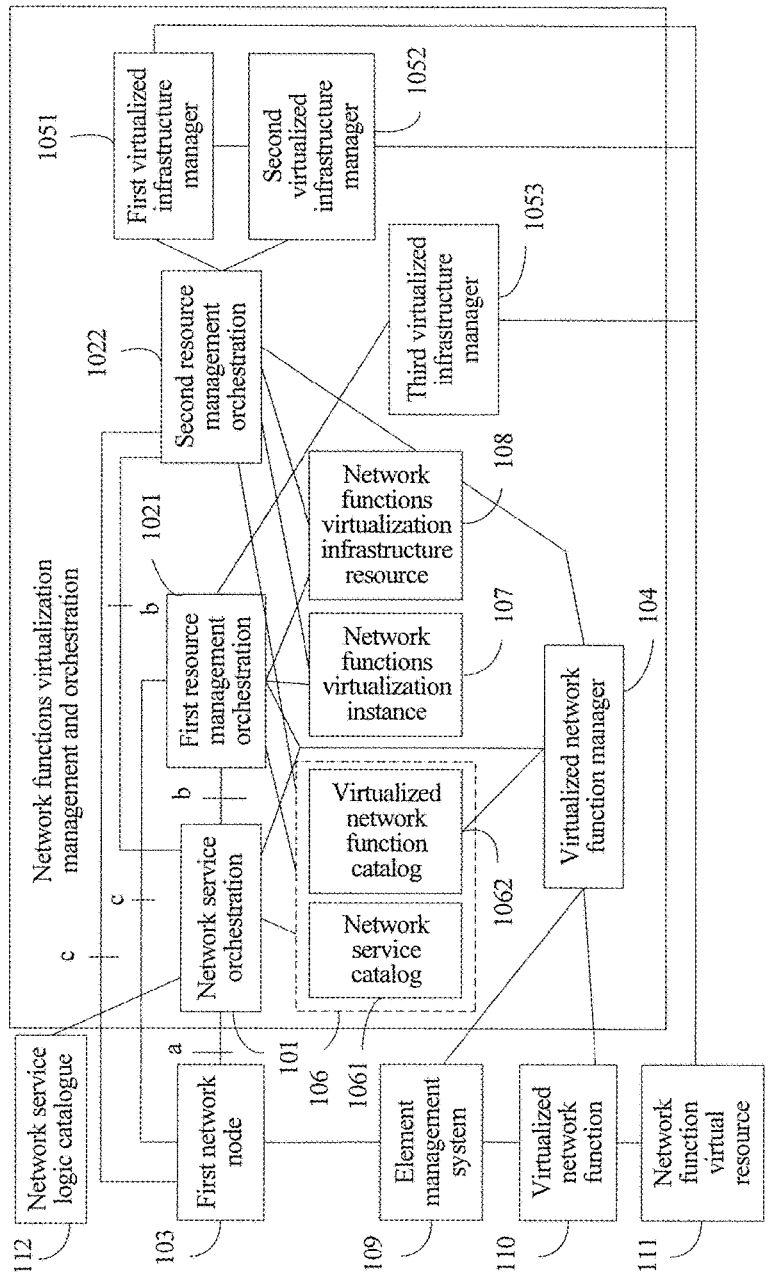
FIG. 32 is a schematic diagram 31 of a network functions virtualization network system according to an embodiment of the present invention.

Based on FIG. 28, as shown in FIG. 32, a difference from FIG. 28 lies in that the NFV network system 10 may further include an NSL catalog 112, and the NSO node 101 may be connected to the NSL catalog 112.

Figure 33:
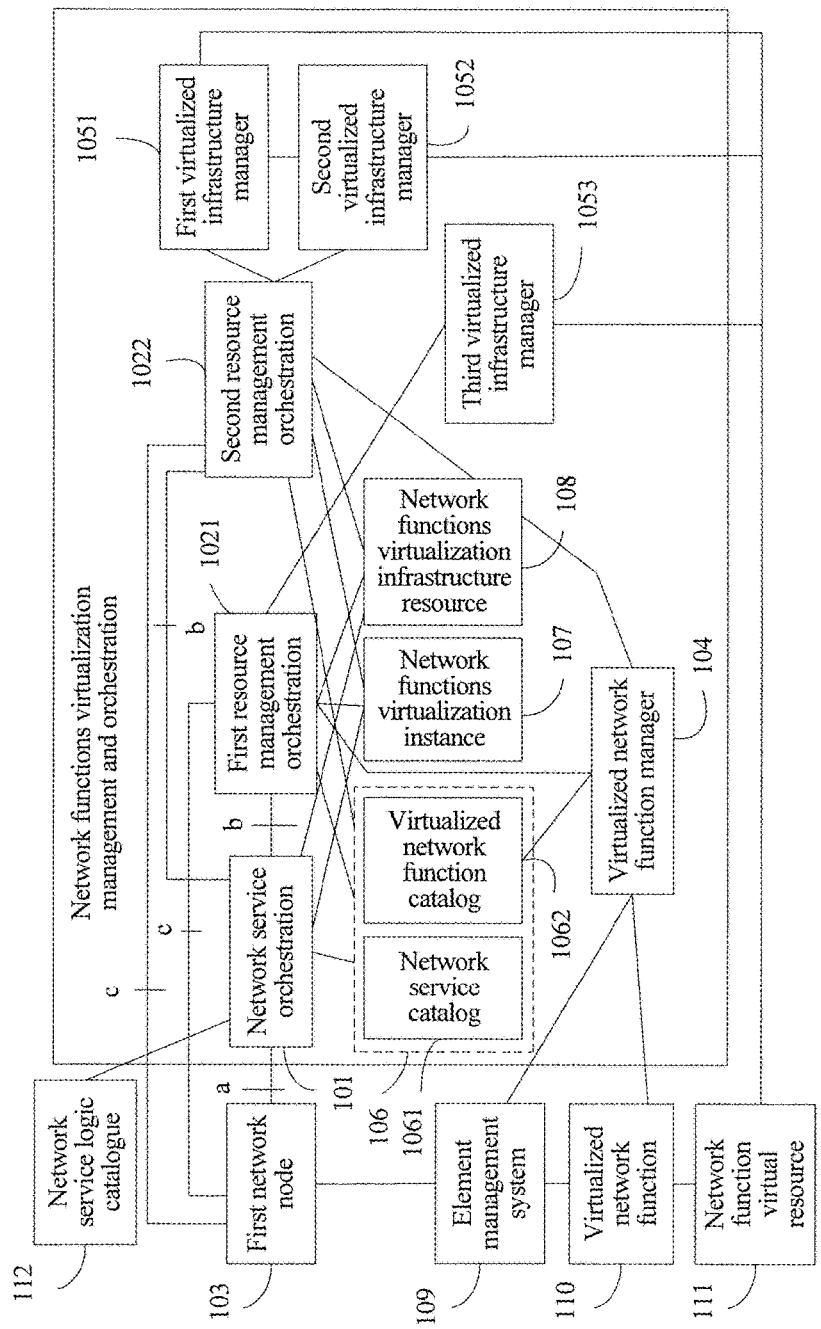
FIG. 33 is a schematic diagram 32 of a network functions virtualization network system according to an embodiment of the present invention.

Based on FIG. 29, as shown in FIG. 33, a difference from FIG. 29 lies in that the NFV network system 10 may further include an NSL catalog 112, and the NSO node 101 may be connected to the NSL catalog 112.

Figure 34:
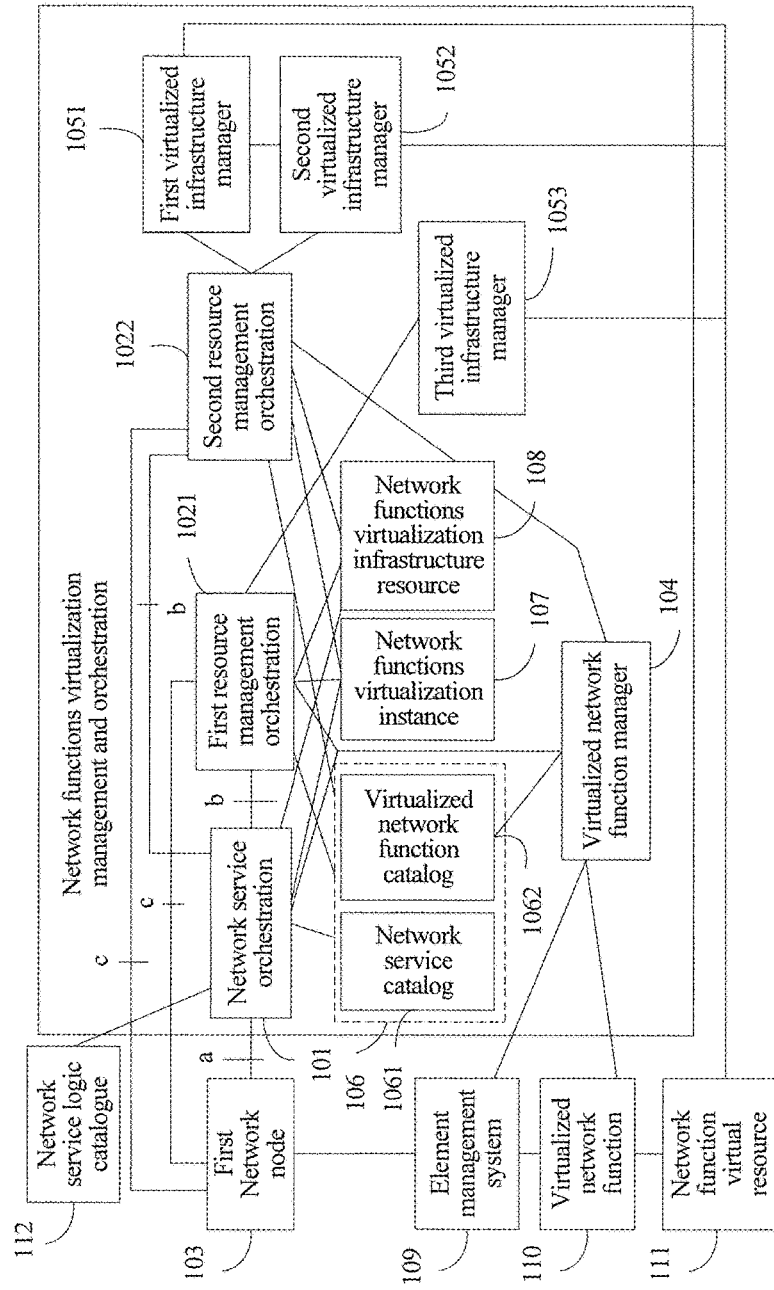
FIG. 34 is a schematic diagram 33 of a network functions virtualization network system according to an embodiment of the present invention.

Based on FIG. 30, as shown in FIG. 34, a difference from FIG. 30 lies in that the NFV network system 10 may further include an NSL catalog 112, and the NSO node 101 may be connected to the NSL catalog 112.

It should be noted that, a deployment of a resource management orchestration (RO) node may be determined according to data in a data center, that is, one RO node may be deployed in one data center. For example, the Beijing branch of China Mobile deploys five data centers in Beijing, and resource of all the five data centers are managed by respective RO nodes. The Beijing branch of China Mobile may deploy a head RO node. The head RO node manages the five data centers, where one data center may be managed by one or more cascading VIM nodes. Both RO nodes and VIM nodes may be deployed in a cascading manner.

Particularly, the NFVO node may be divided into the NSO node and the RO node, and an interface related to the NSO node and the RO node may be an internal interface of the NFVO node. When the first network node is third-party software Networker, capability exposure of the NFV network system can be implemented, to provide an application programming interface (API) for an external application, so as to achieve user and service optimization.

The NFV network system described in the present invention is merely an example for description, and a schematic diagram of any one of the NFV network systems shown in FIG. 2 to FIG. 34 may exist, which is not limited in the present invention. In actual application, another scenario may exist, for example, more than two NSO nodes may exist, where each NSO node may be connected to at least one RO node.

Figure 35:
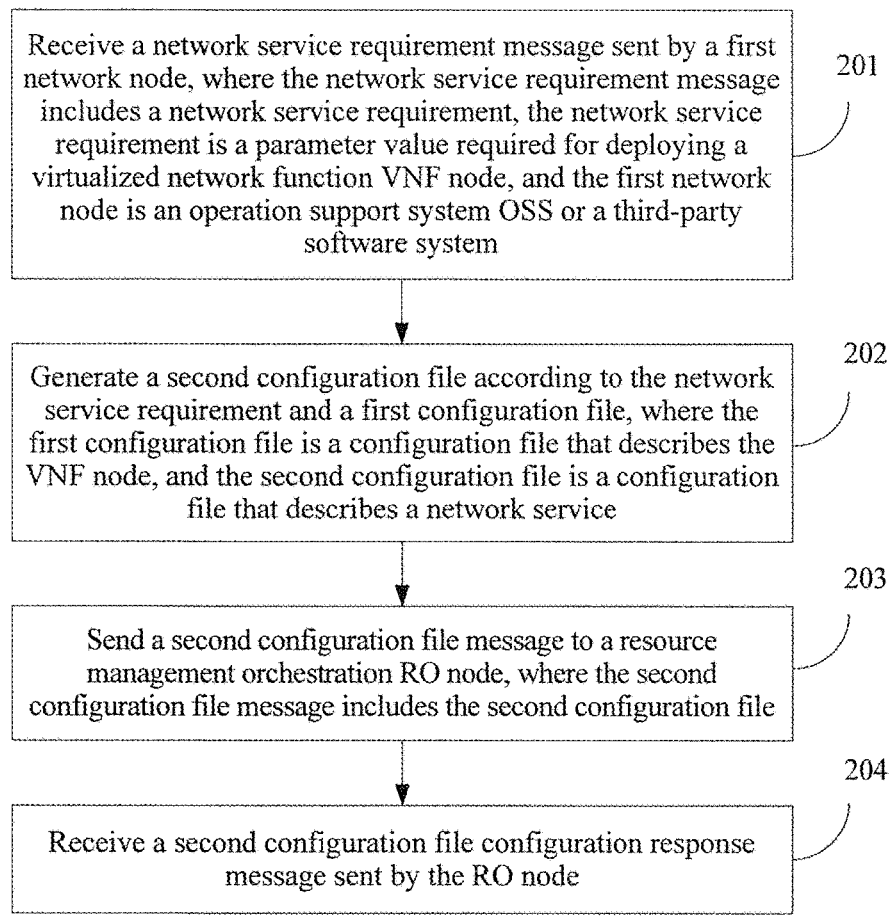
FIG. 35 is a flowchart 1 of a network functions virtualization network data processing method according to an embodiment of the present invention.

An embodiment of the present invention provides a network functions virtualization network data processing method. The network functions virtualization network data processing method is applied to a network service orchestration (NSO) node. As shown in FIG. 35, the method includes:

Step 201: Receive a network service requirement message sent by a first network node, where the network service requirement message includes a network service requirement, the network service requirement is a parameter value required for deploying a virtualized network function (VNF) node, and the first network node is an operation support system (OSS) or a third-party software system.

Step 202: Generate a second configuration file according to the network service requirement and a first configuration file, where the first configuration file is a configuration file that describes the VNF node, and the second configuration file is a configuration file that describes a network service.

Step 203: Send a second configuration file message to a resource management orchestration (RO) node, where the second configuration file message includes the second configuration file.

Step 204: Receive a second configuration file configuration response message sent by the RO node.

In this way, a network service orchestration function in the prior art is implemented by using the NSO node, which can make deployment of the network service orchestration function and a resource management orchestration function of a network functions virtualization network more flexible compared with the prior art.

Optionally, before the second configuration file is generated according to the network service requirement and the first configuration file, when the NSO node is connected to a catalog, the NSO node may directly query the catalog, to obtain the first configuration file from the catalog. The catalog includes a network service (NS) catalog and a virtualized network function (VNF) catalog.

Optionally, before the second configuration file is generated according to the network service requirement and the first configuration file, when the NSO node is connected to the RO node, and the RO node is connected to the catalog, the NSO node may send a catalog query request message to the RO node, and receive a catalog query request response message sent by the RO node, where the catalog query request response message includes the first configuration file.

Optionally, the NSO node is connected to two or more RO nodes, and the NSO node may send the second configuration file message to at least one of the RO nodes according to a locally stored network functions virtualization network resource global view, where the second configuration file includes network service-related information, virtualized network node-related information, virtualized network node feature-related information, and user subscription-related information, where the network service-related information includes a network service type, a network service capacity requirement, and a network scale policy; the virtualized network node-related information includes a virtualized network node type, a virtualized network node capacity requirement, a virtualized network node deployment location, and a virtualized network node interconnection link requirement; the virtualized network node feature-related information includes a virtualized network node channel quantity and a virtualized network node service area setting;

the user subscription-related information includes a user quantity, a network selection policy, and quality of service; and the network functions virtualization network resource global view records a deployment of a resource of the virtualized network function node in the network functions virtualization network.

Optionally, the NSO node is connected to one RO node, the RO node is connected to at least one RO node, and the NSO node may send the second configuration file message to the RO node, where the second configuration file includes network service-related information, virtualized network node-related information, virtualized network node feature-related information, and user subscription-related information, where the network service-related information includes a network service type, a network service capacity requirement, and a network scale policy; the virtualized network node-related information includes a virtualized network node type, a virtualized network node capacity requirement, a virtualized network node deployment location, and a virtualized network node interconnection link requirement; the virtualized network node feature-related information includes a virtualized network node channel quantity and a virtualized network node service area setting; and the user subscription-related information includes a user quantity, a network selection policy, and quality of service.

Further, after receiving the second configuration file configuration response message sent by the RO node, the NSO node may send a network service instantiation request message to the RO node, and receive a network service modification requirement message sent by the first network node, where the network service modification requirement message includes a network service modification requirement, and the network service modification requirement is configuring the network service, updating the network service, or terminating the network service.

Optionally, after receiving the network service modification requirement message sent by the first network node, the NSO node may obtain network service information from the catalog and a network functions virtualization infrastructure (NFVI) resource, where the network service information includes a state and load of the network service, and the NSO node is separately connected to the catalog and the network functions virtualization infrastructure resource.

Optionally, the NSO node may obtain network service information from the catalog and a network functions virtualization infrastructure (NFVI) resource by using the RO node, where the network service information includes a state and load of the network service.

Optionally, after querying for the network service information, the NSO node may send a network service information query response message to the first network node.

The NSO node further performs at least one of the following actions: managing a topology of a network service instance, managing automatic configuration of the network service instance, managing network service policy information, and managing a fault of the network service.

Figure 36:
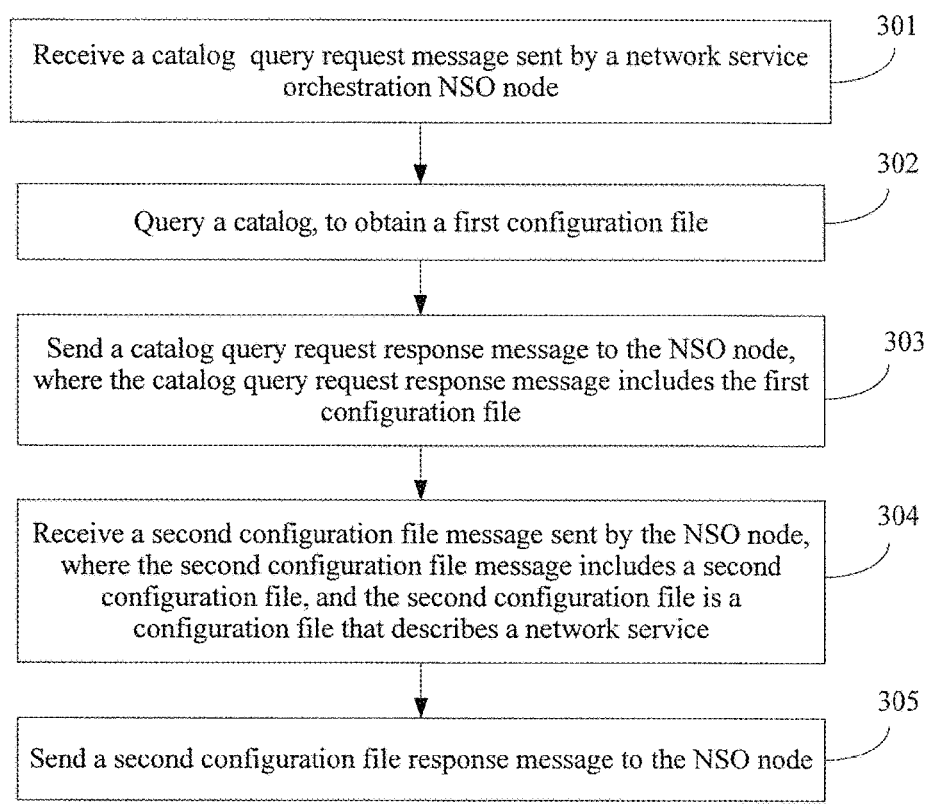
FIG. 36 is a flowchart 2 of a network functions virtualization network data processing method according to an embodiment of the present invention.

An embodiment of the present invention provides a network functions virtualization network data processing method. The network functions virtualization network data processing method is applied to a resource management orchestration (RO) node. As shown in FIG. 36, the method includes:

Step 301: Receive a catalog query request message sent by a network service orchestration (NSO) node.

Step 302: Query a catalog, to obtain a first configuration file.

Step 303: Send a catalog query request response message to the NSO node, where the catalog query request response message includes the first configuration file.

Step 304: Receive a second configuration file message sent by the NSO node, where the second configuration file message includes a second configuration file, and the second configuration file is a configuration file that describes a network service.

Step 305: Send a second configuration file response message to the NSO node.

In this way, a resource management orchestration function in the prior art is implemented by using the RO node, which can make deployment of a network service orchestration function and the resource management orchestration function of a network functions virtualization network more flexible compared with the prior art.

After the second configuration file message sent by the NSO node is received, a network service instantiation request message sent by the NSO node may be received.

After sending the second configuration file response message to the NSO node, the RO node may manage a fault of an NFVI resource, and send NFVI resource fault information or NFVI resource global view information to a first network node, where the first network node is an operation support system (OSS) or a third-party software system.

Figure 37:
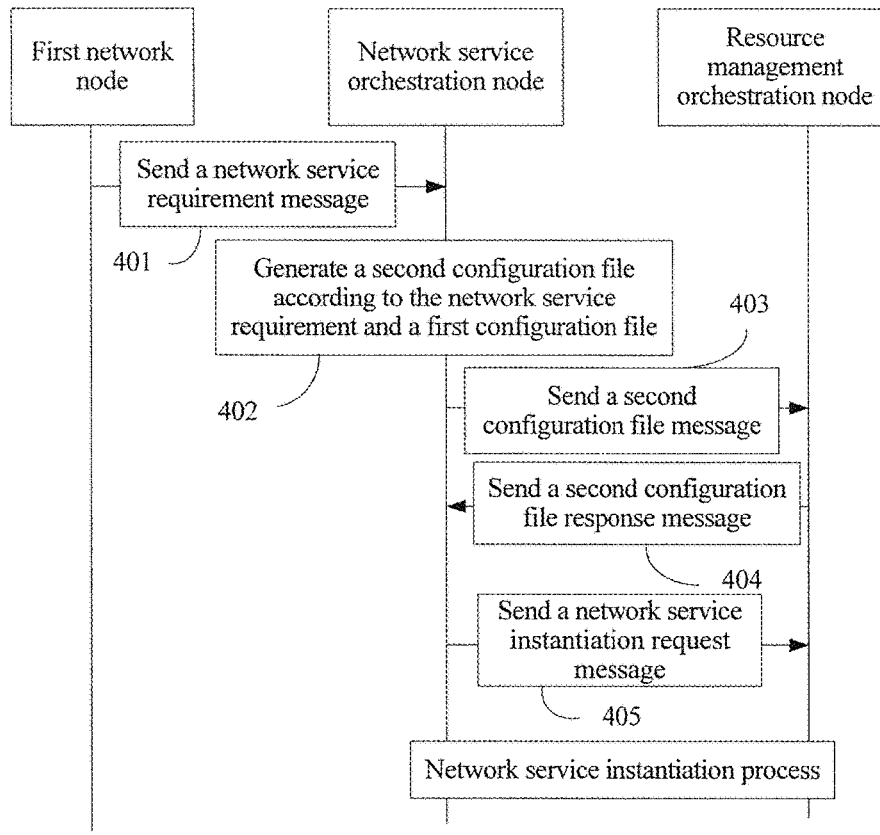
FIG. 37 is a flowchart 3 of a network functions virtualization network data processing method according to an embodiment of the present invention.

An embodiment of the present invention provides a network functions virtualization network data processing method, which is applied to a network functions virtualization (NFV) network system. As shown in FIG. 37, the method includes:

Step 401: A first network node sends a network service requirement message to a network service orchestration (NSO) node.

The network service requirement message includes a network service requirement, the network service requirement is a parameter value required for deploying a virtualized network function (VNF) node, and the first network node is an operation support system (OSS) or a third-party software system.

For example, video on-live services for 100 thousand users, cluster services for two thousand users, data collection of 180 thousand machines, or the like need to be deployed. The network service requirement includes a parameter value required for deploying the virtualized network function (VNF) node, such as a user quantity, time, a geographical location, a quality of service requirement, or a capacity requirement.

Step 402: The NSO node generates a second configuration file according to the network service requirement and a first configuration file.

The first configuration file is a configuration file that describes the VNF node, and the second configuration file is a configuration file that describes a network service. The first configuration file includes an information element of a VNF, and the second configuration file includes an information element of a network service description NSD. For example, the second configuration file includes network service-related information, virtualized network node-related information, virtualized network node feature-related information, and user subscription-related information, where the network service-related information includes a network service type, a network service capacity requirement, and a network scale policy; the virtualized network node-related information includes a virtualized network node type, a virtualized network node capacity requirement, a virtualized network node deployment location, and a virtualized network node interconnection link requirement; the virtualized network node feature-related information includes a virtualized network node channel quantity and a virtualized network node service area setting; and the user subscription-related information includes a user quantity, a network selection policy, and quality of service.

The NSO node may generate, by using a template, the second configuration file according to the network service requirement, a virtualized network function description (VNFD), a virtualized network function component description (VNFCD), and the like. The NSO node stores the template, and information such as the VNFD and the VNFCD may be preset in the NSO node.

For example, video on-live services for 100 thousand users, cluster services for two thousand users, data collection of 180 thousand machines, or the like need to be deployed. The network service requirement includes a parameter value required for deploying the virtualized network function (VNF) node, such as a user quantity, time, a geographical location, a quality of service requirement, or a capacity requirement. The NSO node determines, according to the network service requirement, needed VNFs including function nodes such as a mobility management entity (MME), a signaling gateway (SGW), a packet data gateway (PGW), and a video optimization gateway (VOG), determines requirements such as performance and capacities corresponding to the different function nodes, determines all information elements in the VNFD by querying the VNFD, generates a Constituent VNF, and generates a Service deployment flavour, that is, List of service deployment flavours in the NSD, according to the Constituent VNF. Manners for determining other information elements in the NSD are similar to this. It should be noted that, for information element in configuration files such as the NSD and the VNFD, refer to descriptions in the GS NFV-MAN 001 V0.3.15 (April 2014) protocol.

Optionally, before the NSO node generates the second configuration file according to the network service requirement and the first configuration file, the NSO node queries a catalog, to obtain the first configuration file from the catalog, where the NSO node is connected to the catalog, and the catalog includes a network service (NS) catalog and a virtualized network function (VNF) catalog.

Optionally, before the NSO node generates the second configuration file according to the network service requirement and the first configuration file, the NSO node sends a catalog query request message to the RO node; the RO node queries the catalog, to obtain the first configuration file; and the RO node sends a catalog query request response message to the NSO node, where the catalog query request response message includes the first configuration file.

Step 403: The NSO node sends a second configuration file message to the RO node.

The second configuration file message includes the second configuration file.

Optionally, the NSO node is connected to two or more RO nodes, and the NSO node sends the second configuration file message to at least one of the RO nodes according to a locally stored network functions virtualization network resource global view.

Optionally, the NSO node is connected to one RO node, the RO node is connected to at least one RO node, the NSO node sends the second configuration file message to the RO node, and then the RO node may send the second configuration file message to the at least one RO node according to a locally stored network functions virtualization network resource global view.

Step 404: The RO node sends a second configuration file response message to the NSO node.

Step 405: The NSO node sends a network service instantiation request message to the RO node.

The NSO node, the RO node, a VNFM, and a VIM exchange information with each other, to implement a process of network service instantiation.

It should be noted that, the first network node may further send a network service modification requirement message to the NSO node, where the network service modification requirement message includes a network service modification requirement, and the network service modification requirement is configuring the network service, updating the network service, or terminating the network service. The NSO node is further configured to perform at least one of the following actions: managing a topology of a network service instance, managing automatic configuration of the network service instance, managing network service policy information, and managing a fault of the network service. The RO node is further configured to manage a fault of an NFVI resource.

In this way, a network service orchestration function in the prior art is implemented by using the NSO node, and a resource management orchestration function in the prior art is implemented by using the RO node, which can make deployment of the network service orchestration function and the resource management orchestration function of a network functions virtualization network more flexible compared with the prior art.

Figure 38:
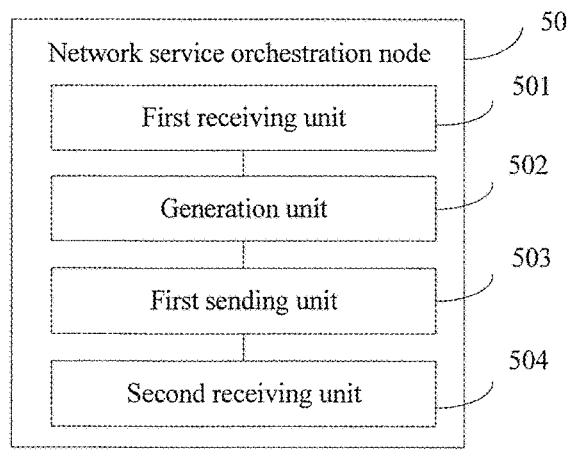
FIG. 38 is a schematic structural diagram 1 of a network service orchestration node according to an embodiment of the present invention.

An embodiment of the present invention provides a network service orchestration (NSO) node 50, as shown in FIG. 38, including: a first receiving unit 501, a generation unit 502, a first sending unit 503, and a second receiving unit 504.

The first receiving unit 501 is configured to receive a network service requirement message sent by a first network node, where the network service requirement message includes a network service requirement, the network service requirement is a parameter value required for deploying a virtualized network function (VNF) node, and the first network node is an operation support system (OSS) or a third-party software system.

For example, video on-live services for 100 thousand users, cluster services for two thousand users, data collection of 180 thousand machines, or the like need to be deployed. The network service requirement includes a parameter value required for deploying the virtualized network function (VNF) node, such as a user quantity, time, a geographical location, a quality of service requirement, or a capacity requirement.

The generation unit 502 is configured to generate a second configuration file according to the network service requirement and a first configuration file, where the first configuration file is a configuration file that describes the VNF node, and the second configuration file is a configuration file that describes a network service.

The first configuration file is a configuration file that describes the VNF node, and the second configuration file is a configuration file that describes a network service. The first configuration file includes an information element of a VNF, and the second configuration file includes an information element of a network service description NSD. For example, the second configuration file includes network service-related information, virtualized network node-related information, virtualized network node feature-related information, and user subscription-related information, where the network service-related information includes a network service type, a network service capacity requirement, and a network scale policy; the virtualized network node-related information includes a virtualized network node type, a virtualized network node capacity requirement, a virtualized network node deployment location, and a virtualized network node interconnection link requirement; the virtualized network node feature-related information includes a virtualized network node channel quantity and a virtualized network node service area setting; and the user subscription-related information includes a user quantity, a network selection policy, and quality of service.

The NSO node may generate, by using a template, the second configuration file according to the network service requirement, a virtualized network function description (VNFD), a virtualized network function component description (VNFCD), and the like. The NSO node stores the template, and information such as the VNFD and the VNFCD may be preset in the NSO node.

For example, video on-live services for 100 thousand users, cluster services for two thousand users, data collection of 180 thousand machines, or the like need to be deployed. The network service requirement includes a parameter value required for deploying the virtualized network function (VNF) node, such as a user quantity, time, a geographical location, a quality of service requirement, or a capacity requirement. The NSO node determines, according to the network service requirement, needed VNFs including function nodes such as a mobility management entity (MME), a signaling gateway (SGW), a packet data gateway (PGW), and a video optimization gateway (VOG), determines requirements such as performance and capacities corresponding to the different function nodes, determines all information elements in the VNFD by querying the VNFD, generates a Constituent VNF, and generates a Service deployment flavour, that is, List of service deployment flavours in the NSD, according to the Constituent VNF. Manners for determining other information elements in the NSD are similar to this. It should be noted that, for information element in configuration files such as the NSD and the VNFD, refer to descriptions in the GS NFV-MAN 001 V0.3.15 (April 2014) protocol.

The first sending unit 503 is configured to send a second configuration file message to a resource management orchestration (RO) node, where the second configuration file message includes the second configuration file.

The second receiving unit 504 is configured to receive a second configuration file configuration response message sent by the RO node.

In this way, a network service orchestration function in the prior art is implemented by using the NSO node, which can make deployment of the network service orchestration function and a resource management orchestration function of a network functions virtualization network more flexible compared with the prior art.

Figure 39:
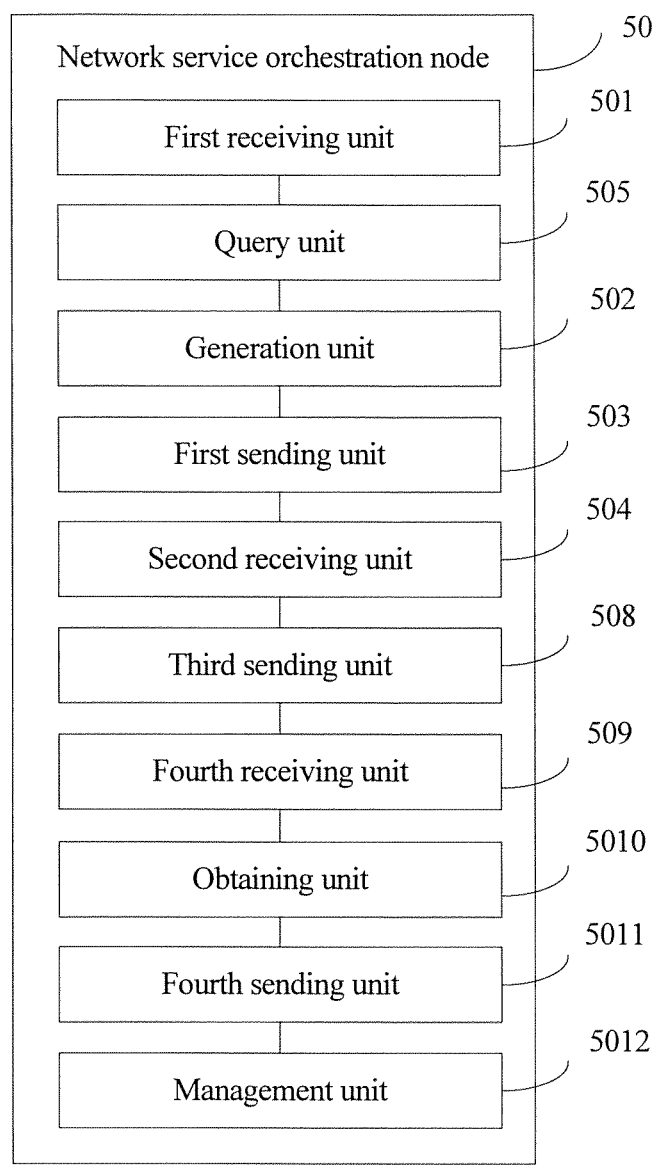
FIG. 39 is a schematic structural diagram 2 of a network service orchestration node according to an embodiment of the present invention.

Optionally, as shown in FIG. 39, the NSO node 50 further includes:

a query unit 505, configured to query a catalog, to obtain the first configuration file from the catalog, where the NSO node is connected to the catalog, and the catalog includes a network service (NS) catalog and a virtualized network function (VNF) catalog;

a third sending unit 508, configured to send a network service instantiation request message to the RO node;

a fourth sending unit 509, configured to: receive a network service modification requirement message sent by the first network node, where the network service modification requirement message includes a network service modification requirement, and the network service modification requirement is configuring the network service, updating the network service, or terminating the network service;

an obtaining unit 5010, configured to: obtain network service information from the catalog and a network functions virtualization infrastructure (NFVI) resource, where the network service information includes a state and load of the network service, and the NSO node is separately connected to the catalog and the network functions virtualization infrastructure resource; or obtain network service information from the catalog and a network functions virtualization infrastructure (NFVI) resource by using the RO node, where the network service information includes a state and load of the network service;

a fourth sending unit 5011, configured to: send a network service information query response message to the first network node; and a management unit 5012, configured to: manage a topology of a network service instance, where the management unit 5012 is further configured to manage automatic configuration of the network service instance;

the management unit 5012 is further configured to manage network service policy information; and the management unit 5012 is further configured to manage a fault of the network service.

Figure 40:
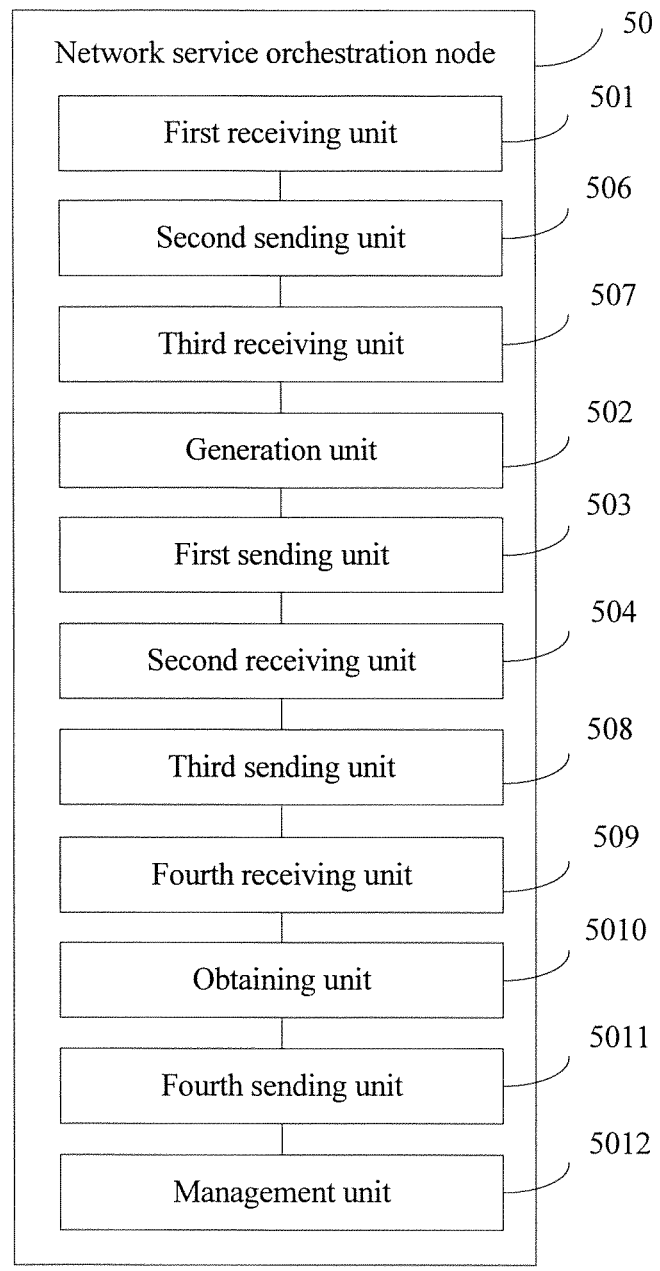
FIG. 40 is a schematic structural diagram 3 of a network service orchestration node according to an embodiment of the present invention.

Optionally, as shown in FIG. 40, the NSO node 50 further includes:

a second sending unit 506, configured to send a catalog query request message to the RO node;

a third receiving unit 507, configured to receive a catalog query request response message sent by the RO node, where the catalog query request response message includes the first configuration file;

a third sending unit 508, configured to: send a network service instantiation request message to the RO node;

a fourth sending unit 509, configured to: receive a network service modification requirement message sent by the first network node, where the network service modification requirement message includes a network service modification requirement, and the network service modification requirement is configuring the network service, updating the network service, or terminating the network service;

an obtaining unit 5010, configured to: obtain network service information from the catalog and a network functions virtualization infrastructure (NFVI) resource, where the network service information includes a state and load of the network service, and the NSO node is separately connected to the catalog and the network functions virtualization infrastructure resource; or obtain network service information from the catalog and a network functions virtualization infrastructure (NFVI) resource by using the RO node, where the network service information includes a state and load of the network service;

a fourth sending unit 5011, configured to: send a network service information query response message to the first network node; and a management unit 5012, configured to: the management unit 5012 is further configured to manage a topology of a network service instance, where the management unit 5012 is further configured to manage automatic configuration of the network service instance;

the management unit 5012 is further configured to manage network service policy information; and the management unit 5012 is further configured to manage a fault of the network service.

The NSO node is connected to two or more RO nodes, and the first sending unit 503 is further configured to:

send the second configuration file message to at least one of the RO nodes according to a locally stored network functions virtualization network resource global view, where the second configuration file includes network service-related information, virtualized network node-related information, virtualized network node feature-related information, and user subscription-related information, where the network service-related information includes a network service type, a network service capacity requirement, and a network scale policy; the virtualized network node-related information includes a virtualized network node type, a virtualized network node capacity requirement, a virtualized network node deployment location, and a virtualized network node interconnection link requirement; the virtualized network node feature-related information includes a virtualized network node channel quantity and a virtualized network node service area setting; and the user subscription-related information includes a user quantity, a network selection policy, and quality of service.

The NSO node is connected to one RO node, the RO node is connected to at least one RO node, and the first sending unit 503 is further configured to:

send the second configuration file message to the RO node, where the second configuration file includes network service-related information, virtualized network node-related information, virtualized network node feature-related information, and user subscription-related information, where the network service-related information includes a network service type, a network service capacity requirement, and a network scale policy; the virtualized network node-related information includes a virtualized network node type, a virtualized network node capacity requirement, a virtualized network node deployment location, and a virtualized network node interconnection link requirement; the virtualized network node feature-related information includes a virtualized network node channel quantity and a virtualized network node service area setting; and the user subscription-related information includes a user quantity, a network selection policy, and quality of service.

The NSO node has at least one of network service functions, and the network service functions include:

automatically configuring a network service requirement;

managing uploading of a network service and a virtualized network function (VNF) node;

starting a network service and managing a life cycle of a network service;

managing VNF instantiation in cooperation with the VNFM node;

obtaining information about an NFVI related to a network service and a VNF node resource by performing a query by using the RO node or the VNFM node;

managing integrity and validity of a network service instance during an execution cycle;

managing a relationship between a network service instance and a VNF instance;

managing a topology of a network service instance;

managing automatic configuration of a network service instance;

managing policy information related to a network service; and managing a fault of a network service.

Figure 41:
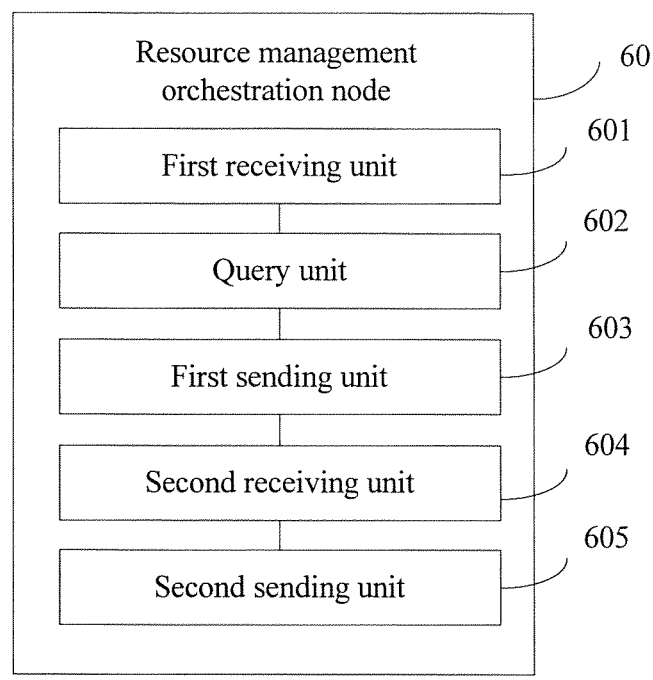
FIG. 41 is a schematic structural diagram 1 of a resource management orchestration node according to an embodiment of the present invention.

An embodiment of the present invention provides a resource management orchestration (RO) node 60, as shown in FIG. 41, including:

a first receiving unit 601, configured to receive a catalog query request message sent by a network service orchestration (NSO) node;

a query unit 602, configured to query a catalog, to obtain a first configuration file;

a first sending unit 603, configured to send a catalog query request response message to the NSO node, where the catalog query request response message includes the first configuration file;

a second receiving unit 604, configured to receive a second configuration file message sent by the NSO node, where the second configuration file message includes a second configuration file, and the second configuration file is a configuration file that describes a network service; and a second sending unit 605, configured to send a second configuration file response message to the NSO node.

In this way, a resource management orchestration function in the prior art is implemented by using the RO node, which can make deployment of a network service orchestration function and the resource management orchestration function of a network functions virtualization network more flexible compared with the prior art.

Figure 42:
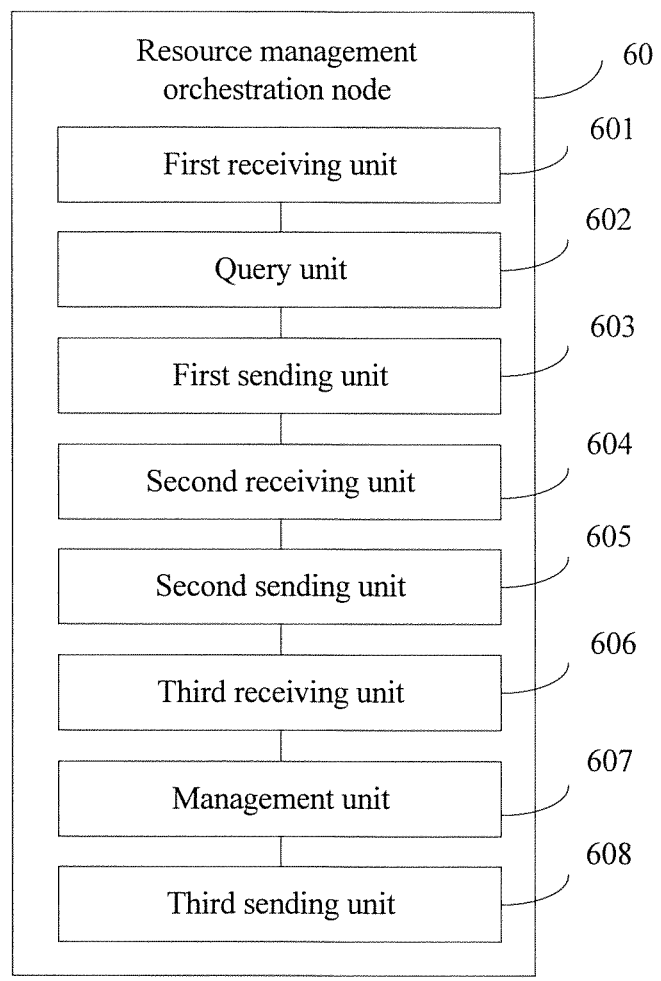
FIG. 42 is a schematic structural diagram 2 of a resource management orchestration node according to an embodiment of the present invention.

As shown in FIG. 42, the RO node 60 further includes:

a third receiving unit 606, configured to receive a network service instantiation request message sent by the NSO node;

a management unit 607, configured to manage a fault of an NFVI resource; and a third sending unit 608, configured to send NFVI resource fault information or NFVI resource global view information to a first network node, where the first network node is an operation support system (OSS) or a third-party software system.

The RO node has at least one of a global resource management function or a coordinated virtualized resource management allocation function, and the global resource management function and the coordinated virtualized resource management allocation function include:

maintaining and managing a resource network topological view;

authenticating and authorizing an NFVI resource request, where NFVI resource are distributed in multiple VIM nodes;

managing a network service instance and distribution, reservation, and configuration of an NFVI resource corresponding to a VNF instance;

managing a VNF instance, and managing a relationship between a VNF instance and an NFVI resource allocated to the VNF instance;

managing a policy and managing execution of a network service instance and a VNF instance;

recording a view related to an NFVI resource used by a VNF instance or a VNF instance group; and managing a fault of an NFVI resource.

Figure 43:
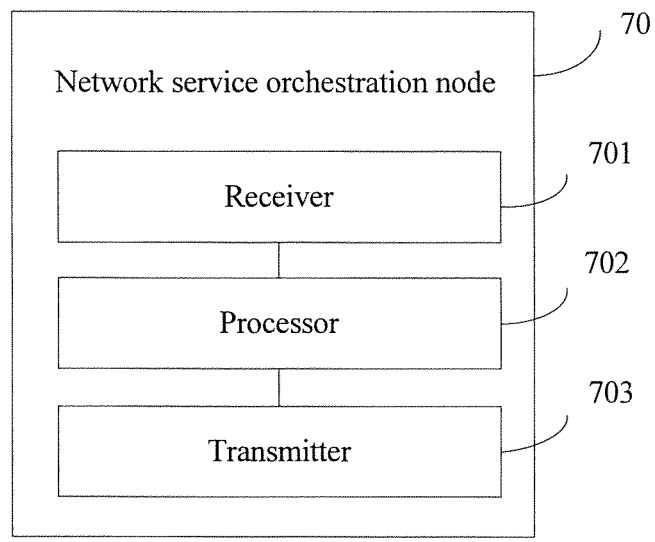
FIG. 43 is a schematic structural diagram 3 of a network service orchestration node according to an embodiment of the present invention.

An embodiment of the present invention provides a network service orchestration (NSO) node 70, as shown in FIG. 43, including: a receiver 702, a processor 702, and a transmitter 703.

The receiver 701 is configured to receive a network service requirement message sent by a first network node, where the network service requirement message includes a network service requirement, the network service requirement is a parameter value required for deploying a virtualized network function (VNF) node, and the first network node is an operation support system (OSS) or a third-party software system.

For example, video on-live services for 100 thousand users, cluster services for two thousand users, data collection of 180 thousand machines, or the like need to be deployed. The network service requirement includes a parameter value required for deploying the virtualized network function (VNF) node, such as a user quantity, time, a geographical location, a quality of service requirement, or a capacity requirement.

The processor 702 is configured to generate a second configuration file according to the network service requirement and a first configuration file, where the first configuration file is a configuration file that describes the VNF node, and the second configuration file is a configuration file that describes a network service.

The first configuration file is a configuration file that describes the VNF node, and the second configuration file is a configuration file that describes a network service. The first configuration file includes an information element of a VNF, and the second configuration file includes an information element of a network service description NSD. For example, the second configuration file includes network service-related information, virtualized network node-related information, virtualized network node feature-related information, and user subscription-related information, where the network service-related information includes a network service type, a network service capacity requirement, and a network scale policy; the virtualized network node-related information includes a virtualized network node type, a virtualized network node capacity requirement, a virtualized network node deployment location, and a virtualized network node interconnection link requirement; the virtualized network node feature-related information includes a virtualized network node channel quantity and a virtualized network node service area setting; and the user subscription-related information includes a user quantity, a network selection policy, and quality of service.

The NSO node may generate, by using a template, the second configuration file according to the network service requirement, a virtualized network function description (VNFD), a virtualized network function component description (VNFCD), and the like. The NSO node stores the template, and information such as the VNFD and the VNFCD may be preset in the NSO node.

For example, video on-live services for 100 thousand users, cluster services for two thousand users, data collection of 180 thousand machines, or the like need to be deployed. The network service requirement includes a parameter value required for deploying the virtualized network function (VNF) node, such as a user quantity, time, a geographical location, a quality of service requirement, or a capacity requirement. The NSO node determines, according to the network service requirement, needed VNFs including function nodes such as a mobility management entity (MME), a signaling gateway (SGW), a packet data gateway (PGW), and a video optimization gateway (VOG), determines requirements such as performance and capacities corresponding to the different function nodes, determines all information elements in the VNFD by querying the VNFD, generates a Constituent VNF, and generates a Service deployment flavour, that is, List of service deployment flavours in the NSD, according to the Constituent VNF. Manners for determining other information elements in the NSD are similar to this. It should be noted that, for information element in configuration files such as the NSD and the VNFD, refer to descriptions in the GS NFV-MAN 001 V0.3.15 (April 2014) protocol.

The transmitter 703 is configured to send a second configuration file message to a resource management orchestration (RO) node, where the second configuration file message includes the second configuration file.

The receiver 701 is further configured to receive a second configuration file configuration response message sent by the RO node.

In this way, a network service orchestration function in the prior art is implemented by using the NSO node, which can make deployment of the network service orchestration function and a resource management orchestration function of a network functions virtualization network more flexible compared with the prior art.

The processor 702 is further configured to query a catalog, to obtain the first configuration file from the catalog, where the NSO node is connected to the catalog, and the catalog includes a network service (NS) catalog and a virtualized network function (VNF) catalog.

The transmitter 703 is further configured to send a catalog query request message to the RO node.

The receiver 701 is further configured to receive a catalog query request response message sent by the RO node, where the catalog query request response message includes the first configuration file.

The NSO node is connected to two or more RO nodes, and the transmitter 703 is further configured to:

send the second configuration file message to at least one of the RO nodes according to a locally stored network functions virtualization network resource global view, where the second configuration file includes network service-related information, virtualized network node-related information, virtualized network node feature-related information, and user subscription-related information, where the network service-related information includes a network service type, a network service capacity requirement, and a network scale policy; the virtualized network node-related information includes a virtualized network node type, a virtualized network node capacity requirement, a virtualized network node deployment location, and a virtualized network node interconnection link requirement; the virtualized network node feature-related information includes a virtualized network node channel quantity and a virtualized network node service area setting; and the user subscription-related information includes a user quantity, a network selection policy, and quality of service.

The NSO node is connected to one RO node, the RO node is connected to at least one RO node, and the transmitter 703 is further configured to:

send the second configuration file message to the RO node, where the second configuration file includes network service-related information, virtualized network node-related information, virtualized network node feature-related information, and user subscription-related information, where the network service-related information includes a network service type, a network service capacity requirement, and a network scale policy; the virtualized network node-related information includes a virtualized network node type, a virtualized network node capacity requirement, a virtualized network node deployment location, and a virtualized network node interconnection link requirement; the virtualized network node feature-related information includes a virtualized network node channel quantity and a virtualized network node service area setting; and the user subscription-related information includes a user quantity, a network selection policy, and quality of service.

The transmitter 703 is further configured to send a network service instantiation request message to the RO node.

The receiver 701 is further configured to receive a network service modification requirement message sent by the first network node, where the network service modification requirement message includes a network service modification requirement, and the network service modification requirement is configuring the network service, updating the network service, or terminating the network service.

The processor 702 is further configured to obtain network service information from the catalog and a network functions virtualization infrastructure (NFVI) resource, where the network service information includes a state and load of the network service, and the NSO node is separately connected to the catalog and the network functions virtualization infrastructure resource; or obtain network service information from the catalog and a network functions virtualization infrastructure (NFVI) resource by using the RO node, where the network service information includes a state and load of the network service.

The transmitter 703 is further configured to send a network service information query response message to the first network node.

The processor 702 is further configured to: manage a topology of a network service instance; manage automatic configuration of the network service instance; manage network service policy information; and manage a fault of the network service.

The NSO node has at least one of network service functions, and the network service functions include:
  automatically configuring a network service requirement;
  managing uploading of a network service and a virtualized network function (VNF) node;
  starting a network service and managing a life cycle of a network service;
  managing VNF instantiation in cooperation with the VNFM node;
  obtaining information about an NFVI related to a network service and a VNF node resource by performing a query by using the RO node or the VNFM node;
  managing integrity and validity of a network service instance during an execution cycle;
  managing a relationship between a network service instance and a VNF instance;
  managing a topology of a network service instance;
  managing automatic configuration of a network service instance;
  managing policy information related to a network service; and
  managing a fault of a network service.

Figure 44:
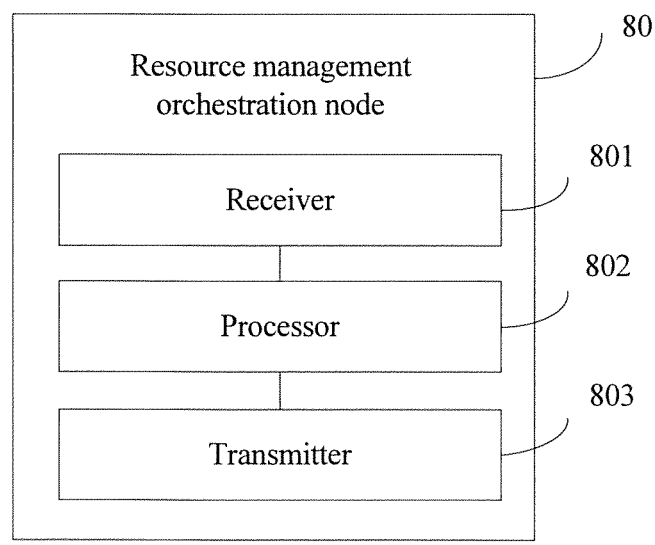
FIG. 44 is a schematic structural diagram 4 of a resource management orchestration node according to an embodiment of the present invention.

An embodiment of the present invention provides a resource management orchestration (RO) node 80, as shown in FIG. 44, including:
  a receiver 801, configured to receive a catalog query request message sent by a network service orchestration (NSO) node;
  a processor 802, configured to query a catalog, to obtain a first configuration file; and
  a transmitter 803, configured to send a catalog query request response message to the NSO node, where the catalog query request response message includes the first configuration file, where
  the receiver 801 is further configured to receive a second configuration file message sent by the NSO node, where the second configuration file message includes a second configuration file, and the second configuration file is a configuration file that describes a network service; and
  the transmitter 803 is further configured to send a second configuration file response message to the NSO node.

In this way, a resource management orchestration function in the prior art is implemented by using the RO node, which can make deployment of a network service orchestration function and the resource management orchestration function of a network functions virtualization network more flexible compared with the prior art.

The receiver 801 is further configured to receive a network service instantiation request message sent by the NSO node.

The processor 802 is further configured to manage a fault of an NFVI resource.

The transmitter 803 is further configured to send NFVI resource fault information or NFVI resource global view information to a first network node, where the first network node is an operation support system (OSS) or a third-party software system.

The RO node has at least one of a global resource management function or a coordinated virtualized resource management allocation function, and the global resource management function and the coordinated virtualized resource management allocation function include:
  maintaining and managing a resource network topological view;
  authenticating and authorizing an NFVI resource request, where NFVI resource are distributed in multiple VIM nodes;
  managing a network service instance and distribution, reservation, and configuration of an NFVI resource corresponding to a VNF instance;
  managing a VNF instance, and managing a relationship between a VNF instance and an NFVI resource allocated to the VNF instance;
  managing a policy and managing execution of a network service instance and a VNF instance;
  recording a view related to an NFVI resource used by a VNF instance or a VNF instance group; and
  managing a fault of an NFVI resource.

It may be clearly understood by a person skilled in the art that, for the purpose of convenient and brief description, for a detailed working process of the foregoing apparatus and unit, reference may be made to a corresponding process in the foregoing method embodiments, and details are not described herein again.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A network functions virtualization (NFV) network system, comprising:
    a network service orchestration (NSO) node:
    a resource management orchestration (RO) node;
    a first network node;
    a virtualized network function manager (VNFM) node;
    a virtualized infrastructure manager (VIM) node;
    a first catalog;
    a network functions virtualization (NFV) instance; and
    a network functions virtualization infrastructure (NFVI) resource,
    wherein:
        the first catalog comprises a network service (NS) catalog and a virtualized network function (VNF) catalog,
        the first network node comprises an operation support system (OSS) or a third-party software system,
        the NSO node is connected to the first network node via a first interface,
        the NSO node is connected to the RO node via a second interface,
        the NSO node is connected to the first catalog,
        the RO node is connected to the first network node via a third interface,
        the RO node is connected to the VNFM node,
        the RO node is connected to the VIM node,
        the RO node is separately connected to the first catalog, the NFV instance, and the network functions virtualization infrastructure resource,
        the NSO node is configured to send a configuration file message to the RO node, the configuration file message comprising a configuration file that describes a network service, and
        the RO node is configured to send a configuration file response message to the NSO node.

2. The system according to claim 1, wherein:
    the RO node comprises N RO nodes and the VIM node comprises M VIM nodes, wherein N is an integer greater than or equal to 1, and M is an integer greater than or equal to 1;
    when N is equal to 1, and M is equal to 1, the NSO node is connected to the RO node, and the RO node is connected to the VIM node;
    when N is equal to 1, and M is greater than or equal to 2, the NSO node is connected to the RO node, and the RO node is connected to each of the VIM nodes; and
    when N is greater than or equal to 2, and M is greater than or equal to 1, the NSO node is connected to one of the RO nodes, the RO node is separately connected to N-1 RO nodes, and each one of the N-1 RO nodes is connected to at least one of the VIM nodes.

3. The system according to claim 1, wherein:
    the RO node comprises N RO nodes and the VIM node comprises M VIM nodes, wherein N is an integer greater than or equal to 1, and M is an integer greater than or equal to 1;
    when N is equal to 1, and M is equal to 1, the NSO node is connected to the RO node, and the RO node is connected to the VIM node;
    when N is equal to 1, and M is greater than or equal to 2, the NSO node is connected to the RO node, and the RO node is connected to each of the VIM nodes; and
    when N is greater than or equal to 2, and M is greater than or equal to 1, the NSO node is connected to each of the RO nodes, and each of the RO nodes is connected to at least one of the VIM nodes.

4. The system according to claim 1, wherein the NFV network system further comprises:
    a network service logic (NSL) catalog, wherein the NSL catalog stores network service policy information, and the network service policy information comprises logical data about network service deployment, user-related data, and policy information, and wherein the NSO node is connected to the NSL catalog.

5. The system according to claim 1, wherein the NSO node is configured to perform at least one of the following network service functions:
    automatically configuring a network service requirement;
    managing uploading of a network service and a VNF node;
    starting a network service and managing a life cycle of a network service;
    managing VNF instantiation in cooperation with the VNFM node;
    obtaining information about an NFVI related to a network service and a VNF node resource by performing a query using the RO node or the VNFM node;
    managing integrity and validity of a network service instance during an execution cycle;
    managing a relationship between a network service instance and a VNF instance;
    managing a topology of a network service instance;
    managing automatic configuration of a network service instance;
    managing policy information related to a network service; and
    managing a fault of a network service.

6. The system according to claim 1, wherein the RO node is configured to perform at least one of the following global resource management functions or coordinated virtualized resource management allocation functions:
    maintaining and managing a resource network topological view;
    authenticating and authorizing an NFVI resource request, wherein NFVI resources are distributed in multiple VIM nodes;
    managing a network service instance and distribution, reservation, and configuration of an NFVI resource corresponding to a VNF instance;
    managing a VNF instance, and managing a relationship between a VNF instance and an NFVI resource allocated to the VNF instance;
    managing a policy and managing execution of a network service instance and a VNF instance;
    recording a view related to an NFVI resource used by a VNF instance or a VNF instance group; and
    managing a fault of an NFVI resource.

7. A network service orchestration (NSO) node, comprising:
a receiver, configured to receive a network service requirement message sent by a first network node, wherein the network service requirement message comprises a network service requirement, the network service requirement is a parameter value for deploying a virtualized network function (VNF) node, and the first network node is an operation support system (OSS) or a third-party software system;
a processor, configured to generate a second configuration file according to the network service requirement and a first configuration file, wherein the first configuration file is a configuration file that describes the VNF node, and the second configuration file is a configuration file that describes a network service;
a transmitter, configured to send a second configuration file message to a resource management orchestration (RO) node, wherein the second configuration file message comprises the second configuration file; and
wherein the receiver is further configured to receive a second configuration file configuration response message sent by the RO node.

8. The NSO node according to claim 7, wherein the processor is further configured to:
query a catalog, to obtain the first configuration file from the catalog, wherein the NSO node is connected to the catalog, and the catalog comprises a network service (NS) catalog and a VNF catalog.

9. The NSO node according to claim 8, wherein:
the NSO node is connected to two or more RO nodes;
the transmitter is further configured to send the second configuration file message to at least one of the RO nodes according to a locally stored network functions virtualization network resource global view;
the second configuration file comprises:
network service-related information,
virtualized network node-related information,
virtualized network node feature-related information, and
user subscription-related information;
the network service-related information comprises:
a network service type,
a network service capacity requirement, and
a network scale policy;
the virtualized network node-related information comprises:
a virtualized network node type,
a virtualized network node capacity requirement,
a virtualized network node deployment location, and
a virtualized network node interconnection link requirement;
the virtualized network node feature-related information comprises:
a virtualized network node channel quantity and a virtualized network node service area setting; and
the user subscription-related information comprises:
a user quantity,
a network selection policy, and
quality of service.

10. The NSO node according to claim 8, wherein:
the NSO node is connected to one RO node, the RO node is connected to at least one RO node, and the transmitter is further configured to send the second configuration file message to the RO node;
the second configuration file comprises:
network service-related information,
virtualized network node-related information,
virtualized network node feature-related information, and
user subscription-related information;
the network service-related information comprises:
a network service type,
a network service capacity requirement, and
a network scale policy;
the virtualized network node-related information comprises:
a virtualized network node type,
a virtualized network node capacity requirement,
a virtualized network node deployment location, and
a virtualized network node interconnection link requirement;
the virtualized network node feature-related information comprises:
a virtualized network node channel quantity and a virtualized network node service area setting; and
the user subscription-related information comprises:
a user quantity,
a network selection policy, and
quality of service.

11. The NSO node according to claim 8, wherein the transmitter is further configured to:
send a network service instantiation request message to the RO node.

12. The NSO node according to claim 11, wherein the receiver is further configured to:
receive a network service modification requirement message sent by the first network node, wherein the network service modification requirement message comprises a network service modification requirement, and the network service modification requirement comprises configuring the network service, updating the network service, or terminating the network service.

13. The NSO node according to claim 12, wherein the processor is further configured to:
obtain network service information from the catalog and a network functions virtualization infrastructure (NFVI) resource, wherein the network service information comprises a state and load of the network service, and the NSO node is separately connected to the catalog and the network functions virtualization infrastructure resource; or
obtain network service information from the catalog and a network functions virtualization infrastructure (NFVI) resource using the RO node, wherein the network service information comprises a state and load of the network service.

14. The NSO node according to claim 13, wherein the transmitter is further configured to:
send a network service information query response message to the first network node.

15. The NSO node according to claim 7, wherein:
the transmitter is further configured to send a catalog query request message to the RO node; and
the receiver is further configured to receive a catalog query request response message sent by the RO node, wherein the catalog query request response message comprises the first configuration file.

16. The NSO node according to claim 7, wherein the processor is further configured to:
manage a topology of a network service instance;
manage automatic configuration of the network service instance;
manage network service policy information; and
manage a fault of the network service.

17. A resource management orchestration (RO) node, comprising:
- a receiver, configured to receive a catalog query request message sent by a network service orchestration (NSO) node;
- a processer, configured to query a catalog, to obtain a first configuration file; and
- a transmitter, configured to send a catalog query request response message to the NSO node, wherein the catalog query request response message comprises the first configuration file;
- wherein the receiver is further configured to receive a second configuration file message sent by the NSO node, wherein the second configuration file message comprises a second configuration file, and the second configuration file is a configuration file that describes a network service; and
- wherein the transmitter is further configured to send a second configuration file response message to the NSO node.

18. The RO node according to claim 17, wherein the receiver is further configured to:
- receive a network service instantiation request message sent by the NSO node.

19. The RO node according to claim 17, wherein the processer is further configured to:
- manage a fault of a network functions virtualization infrastructure (NFVI) resource.

20. The RO node according to claim 17, wherein the transmitter is configured to:
- send network functions virtualization infrastructure (NFVI) resource fault information or network functions virtualization infrastructure (NFVI) resource global view information to a first network node, wherein the first network node is an operation support system (OSS) or a third-party software system.

* * * * *